US012601176B2

(12) United States Patent
Lacas et al.

(10) Patent No.: US 12,601,176 B2
(45) Date of Patent: Apr. 14, 2026

(54) MODULAR BUILDING SYSTEM FOR HARDSCAPE STRUCTURE

(71) Applicant: OLDCASTLE BUILDING PRODUCTS CANADA INC., Saint-John (CA)

(72) Inventors: Marc-André Lacas, Montréal (CA); Robert Declos, Montréal (CA); Bertin Castonguay, Magog (CA)

(73) Assignee: OLDCASTLE BUILDING PRODUCTS CANADA INC., Saint-John (CA)

( * ) Notice: Subject to any disclaimer, the term of this patent is extended or adjusted under 35 U.S.C. 154(b) by 826 days.

(21) Appl. No.: 17/054,961

(22) PCT Filed: May 15, 2019

(86) PCT No.: PCT/CA2019/050658
§ 371 (c)(1),
(2) Date: Nov. 12, 2020

(87) PCT Pub. No.: WO2019/218068
PCT Pub. Date: Nov. 21, 2019

(65) Prior Publication Data
US 2021/0214942 A1      Jul. 15, 2021

Related U.S. Application Data

(60) Provisional application No. 62/724,669, filed on Aug. 30, 2018, provisional application No. 62/671,595, filed on May 15, 2018.

(51) Int. Cl.
*F16B 5/02* (2006.01)
*A01G 9/28* (2018.01)
*E04C 1/39* (2006.01)

(52) U.S. Cl.
CPC ................ *E04C 1/395* (2013.01); *A01G 9/28* (2018.02); *F16B 5/02* (2013.01); *F16B 2200/30* (2018.08)

(58) Field of Classification Search
CPC ... E04C 1/395; A01G 9/28; F16B 7/87; F16B 13/00; F16B 2200/30
See application file for complete search history.

(56) References Cited

U.S. PATENT DOCUMENTS 3,426,541 A * 2/1969 Chiaves .............. E02D 29/0266
52/169.1
4,553,729 A 11/1985 Connors
(Continued)

FOREIGN PATENT DOCUMENTS

AU      2016368837 A1    5/2018
CA          3071198 A1    2/2019
(Continued)

OTHER PUBLICATIONS

International Search Report and Written Opinion of the International Searching Authority for International Patent Application No. PCT/CA2019/050658 mailed Jul. 31, 2019, 15 pages.
(Continued)

*Primary Examiner* — Paola Agudelo
(74) *Attorney, Agent, or Firm* — Merchant & Gould P.C.

(57) ABSTRACT

A modular building system, a method and a connecting assembly for building a hardscape structure, the modular building system comprising: a plurality of preformed hardscape structure sections including: a first hardscape structure section including a first section face and at least one first section groove defined in the first section face; a second hardscape structure section having a second section face and at least one second section groove defined in the second section face, the second hardscape structure section being disposed adjacent the first hardscape structure section such (Continued)

that the second section face is adjacent the first section face; and a connecting member having a first engagement portion for engaging one of the at least one first section groove and a second engagement portion for engaging one of the at least one second section groove to thereby secure together the first and second hardscape structure sections.

28 Claims, 53 Drawing Sheets

(56) References Cited

U.S. PATENT DOCUMENTS

| | | | | |
|---|---|---|---|---|
| 4,894,969 | A * | 1/1990 | Horobin | E04C 1/40 52/564 |
| 5,468,098 | A * | 11/1995 | Babcock | E02D 29/0225 405/262 |
| 5,548,937 | A * | 8/1996 | Shimonohara | F16B 5/0076 52/587.1 |
| 5,697,736 | A * | 12/1997 | Veazey | E02D 29/02 405/21 |
| 6,151,856 | A * | 11/2000 | Shimonohara | F16B 19/002 52/426 |
| 6,189,282 | B1 * | 2/2001 | VanderWerf | E04B 2/14 52/582.1 |
| 6,594,959 | B2 * | 7/2003 | Whitson | A01G 9/28 52/565 |
| 6,874,291 | B1 * | 4/2005 | Weber | E04B 2/705 446/124 |
| 7,410,328 | B2 | 8/2008 | Hamel | |
| 8,465,242 | B2 * | 6/2013 | Arendt | F16B 7/187 411/85 |
| 8,882,083 | B2 * | 11/2014 | Ramskov | E04G 21/3223 256/65.01 |
| 9,038,343 | B2 * | 5/2015 | Litaize | E04B 1/41 52/426 |
| 9,719,540 | B2 * | 8/2017 | Ou | A47B 96/1466 |
| 9,725,900 | B2 * | 8/2017 | Correia | E04B 2/32 |
| 9,726,464 | B2 | 8/2017 | Moberg | |
| 9,951,490 | B2 * | 4/2018 | Scherkl | E04C 1/00 |
| 9,995,327 | B2 * | 6/2018 | Hudson | E04H 1/1205 |
| 10,273,647 | B2 * | 4/2019 | Castonguay | E02D 29/025 |
| 10,408,252 | B2 * | 9/2019 | Reznar | F16B 37/046 |
| 11,085,650 | B2 * | 8/2021 | Prate | F16L 3/16 |
| 2008/0120905 | A1 | 5/2008 | Pai | |
| 2010/0018146 | A1 | 1/2010 | Aube et al. | |
| 2011/0072753 | A1 * | 3/2011 | MacDonald | E04C 1/395 52/592.1 |
| 2015/0247328 | A1 * | 9/2015 | Correia | E04C 1/395 52/745.1 |
| 2015/0275531 | A1 * | 10/2015 | Alcala Ordaz | E04B 2/8658 249/189 |
| 2015/0316085 | A1 * | 11/2015 | Zhang | F16B 7/0473 248/222.11 |
| 2016/0130780 | A1 * | 5/2016 | Castonguay | E02D 29/0233 405/284 |
| 2020/0181902 | A1 * | 6/2020 | Lacas | E04B 2/32 |

FOREIGN PATENT DOCUMENTS

| | | | |
|---|---|---|---|
| DE | 10 2005 005 240 A1 | 8/2006 | |
| EP | 943742 A1 | 9/1999 | |
| JP | 08165727 A | 6/1996 | |
| JP | H08-165727 A | 6/1996 | |
| JP | H11-141033 A | 5/1999 | |
| JP | 4081482 B2 | 4/2008 | |
| KR | 20-0394152 Y1 | 8/2005 | |
| KR | 10-1490788 B1 | 2/2015 | |

OTHER PUBLICATIONS

Extended European Search Report for Application No. 19803274.0 mailed Nov. 2, 2021, 11 pages.

* cited by examiner

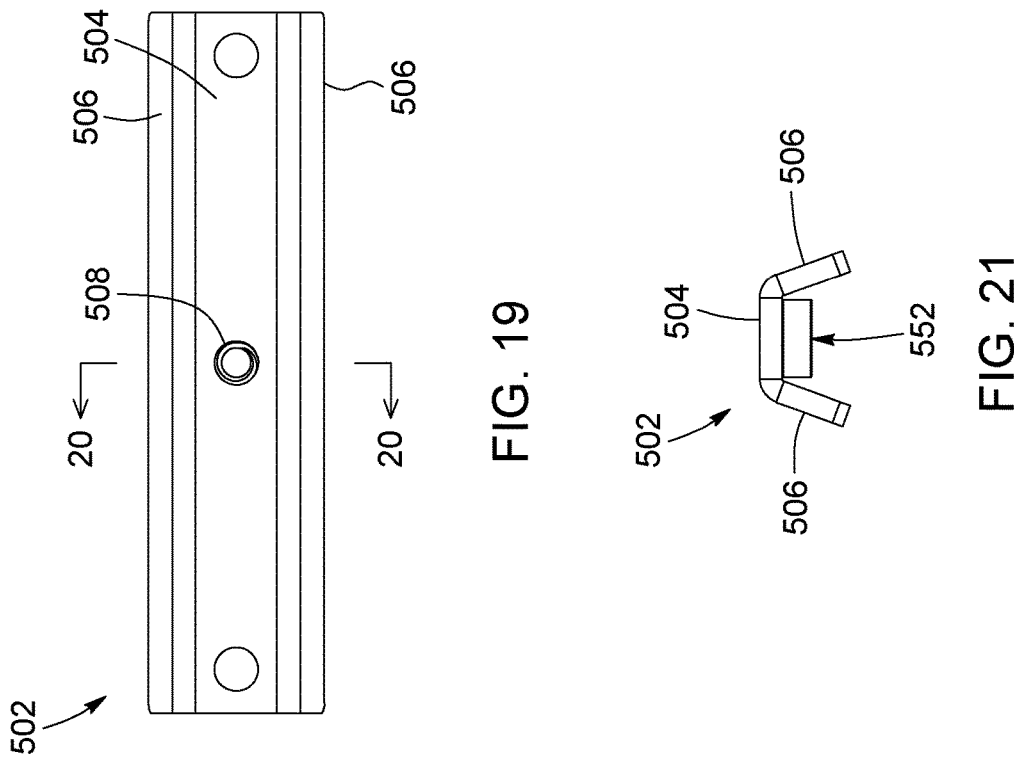
FIG. 19
FIG. 21
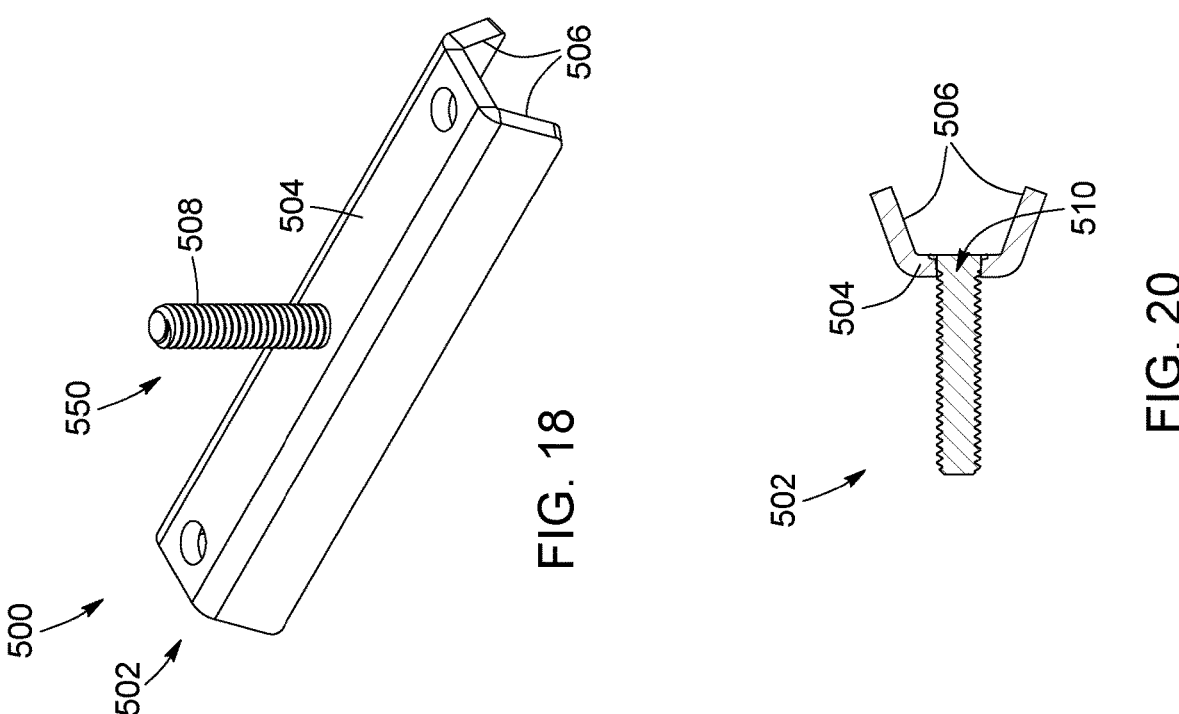
FIG. 18
FIG. 20

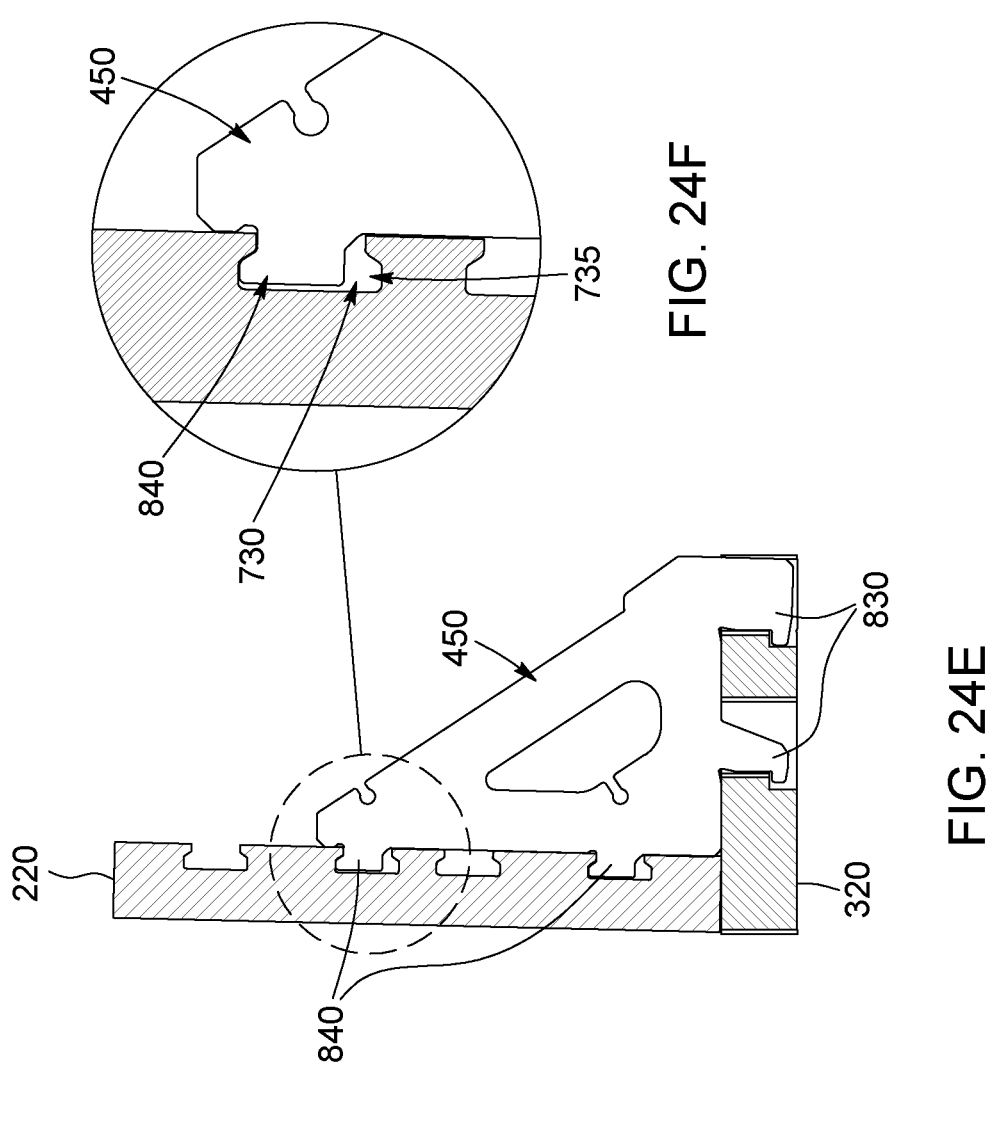
FIG. 24F
FIG. 24E
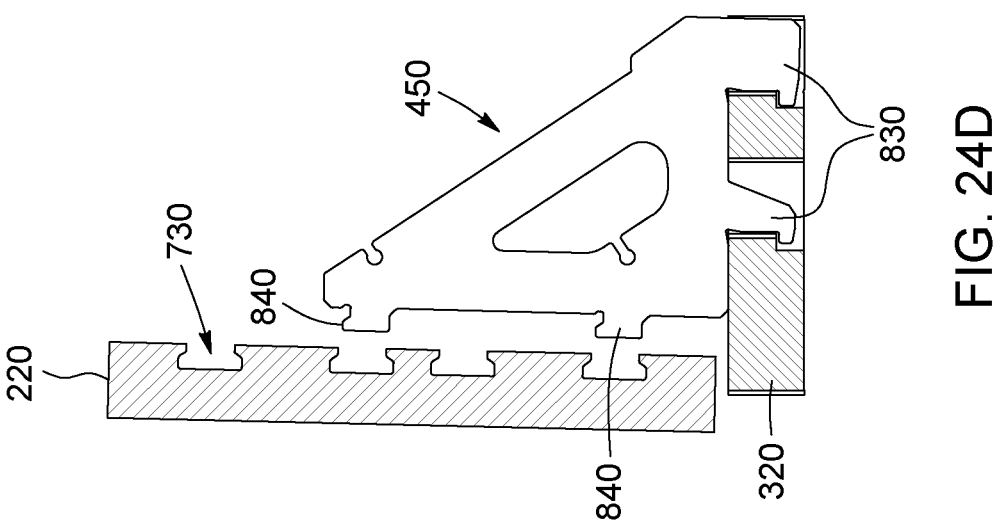
FIG. 24D

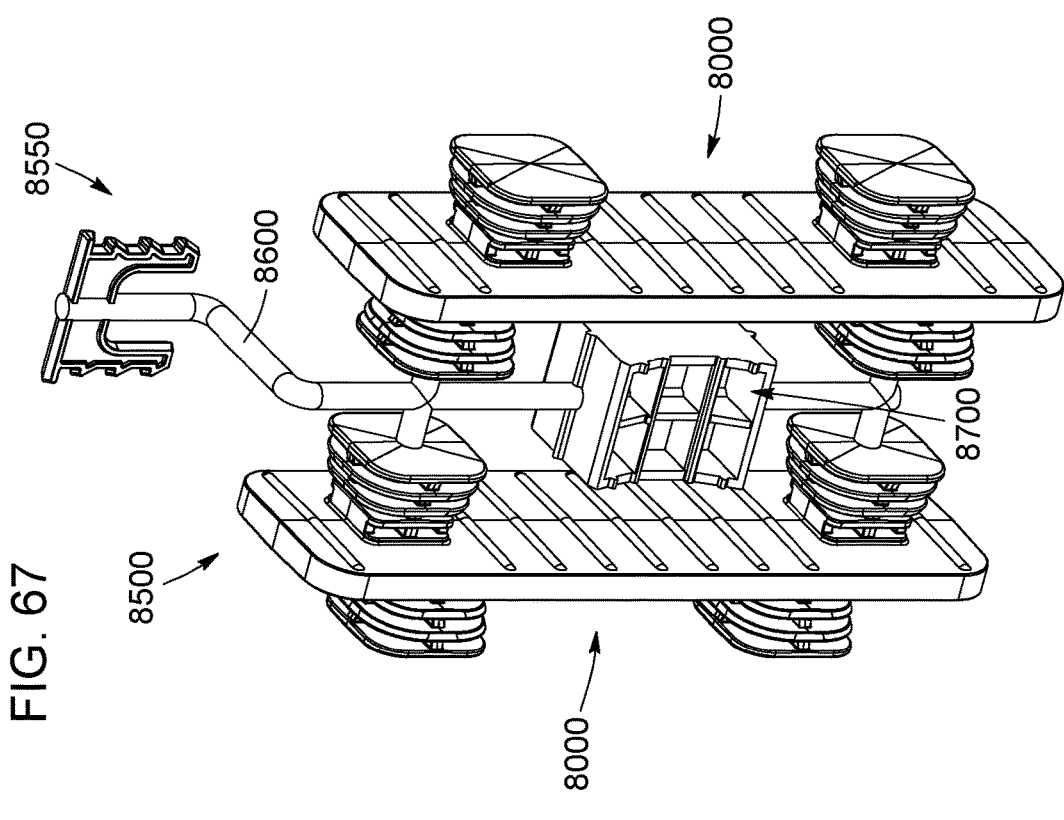
FIG. 67
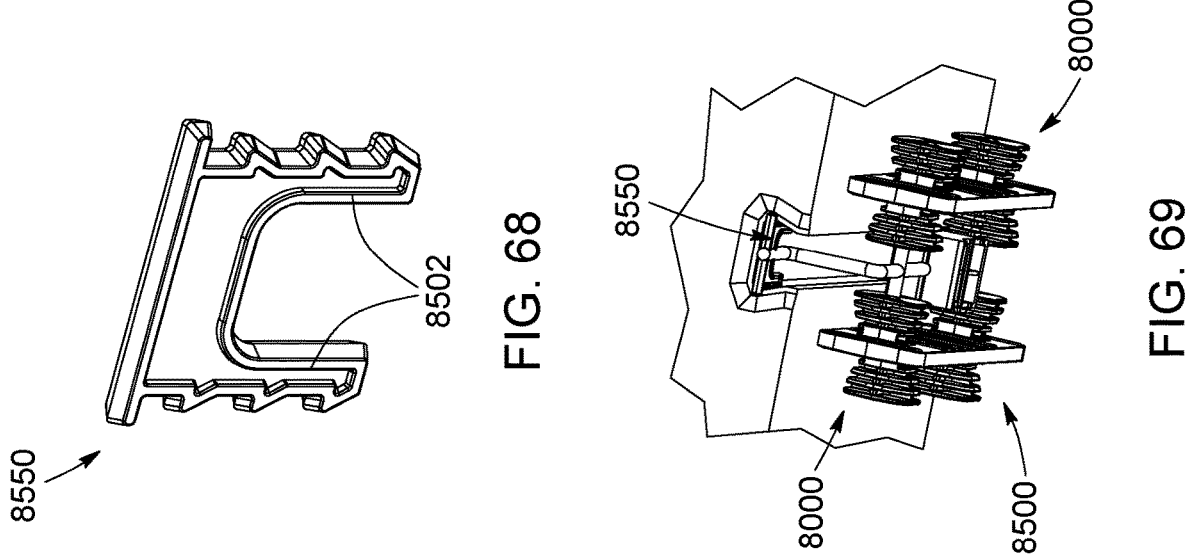
FIG. 68
FIG. 69

5502b

5700

5502a

MODULAR BUILDING SYSTEM FOR HARDSCAPE STRUCTURE

This application is a National Stage Application of PCT/CA2019/050658, filed 15 May 2019, which claims benefit of U.S. Patent Application Ser. No. 62/671,595, filed 15 May 2018 and U.S. Patent Application Ser. No. 62/724,669, filed 30 Aug. 2018 and which applications are incorporated herein by reference. To the extent appropriate, a claim of priority is made to each of the above disclosed applications.

TECHNICAL FIELD

The technical field generally relates to hardscape structures, and more specifically to modular building elements such as panels and wall units used to build various landscaping or hardscape structures. The technical field also relates to retaining walls built using modular building elements, to methods for building hardscape structures, to connecting assemblies for connecting together multiple modular building elements and to modular construction systems for building multiple hardscape structures and custom landscaping elements.

BACKGROUND

Recently, there has been a trend towards creating outdoor rooms and/or personalized landscapes. From large-scaled public and/or commercial landscaping applications to smaller residential landscaping applications there are several systems and methods available to install landscaping elements.

Existing systems and methods for providing concrete landscaping elements require different types of main/structural blocks, and different types of face/veneer blocks and connectors. An example of such system is described in U.S. Pat. No. 7,410,328. Another example of such systems may be found in some palisades such as those typically used in Germany. These palisades usually include a plurality of L-shaped wall pieces having a base which is buried in soil or a plurality of I-shaped wall pieces embedded in a concrete base. In both of these configurations, there are no mechanical links between the pieces. Furthermore, a distinct corner piece different from the wall pieces is required to join pieces disposed at a right angle and form a corner of a structure.

Other systems and method require poured-in-place concrete to consolidate the construction, and thus erecting the walls or palisades usually requires a cement mixer on site during the assembly and further requires a framework to be erected for the poured-in-place concrete, which requires significant labour. These types of cast-in-place structures also usually require a finishing operation, such as the usage of a stucco or other aesthetic finishing products.

SUMMARY

According to one aspect, there is provided a modular building system for building a hardscape structure, the system comprising: a plurality of preformed hardscape structure sections including: a first hardscape structure section including a first section face and at least one first section groove defined in the first section face; a second hardscape structure section having a second section face and at least one second section groove defined in the second section face, the second hardscape structure section being disposed adjacent the first hardscape structure section such that the second section face is adjacent the first section face; and a connecting member having a first engagement portion for engaging one of the at least one first section groove and a second engagement portion for engaging one of the at least one second section groove to thereby secure together the first and second hardscape structure sections.

In one embodiment, each groove includes a holding channel sized and shaped for receiving a corresponding engagement portion and an access slit for allowing access to the corresponding engagement portion received in the holding channel, the access slit being narrower than the corresponding engagement portion to prevent removal of the corresponding engagement portion from the holding channel through the access slit.

In at least some embodiments, each groove and each engagement portion has a dovetail-shaped cross-section.

In at least some embodiments, the holding channel includes an upper inner sidewall, a lower inner sidewall opposite the upper inner sidewall and a center inner sidewall extending between the upper and lower inner sidewalls and located opposite the access slit, the upper and lower inner sidewalls tapering towards each other from the center inner sidewall towards the access slit.

In at least some embodiments, each groove has a keyhole-shaped cross-section, the holding channel being cylindrical and the access slit being generally rectangular, the access slit being narrower than a diameter of the holding channel.

In at least some embodiments, each groove includes an outer groove portion having a trapezoidal cross-section and an inner groove portion defined in the outer groove portion and having a keyhole-shaped cross-section.

In at least some embodiments, the first hardscape structure section includes an upright wall panel having a rear face defining the first section face and a front face, and the second hardscape structure section includes a base slab having a top face defining the second section face and a bottom face, the connecting member being configured to connect the upright wall panel to the base slab such that the upright wall panel extends perpendicularly to the base slab.

In at least some embodiments, the rear and front faces of the upright wall panel extend parallel to each other.

In at least some embodiments, the top and bottom faces of the base slab extend parallel to each other.

In at least some embodiments, the upper wall panel includes left and right lateral faces extending between the rear and front faces and wherein the at least one first section groove includes a plurality of first section grooves extending horizontally between the left and right lateral faces and spaced away vertically from each other.

In at least some embodiments, the base slab includes left and right lateral faces extending between the top and bottom faces and wherein the at least one second section groove includes a plurality of second section grooves extending horizontally between the left and right lateral faces.

In at least some embodiments, the connecting member includes a support bracket for extending between the upright wall panel and the base slab, the support bracket having a side planar edge face and a bottom planar edge face extending perpendicularly to the first planar edge face, the side planar edge face being connectable to the top face of the base slab and the bottom planar edge face being connectable to the rear face of the upright wall panel.

In at least some embodiments, the support bracket comprises at least one side groove extending transversely across the side planar edge face, and wherein the first engagement portion includes an upright panel connector sized and shaped for engaging one of the at least one side groove of the support bracket and the first groove of the upright wall panel to thereby connect the support bracket to the upright wall panel.

In at least some embodiments, the support bracket comprises at least one bottom groove extending transversely across the bottom planar edge face, and wherein the second engagement portion includes a base connector sized and shaped for engaging one of the at least one bottom groove of the support bracket and the second groove of the base slab to thereby connect the support bracket to the base slab.

In at least some embodiments, the first engagement portion includes at least one side hook protruding from the side planar edge face, the side hook being sized and shaped to engage the first groove of the upright wall panel to connect the support bracket to the upright wall panel.

In at least some embodiments, the at least one side hook includes two side hooks.

In at least some embodiments, the second engagement portion includes at least one bottom hook protruding from the bottom planar edge face, the at least one bottom hook being sized and shaped to engage the second groove of the base slab to connect the support bracket to the base slab.

In at least some embodiments, the at least one bottom hook includes two bottom hooks.

In at least some embodiments, the base slab comprises a plurality of transverse members extending on either side of the base slab, the transverse members being provided with rabbeted edges, each bottom hook being adapted to engage a corresponding rabbeted edge.

In at least some embodiments, each rabbeted edge is defined in the bottom face of the base slab and is positioned away from the upright wall panel when the base slab is connected upright wall panel.

In at least some embodiments, the modular building system further comprises: a compression member configured to be disposed against the first and second section faces, in alignment with the connecting member, the compression member being connectable to the connecting member such that the compression member abuts the first and second section faces and frictionally engages the first and second section faces to prevent sliding longitudinal movement of the connecting member along the corresponding first and second section grooves in which the connecting member is received.

In at least some embodiments, the compression member is integrally formed with the connecting member.

In at least some embodiments, the modular building system further comprises at least one fastener for connecting together the connecting member and the compression member for maintaining the compression member in abutment against the first and second section faces.

In at least some embodiments, each fastener is adjustable so as to push the connecting member towards the compression plate.

In at least some embodiments, each fastener includes a threaded rod extending through the connecting member and through the compression member and a nut adapted to threadably engage the threaded rod and abut the compression member.

In at least some embodiments, each fastener includes a bolt having a head adapted to abut the connecting member.

In at least some embodiments, the compression member includes a compression plate having a first fastener opening sized and shaped to receive the first fastener and a second fastener opening sized and shaped to receive the second fastener.

In at least some embodiments, each fastener opening includes an elongated slot disposed parallel to a longitudinal axis of the compression plate.

In at least some embodiments, the compression plate is continuous and overlaps the first and second section faces.

In at least some embodiments, the compression member includes a first compression plate and a second compression plate distinct from the first compression plate, the first and second compression plates being adapted to respectively abut the first and second section faces, the first fastener opening being defined in the first compression plate and the second fastener opening being defined in the second compression plate.

In at least some embodiments, the compression member is configured to extend against the first and second section faces when the first and second wall portions are positioned such that the first and second section faces are coplanar.

In at least some embodiments, the connecting member includes a connector configured to be slidably received in the first section groove and in the second section groove and overlapping the first and second hardscape structure sections.

In at least some embodiments, the connection member includes a first connector defining the first engagement portion and a second connector distinct from the first connector and defining the second engagement portion.

In at least some embodiments, the at least one fastener includes a first fastener adapted to connect the first connector to the connecting member and a second fastener adapted to connect the second connector to the connecting member.

In at least some embodiments, the compression member is configured to extend against the first and second section faces when the first and second hardscape structure sections are positioned such that the first and second section faces are angled relative to each other.

In at least some embodiments, the connecting member includes a first connector engaging the first section groove, a second connector engaging the second section groove and a hinge connecting the first connector to the second connector to allow the connecting member to connect the first hardscape structure section to the second hardscape structure section.

In at least some embodiments, the hinge is a live hinge integrally formed with the first and second connectors.

In at least some embodiments, each hardscape structure section is L-shaped.

In at least some embodiments, each hardscape structure section includes an elongated panel portion and a base portion extending perpendicularly to the panel portion.

In at least some embodiments, each hardscape structure section includes a first lateral face configured to be placed against a corresponding lateral face of a first adjacent hardscape structure section and a second lateral face located opposite the first lateral face and configured to be placed against a corresponding lateral face of a second adjacent hardscape structure section.

In at least some embodiments, the first lateral face is parallel to the second lateral face.

In at least some embodiments, the first lateral face is angled relative to the second lateral face.

In at least some embodiments, the first and second hardscape structure sections are made of concrete.

In at least some embodiments, the first and second hardscape structure sections are made of a cementitious material.

According to another aspect, there is also provided a retaining wall comprising: a plurality of preformed hardscape structure sections including: an upper wall panel including a rear face and a front face and at least one first section groove defined in the rear face; a base slab extending perpendicularly to the upper wall panel, the base slab having a top face, a bottom face and at least one second section groove defined in the top face, the base slab being disposed adjacent the upper wall panel such that the top face of the base slab is adjacent the rear face of the upper wall panel; and a connecting member having a first engagement portion engaged in one of the at least one first section groove and a second engagement portion engaged in one of the at least one second section groove to thereby secure the upper wall panel to the base slab to thereby form the retaining wall.

According to yet another aspect, there is also provided a method for building a hardscape structure, the method comprising: providing a first hardscape structure section including a first section face; positioning a second hardscape structure section adjacent the first hardscape structure section such that a second section face of the second hardscape structure section is located adjacent the first section face; inserting a first engagement portion of a connecting member into a first section groove defined in the first section face of the first hardscape structure section; inserting a second engagement portion of the connecting member into a second section groove defined in the second section face of the second hardscape structure section to thereby connect the first hardscape structure section to the second hardscape structure section.

In at least some embodiments, the first hardscape structure section includes a base slab, and wherein providing the first hardscape structure section comprises: positioning the base slab horizontally on a ground surface such that a bottom face of the base slab faces downwardly and a top face of the base slab defining the first section face faces upwardly.

In at least some embodiments, the second hardscape structure section includes an upright wall panel, and wherein positioning the second hardscape structure section comprises: positioning the upright wall panel vertically above the base slab such that a front face of the upright wall panel faces away from the base slab and a rear face of the upright wall panel defining the second section face faces towards the base slab.

In at least some embodiments, the connecting member includes a support bracket configured for extending between the upright wall panel and the base slab.

In at least some embodiments, inserting the first engagement portion into the first section groove comprises: positioning the support bracket on the base slab such that a bottom planar edge face extends along the top face of the base slab and such that a bottom groove defined in the bottom planar edge face is aligned with the first section groove; inserting a base connector defining the first engagement portion in the aligned bottom and first section grooves.

In at least some embodiments, inserting the second engagement portion into the second section groove comprises: positioning the support bracket on the base slab such that a side planar edge face extends along the rear face of the upright wall panel and such that a side groove defined in the side planar edge face is aligned with the second section groove; inserting a wall connector defining the first engagement portion in the aligned side and second section grooves.

In at least some embodiments, the method further comprises, after inserting the second engagement portion into the second section groove: positioning a compression member against the first and second section faces, in alignment with the connecting member; connecting the compression member to the connecting member such that the compression member abuts the first and second section faces and frictionally engages the first and second section faces to prevent sliding longitudinal movement of the connecting member along the corresponding first and second section grooves.

In at least some embodiments, connecting the compression member to the connecting member comprises: fastening the compression member to the connecting member using at least one fastener.

According to yet another aspect, there is further provided a connecting assembly for connecting together a first hardscape structure section and a second hardscape structure section to form a hardscape structure, the first hardscape structure section including a first section face and a first groove defined in the first section face, the second hardscape structure section including a second section face and a second groove defined in the second section face, the assembly comprising: a connecting member having a first engagement portion for engaging the first section groove and a second engagement portion for engaging the second section groove when the first and second hardscape structure sections are positioned such that the first and second section faces are positioned adjacent each other; and a compression member configured to be disposed against the first and second section faces, in alignment with the connecting member, the compression member being connectable to the connecting member such that the compression member abuts the first and second section faces and frictionally engages the first and second section faces to prevent sliding longitudinal movement of the connecting member along the first and second section grooves.

In at least some embodiments, the compression member is integrally formed with the connecting member.

In at least some embodiments, the connecting assembly further comprises at least one fastener for connecting together the connecting member and the compression member for maintaining the compression member in abutment against the first and second section faces.

In at least some embodiments, each fastener is adjustable so as to push the connecting member towards the compression plate.

In at least some embodiments, each fastener includes a threaded rod extending through the connecting member and through the compression member and a nut adapted to threadably engage the threaded rod and abut the compression member.

In at least some embodiments, the compression plate is continuous and overlaps the first and second section faces.

In at least some embodiments, the compression member is configured to extend against the first and second section faces when the first and second wall portions are positioned such that the first and second section faces are coplanar.

In at least some embodiments, the connecting member includes a connector configured to be slidably received in the first section groove and in the second section groove and overlapping the first and second hardscape structure sections.

In at least some embodiments, the connection member includes a first connector defining the first engagement portion and a second connector distinct from the first connector and defining the second engagement portion.

In at least some embodiments, the compression member is configured to extend against the first and second section faces when the first and second hardscape structure sections are positioned such that the first and second section faces are angled relative to each other.

In at least some embodiments, the connecting member includes a first connector engaging the first section groove, a second connector engaging the second section groove and a hinge connecting the first connector to the second connector to allow the connecting member to connect the first hardscape structure section to the second hardscape structure section.

In at least some embodiments, the hinge is a live hinge integrally formed with the first and second connectors.

According to yet another aspect, there is also provided a modular building system for building multiple hardscape structures, the system comprising: a plurality of preformed hardscape structure sections, each hardscape structure section being L-shaped and including an elongated panel portion and a base portion extending perpendicularly to the panel portion, each hardscape structure including a plurality of grooves; a plurality of connecting members for engaging the grooves of adjacent hardscape structure sections to thereby connect together the hardscape structure sections, the grooves being arranged on each hardscape structure section to allow the hardscape structure sections to be selectively connected together in a first configuration defining a first structure and in a second configuration defining a second structure.

In at least some embodiments, the plurality of grooves includes at least one panel groove defined on the elongated panel portion and at least one base groove defined on the base portion.

In at least some embodiments, the first structure includes a wall.

In at least some embodiments, the second structure includes an enclosure.

In at least some embodiments, the hardscape structure sections are connected together mortarlessly.

BRIEF DESCRIPTION OF THE DRAWINGS

FIG. 18 is a perspective view of a connector for the modular building system illustrated in FIG. 16;

FIG. 19 is a top plan view of the connector illustrated in FIG. 18;

FIG. 20 is a cross-section view of the connector illustrated in FIG. 19, taken along line 20-20;

FIG. 21 is a side elevation view of the connector illustrated in FIG. 18, with the threaded rod removed and with a threaded insert secured within the central fastener opening of the connector;

FIG. 24A to 24F are side elevation views of the modular building system illustrated in FIG. 22, showing steps of a method of assembling the panel module in accordance with one embodiment;

FIG. 67 is a perspective view of the connector providing assembly illustrated in FIG. 66;

FIG. 68 is a perspective view of a hook member for the connector providing assembly illustrated in FIG. 66;

FIG. 69 is an enlarged view of a wall section and a connector providing assembly illustrated in FIG. 66, with the connector providing assembly engaging a groove of the wall section;

DETAILED DESCRIPTION

Figure 1:
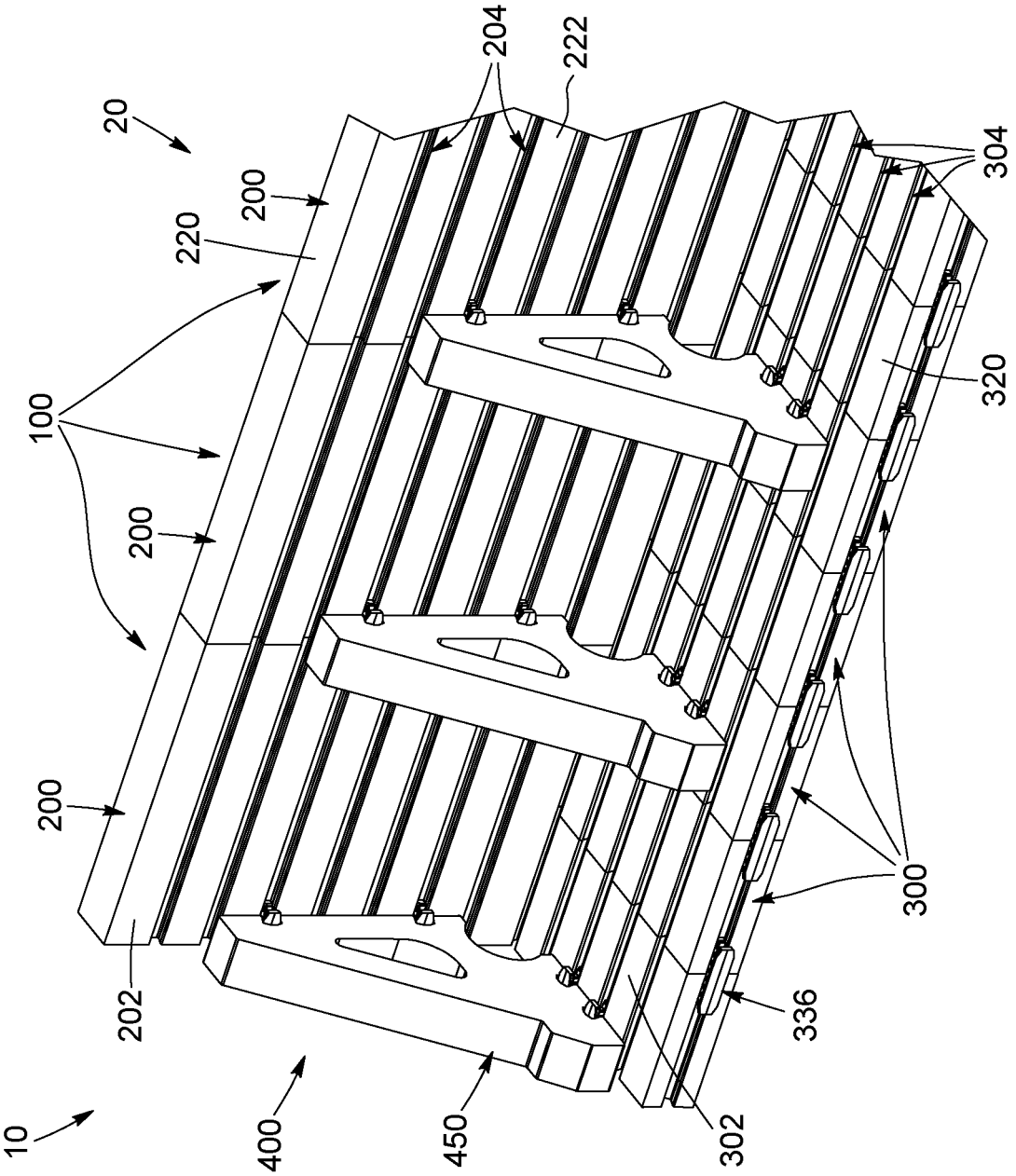
FIG. 1 is a perspective view of a hardscape structure built using a modular building system, according to one embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "top", "bottom", "forward", "rearward" "left", "right" and the like should, unless otherwise indicated, be taken in the context of the figures and correspond to the position and orientation in the modular building system and corresponding parts when being used. Positional descriptions should not be considered limiting.

Referring to FIGS. 1 to 10, there is shown a hardscape structure 20 built using a modular building system 10, in accordance with one embodiment.

In the following description, the term "hardscape structure" refers to any freestanding or self-supporting structure such as, but not limited to: retaining walls, dividing walls, garden furniture, garden appliances, outdoor enclosures, staircases, water basins, water fountains or any other feature for which the present modular building system 10 could be appropriate.

Furthermore, the term "hardscape structure" includes both structures found in public areas such as parks, on the roadside or the like and structures which may be built on a private property for functional and/or decorative purposes.

In the embodiment illustrated in FIGS. 1 to 11, the hardscape structure 20 includes a retaining wall, and more specifically a counterfort retaining wall which can be used in roadwork or for any other application in which it is desired to support soil mass laterally so that soil can be retained at different levels.

Still in the illustrated embodiment, the hardscape structure 20 is further made of a cementitious material. It will be understood that the term "cementitious material" as used herein refers to any solid material typically used in the building of hardscape structures and which includes at least some type of cement. The term "cementitious material" therefore refers to cement, dry concrete, wet concrete and all variations thereof, as opposed to other materials such as wood and metal.

The system 10 includes a plurality of preformed hardscape structure sections 100 which are connected together to form the hardscape structure 20. This eliminate the need to cast the hardscape structure sections or parts of the structure such as a base on-site. Instead, the sections 100 may be manufactured off-site, carried to a location where the structure 20 is to be installed and assembled to form the structure 20. The modularity of the system 10 also allows the user to build a variety of structures having various dimensions using the same basic standardized components. For example, the user could make the retaining wall longer or shorter simply by adding or removing structure sections as desired.

In the illustrated embodiment, the plurality of preformed hardscape structure sections 100 includes a first hardscape structure section 200 and a second hardscape structure section 300 positioned adjacent the first hardscape structure section 200. Specifically, the first hardscape structure section 200 includes a first section face 202 and the second hardscape structure section 300 includes a second section face 302 which, when the first and second hardscape structure sections 200, 300 are positioned adjacent each other, extend adjacent each other.

In the illustrated embodiment, the first hardscape structure section 200 is generally planar and is adapted to be positioned in a generally upright position to define an upright wall panel 220. Still in the illustrated embodiment, the second hardscape structure section 300 is also generally planar and is adapted to be positioned generally horizontally, perpendicularly to the upright wall panel 220, to define a base slab 320.

Figure 2:
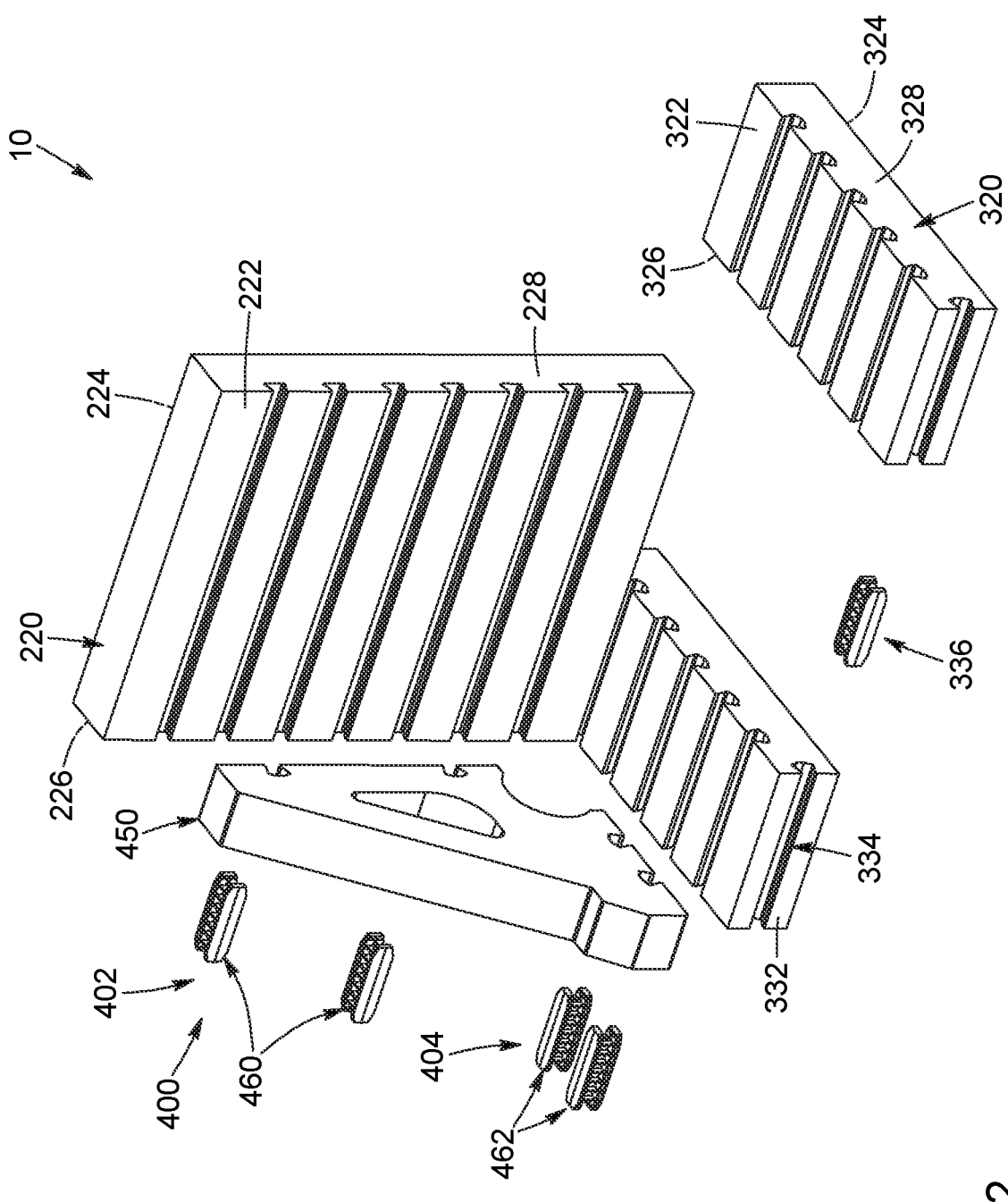
FIG. 2 is a partially exploded view of the modular building system illustrated in FIG. 1, showing an upright wall panel, two base slabs and a support bracket for connecting the base slabs to the upright wall panel.

The upper wall panel 220 has a rear face 222 defining the first section face 202, a front face 224 opposite the rear face 222 and left and right lateral faces 226, 228 extending between the rear and front faces 222, 224, as best shown in FIG. 2. In the illustrated embodiment, the rear and front faces 222, 224 of the upright wall panel 220 are planar and extend substantially parallel to each other. Alternatively, the rear and front faces 222, 224 could be angled relative to each other, or the front face 224 could not even be planar but could instead be curved or have any other suitable configuration.

Still in the illustrated embodiment, the left and right lateral faces 226, 228 also extend substantially parallel to each other. Alternatively, the left and right lateral faces 226, 228 could instead be angled relative to each other.

The upper wall panel 220 further includes a plurality of first section grooves 204 defined in the rear face 222 to allow the upper wall panel 220 to be connected to the base slab 320 so as to remain substantially perpendicular to the base slab 320, as will be further explained below. In the illustrated embodiment, the first section grooves 204 extend substantially parallel to each other. Specifically, when the upright wall panel 220 is positioned in an upright position, the first section grooves 204 extend horizontally between the left and right lateral faces 226, 228 and are spaced away vertically from each other. Alternatively, the first section grooves 204 could be arranged in any other configuration which a skilled person would consider to be suitable.

In one embodiment, the front face 224 of the upright wall panel 220 may be visible and decorative when the structure 20 is built, and the rear face 222 may remain hidden. Specifically, the front face 224 can be printed on to allow the appearance of the structure 20 to be customized. For example, the front face 224 can be colored using inkjet printers. Inkjet printed panels can allow for personalization of the exposed/front face of the structure 20 for various structures, such as garden walls having pictures printed thereon. Alternatively, the front face 224 could be decorated using another decoration technique, such as a color deposition system, face mix material, color jets, or using any other decoration technique which a skilled person would consider to be suitable. Alternatively, the front face 224 may not be decorated.

In the illustrated embodiment, the upright wall panel 220 is rectangular and is sized and shaped according to the structure 20 built using the upright wall panel 220. For example, the upright wall panel 220 could be square and have dimensions of 18 inches by 18 inches. Alternatively, the upright wall panel 220 could be rectangular and have dimensions of 18 inches by 24 inches. However, it should be understood that any other suitable dimension can be used. In other embodiments, the panel upright wall 220 can have a height greater than its width, or inversely having a width greater than its height. For example, the upright wall 220 can be 18 inches wide, and 24 inches, 30 inches or 36 inches tall. It should be understood that these dimensions are exemplary only and that any other suitable dimensions can be used. It will further be understood that although the upright wall panels 220 in FIG. 1 are all shown to be substantially identical, the system 10 could alternatively include multiple upright wall panels 220 of different shapes and/or sizes.

Figures 3, 4, 5:
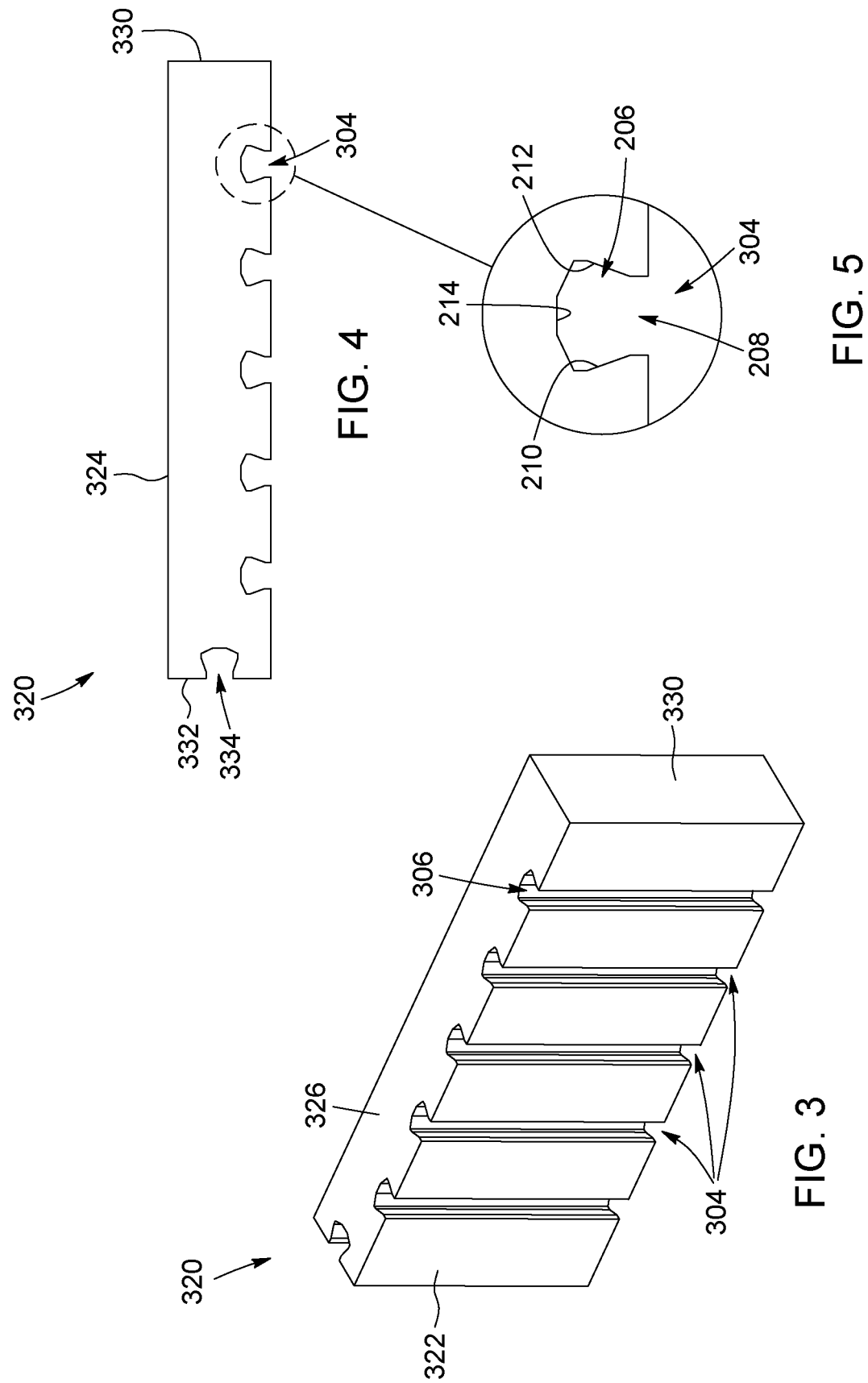
FIG. 3 is a perspective view of a base slab for the modular building system illustrated in FIG. 1.
FIG. 4 is a side elevation view of the base unit illustrated in FIG. 3, showing a plurality of base grooves arranged along surfaces of the base unit.
FIG. 5 is an enlarged view of the base unit illustrated in FIG. 4, taken from area 5, showing details of a second section groove of the base slab.

Referring specifically to FIGS. 3 to 5, the base slab 320 has a top face 322 defining the second section face 302, a bottom face 324 opposite the top face 322 and left and right lateral faces 226, 228 extending between the rear and front faces 222, 224. In use, the bottom face 324 typically faces toward or contacts a ground surface, and the top face 322 typically faces upwardly. In the illustrated embodiment, the top and bottom faces 322, 324 of the upright wall panel 220 are planar and extend substantially parallel to each other.

Still in the illustrated embodiment, the left and right lateral faces 326, 328 also extend substantially parallel to each other. Alternatively, the top, bottom and lateral faces 322, 324, 326, 328 could instead be angled relative to each other, or be arranged according to any other suitable configuration.

The base slab 320 further includes a plurality of second section grooves 304 defined in the top face 322 to allow the upper wall panel 220 to be connected to the upper wall panel 220 while remaining substantially perpendicular to the upper wall panel 220, as will be further explained below. In the illustrated embodiment, the second section grooves 304 extend substantially parallel to each other. Specifically, when the base slab 320 is positioned such that the bottom face 324 extends against the ground surface, the second section grooves 304 extend horizontally between the left and right lateral faces 326, 328 and are spaced away horizontally from each other. Alternatively, the second section grooves 304 could be arranged in any other configuration which a skilled person would consider to be suitable.

In the illustrated embodiment, the base slabs 320 are generally narrower than the upright wall panels 220, as shown in FIG. 1. Alternatively, the base slabs 320 could have the same width as the upright wall panels 220, or could be wider than the upright wall panels 220.

The upright wall panel 220 and the base slab 320 are connected together by a connecting member 400 which extends therebetween. More specifically, the connecting member 400 has a first engagement portion 402 for engaging at least one of the first section grooves 204 and a second engagement portion 404 for engaging at least one of the second section grooves 304 to thereby secure together the upright wall panel 220 and the base slab 320. Specifically, the first engagement portion 402 may slidably engage the at least one of the first section grooves 204 and the second engagement portion 404 could slidably engage the at least one of the second section grooves 304.

In the illustrated embodiment, the connecting member 400 includes a support bracket 450 which extends between the upright wall panel 220 and the base slab 320. Specifically, the support bracket 450 has a side planar edge face 452 and a bottom planar edge face 454 which extends perpendicularly to the first planar edge face 452. The side planar edge face 452 is connectable to the top face 322 of the base slab 320 and the bottom planar edge face 454 is connectable to the rear face 222 of the upright wall panel 220.

In the illustrated embodiment, the support bracket 450 comprises a plurality of side grooves 456 extending transversely across the side planar edge face 452. Specifically, the side grooves 456 are adapted, configured and positioned to align and face the first section grooves 204. Still in this embodiment, the first engagement portion 402 of the connecting member 400 includes an upright panel connector 460 which is sized and shaped for engaging at least one of the side grooves 456 of the support bracket 450 and a corresponding first section groove 204 of the upright wall panel 220 to thereby connect the support bracket 450 to the upright wall panel 220.

Similarly, the support bracket 450 further comprises a plurality of bottom grooves 458 extending transversely across the bottom planar edge face 454. Specifically, the bottom grooves 458 are adapted, configured and positioned to be aligned with and face the base grooves 150 of the base 100. The second engagement portion 404 of the connecting member 400 includes a base connector 462 sized and shaped for engaging at least one of the bottom grooves 458 of the support bracket 450 and a corresponding second section groove 304 of the base slab 320 to thereby connect the support bracket 450 to the base slab 320.

In the present embodiment, the first section grooves 204, second section grooves 304, side groove 456 and bottom grooves 458 are all substantially similarly sized and shaped. In this embodiment, the upright panel and base connectors 460, 462 may therefore also be substantially similarly sized and shaped. It will be appreciated that this configuration reduces the costs of manufacturing the system 100, as compared to a system in which the grooves and connectors would be sized and shaped differently from each other.

Still in this embodiment, the upright panel and base connectors 460, 462 are therefore interchangeable with each other. Alternatively, the upright panel and base connectors 460, 462 and the first section grooves 204, second section grooves 304, side groove 456 and bottom grooves 458 may be sized and shaped accordingly.

Referring specifically to FIGS. 3 to 5, the second section grooves 304 span across the entire width of the top face 322 of the base slab 320 between the left and right lateral faces 326, 328, defining base groove end openings 306 on either side of the base slab 320. Alternatively, the second section grooves 304 can span across a portion of the top face 322 such that the second section grooves 304 is not open at both ends, but only at one end, thereby defining a single base groove end opening. In yet another embodiment, the second section grooves 304 may not be open at any end.

In one embodiment, the second section grooves 304 are spaced from each other by a distance or pitch substantially equal to a thickness of the base slab 320. It should be understood that the "pitch" refers to the distance separating the center of a first groove with the center of an adjacent groove, and that the thickness of the base slab 320 corresponds to a distance between the top and bottom surfaces 322, 324 of the base slab 320. For example, in the illustrated embodiment, the second section grooves 304 are spaced from each other by a distance or pitch of about 3 inches. This configuration may be particularly useful to enhance the modularity of the modular building system 100, as well as to substantially minimize the number of cuts which need to be performed when installing the modular building system 100. Alternatively, the second section grooves 304 could be spaced from each other by a distance of more or less than about 3 inches.

Each base slab 320 further includes front and rear faces 330, 332 which extend between the top and bottom faces 322, 324, perpendicularly to the left and right lateral faces 326, 328. In the illustrated embodiment, the front and rear faces 330, 332 extend parallel to each other. Alternatively, the front and rear faces 330, 332 could instead be angled relative to each other.

In the illustrated embodiment, the base slab 320 further includes a rear groove 334 extending transversely across the rear face 332 between the left and right lateral faces 326, 328. The rear groove 334 is parallel to the top and bottom faces 322, 324, and therefore to the second section grooves 304. As shown in FIG. 1, the rear groove 334 could be sized and shaped to receive adjacent slab connectors 336, generally similar to the upright panel and base connectors 460, 462, extending between adjacent base slabs 320 to thereby connect the adjacent base slabs 320 together. Alternatively, the base slab 320 may include more than one rear groove 334, or may not include any rear grooves 334.

Figures 6, 7A, 7B:
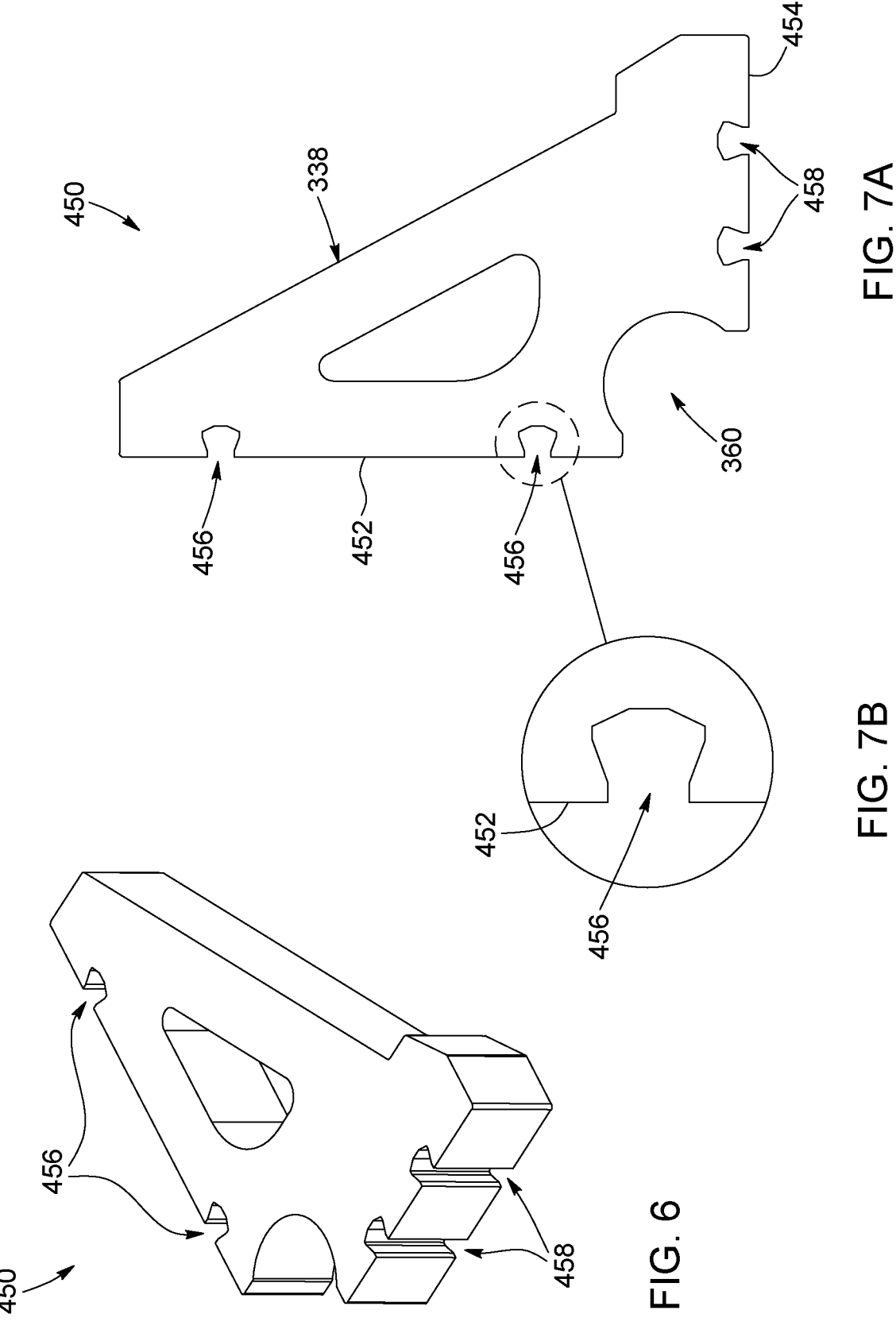
FIG. 6 is a perspective view of a support bracket for the modular building system illustrated in FIG. 1.
FIG. 7A is a side elevation view of the support bracket for the modular building system illustrated in FIG. 1.
FIG. 7B is an enlarged view of the support bracket illustrated in FIG. 7A, taken from area 7, showing details of a side groove of the support bracket.

Referring now to FIGS. 6 to 7B, in the illustrated embodiment, the support bracket 450 is made of a unitary body, and may further be made of the same material as the upright wall panel 220 and the base slab 320. For example, the support bracket 450, the upright wall panel 220 and the base slab 320 may all be made of concrete and may all be preformed or precast. In the illustrated embodiment, the support bracket 450 has a generally triangular shape, with the side planar edge face 452 and the bottom planar edge face 454 intersecting each other perpendicularly. The support bracket 450 further includes a support member 338 extending obliquely between the side planar edge face 452 and the bottom planar edge face 454. Still in the illustrated embodiment, the side planar edge face 452 is substantially longer than the bottom planar edge face 454. Alternatively, the bottom planar edge face 454 could be longer than the side planar edge face 452, or both edges could have the same length.

In the illustrated embodiment, the support bracket 450 further includes an access aperture or recess 370 provided at an intersection of the side planar edge face 452 and the bottom planar edge face 454. The recess 360 allows pipes, or other equipment, to extend transversely along a corner between the upright wall panels 220 and the base slabs 320. Alternatively, the support bracket 450 may not comprise an access recess. In yet another embodiment, the support bracket 450 could have any other configuration that a skilled person would consider to be suitable.

In the illustrated embodiment, the support bracket 450 further includes an access aperture or recess 370 provided at an intersection of the side planar edge face 452 and the bottom planar edge face 454. The recess 370 allows pipes, or other equipment, to extend transversely along a corner between the upright wall panels 220 and the base slabs 320. Alternatively, the support bracket 450 may not comprise an access recess. In yet another embodiment, the support bracket 450 could have any other configuration that a skilled person would consider to be suitable.

One of the second section grooves 304 will now be described, with specific references to FIG. 5. It will be understood that the same description applies to the other ones of the second section grooves 304, as well as to the first section grooves 204, side groove 456 and bottom grooves 458.

The second section groove 304 includes a holding channel 206 sized and shaped for receiving a corresponding connector 460, 462 and an access slit 208 for allowing access to the corresponding engagement portion 402, 404 received in the holding channel 206. Specifically, the access slit 208 is narrower than the corresponding engagement portion 402, 404 to prevent removal of the corresponding engagement portion 402, 404 from the holding channel 206 through the access slit 208.

In the embodiment illustrated in FIGS. 1 to 11, the second section groove 304 has a dovetail-shaped cross-section. More specifically, the holding channel 206 of the second section groove 304 includes a first inner sidewall 210, a second inner sidewall 212 opposite the upper inner sidewall 210 and a center inner sidewall 214 extending between the first and second inner sidewalls 210, 212 and located opposite the access slit 208, the first and second inner sidewalls 210, 212 tapering towards each other from the center inner sidewall 214 towards the access slit 208.

Alternatively, the first section grooves 204, second section grooves 304, side groove 456 and bottom grooves 458 could have another configuration that a skilled person would consider to be suitable to receive the corresponding connector 460, 462 to prevent removal of the connector 460, 462 from the holding channel 206.

Figures 8, 9, 10:
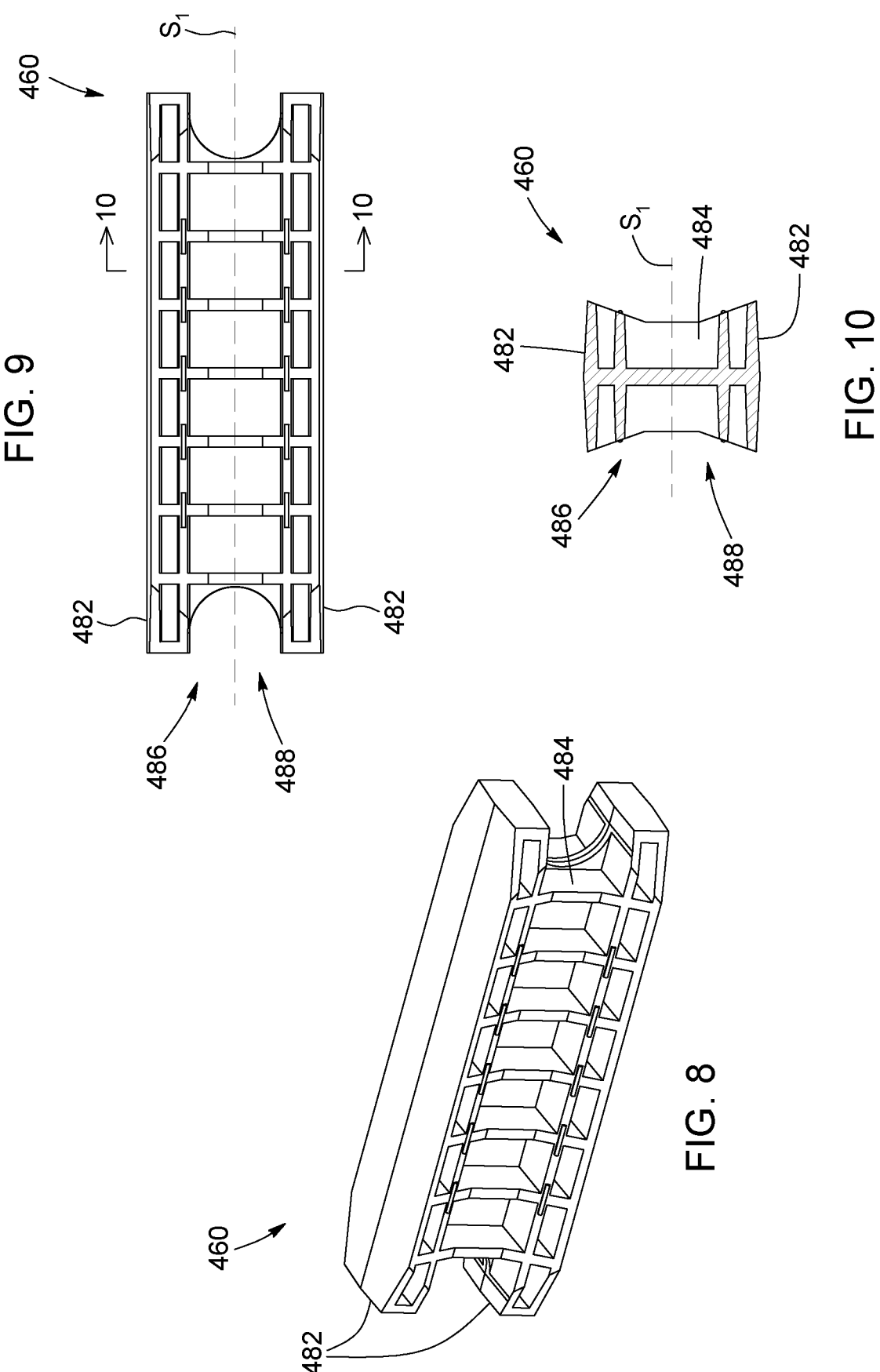
FIG. 8 is a perspective view of a connector for the modular building system illustrated in FIG. 1, in accordance with one embodiment.
FIG. 9 is a side elevation view of the connector illustrated in FIG. 8, showing extensions extending from the elongated body on either side thereof.
FIG. 10 is a cross-sectional view of the connector illustrated in FIG. 9, taken along cross-section line 10-10.

Referring to FIGS. 8 to 10, each connector 460, 462 includes an elongated body 480 having a pair of engagement plates 482 which extend generally parallel to each other and a central body portion 484 which extends between the engagement plates 482.

As best shown in FIG. 10, the central body portion 484 is generally narrower than the engagement plates 482. Specifically, each engagement plate 482 has a cross-section which substantially tapers towards the central body portion 484. The elongated body 480 is further generally symmetrical about a longitudinal symmetry plane Si which is substantially parallel to the engagement plates 482 and which extends through a center of the central body portion 484. The longitudinal symmetry plane Si further separates the connector 460, 462 into first and second connector portions 486, 488.

Figure 11:
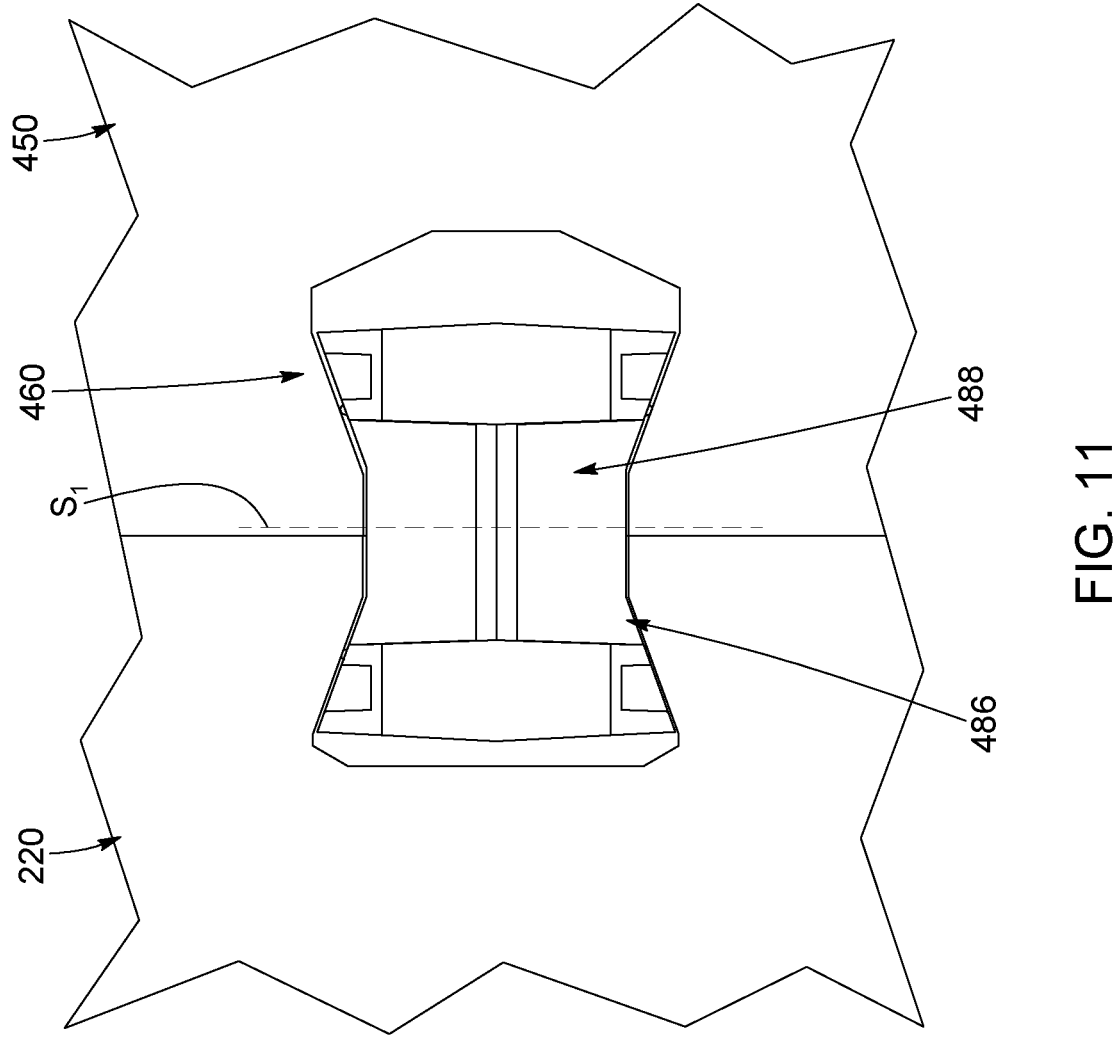
FIG. 11 is an enlarged cross-sectional view of the hardscape structure illustrated in FIG. 1, showing an upright wall connector engaging a first section groove and a corresponding side groove of the bracket.

Turning now to FIG. 11, the first and second connector portions 486, 488 are sized and shaped to engage corresponding grooves which are aligned with each other to thereby connected together adjacent components. In the illustrated embodiment, the upright panel connector 460 is shown connecting the support bracket 450 to the upright wall panel 220. Specifically, the first connector portion 486 engages the corresponding first section groove 204 of the upright wall panel 220 and the second connector portion 488 engages the corresponding side groove 456 of the support bracket 450. Still in the illustrated embodiment, the first and second connector portions 486, 488 are sized and shaped to be snuggly received in the holding channel 206 of the corresponding groove 204, 456, but are larger than the access slit 208 of the corresponding groove 204, 456. As shown in FIG. 11, in this configuration, the support bracket 450 is therefore prevented from moving away from the upright wall panel 220, and the support bracket 450 is therefore connected to the upright wall panel 220.

In one embodiment, the first and second connector portions 486, 488 may be inserted within the corresponding grooves by sliding the connector portion 486, 488 in one of the groove end openings 306 of the corresponding groove. The first and second connector portions 486, 488 may be configured to freely slide within the grooves, or may create friction with the groove such that the first and second connector portions 486, 488 must be forced into position manually or using a tool such as a hammer or the like.

In some embodiments, the connectors 460, 462 are made of a plastic polymer which can advantageously be molded into the desired shape, may be substantially resistant to wear and may be relatively inexpensive to manufacture. Alternatively, the connector 410 could be made of a metal or of any other suitable material.

To build the structure 20, the support bracket 450 can be connected to the base slab 320 by inserting base connectors 462 in opposing second section and bottom grooves 304, 458. The upright wall panel 220 can then be positioned on the base slab 320 and connected to the support bracket 450 by inserting upright panel connectors 460 in opposing first section and side grooves 204, 456, thereby connecting the upright wall panels 220 to the base slabs 320.

In the illustrated embodiment, when the base slabs 320 are placed adjacent each other, the rear grooves 160 of the base slabs 320 are aligned. In this embodiment, each base slab 320 is also mechanically linked to an adjacent base slab 320 via the adjacent slab connectors 336 engaging each corresponding rear groove 160 and overlapping adjacent base slabs 320, as shown in FIG. 1.

In the illustrated embodiment, the upright wall panel 220 is further positioned relative to an adjacent wall panel 220 such that the rear faces 222 of the adjacent upright wall panels 220 are coplanar with each other and the first section grooves 204 of the adjacent upright wall panels 220 are aligned with each other. Still in the illustrated embodiment, the support bracket 450 are positioned so as to overlap adjacent upright wall panels 220. The upright panel connectors 460 therefore further engage and connect together the adjacent upright wall panels 220. Alternatively, the support bracket 450 may not overlap adjacent upright wall panels 220.

Referring now to FIGS. 12 to 15, there is shown a modular building system 100, in accordance with another embodiment.

In this embodiment, the base slabs 320, the upright panel connector 460 and the base connector 462 are substantially similar to the base slabs 320, the upright panel connector 460 and the base connector 462 illustrated in FIGS. 1 to 11.

In this embodiment, the upright wall panels 220 are substantially higher than the upright wall panels 220 illustrated in FIGS. 1 to 13. For example, in this embodiment, the upright wall panels 220 could have dimensions of 18 inches by 30 inches or, alternatively, of 18 inches by 36 inches. The support brackets 450 are also generally similar to the support bracket 450 illustrated in FIGS. 1 to 11, but the side planar edge face 452 is substantially longer than the side planar edge face 452 of the support bracket 450 illustrated in FIGS. 1 to 11. It will be understood that the support member 338 is therefore also substantially longer than the support member 338 of the support bracket 450 illustrated in FIGS. 1 to 11. In the embodiment illustrated in FIGS. 12 to 15, the support bracket 450 further includes a secondary support member 335 extending generally between the support member 338 and the side planar edge face 452 to provide additional structural support.

Figure 12:
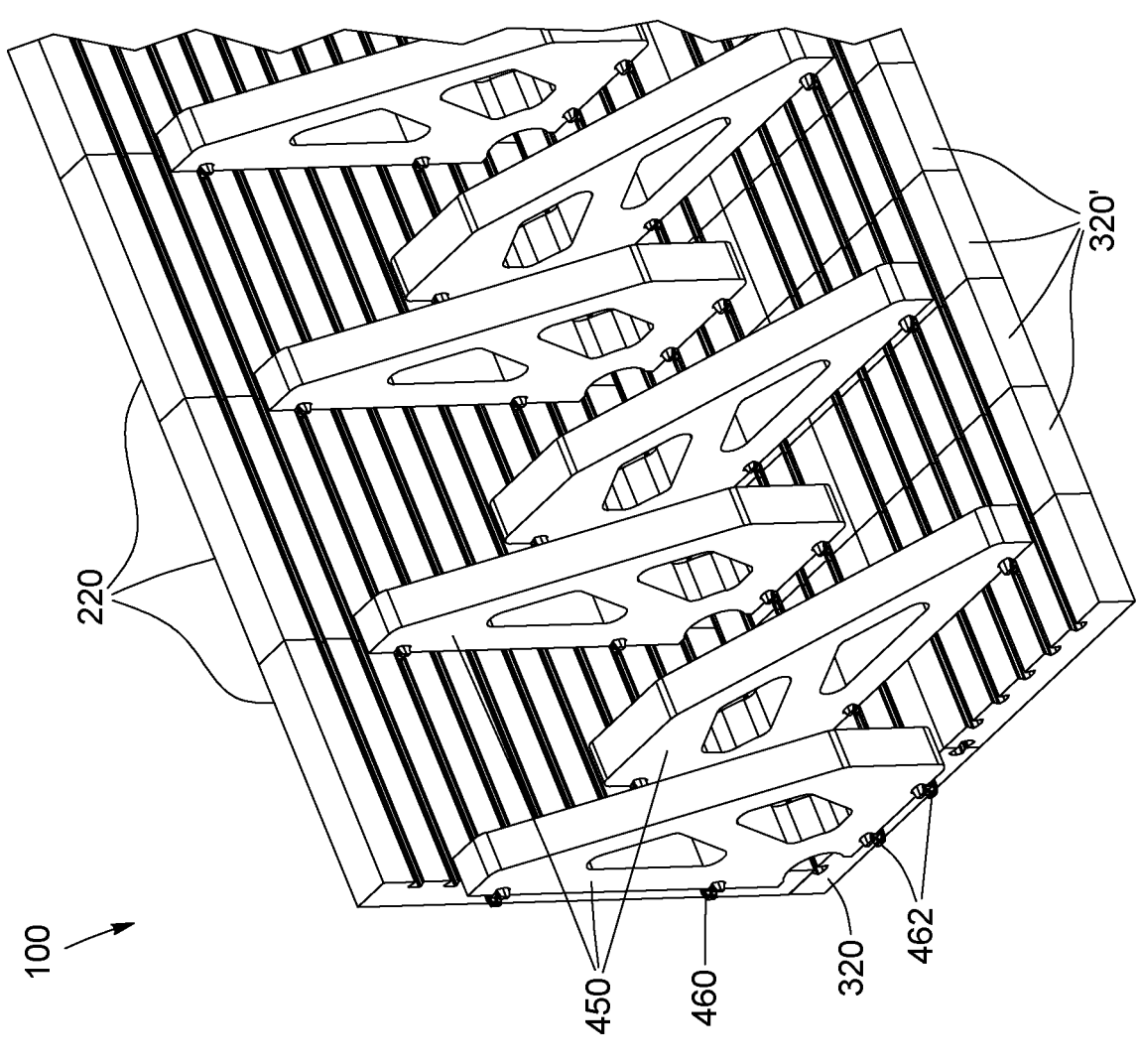
FIG. 12 is a perspective view of a hardscape structure built using a modular building system, according to another embodiment, in which the support brackets are disposed alternately in a standard orientation and in a reverse orientation.
Figure 13:
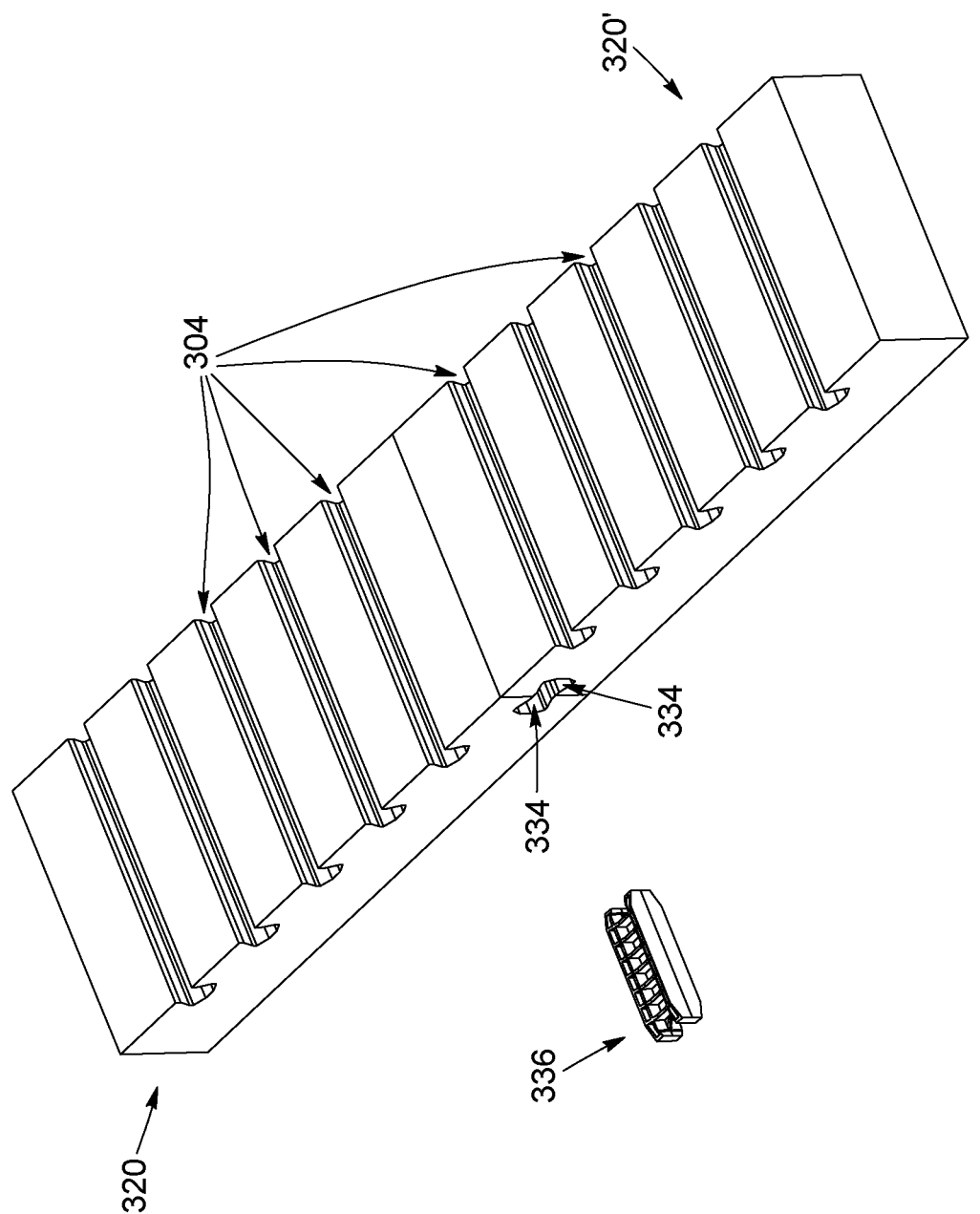
FIG. 13 is a perspective view of a base slab for the modular building system illustrated in FIG. 12, partially exploded to show a connector for engaging first and second base slab portions to form the base slab.
Figure 15:
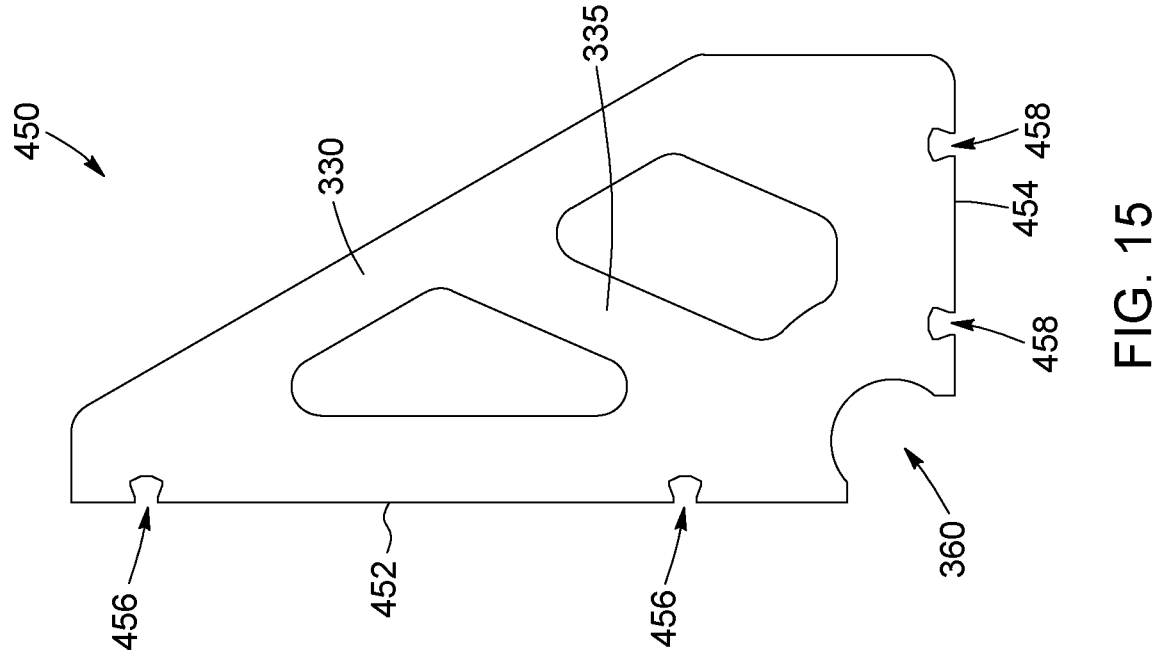
FIG. 15 is a side elevation view of the support bracket for the modular building system illustrated in FIG. 12.
Figure 14:
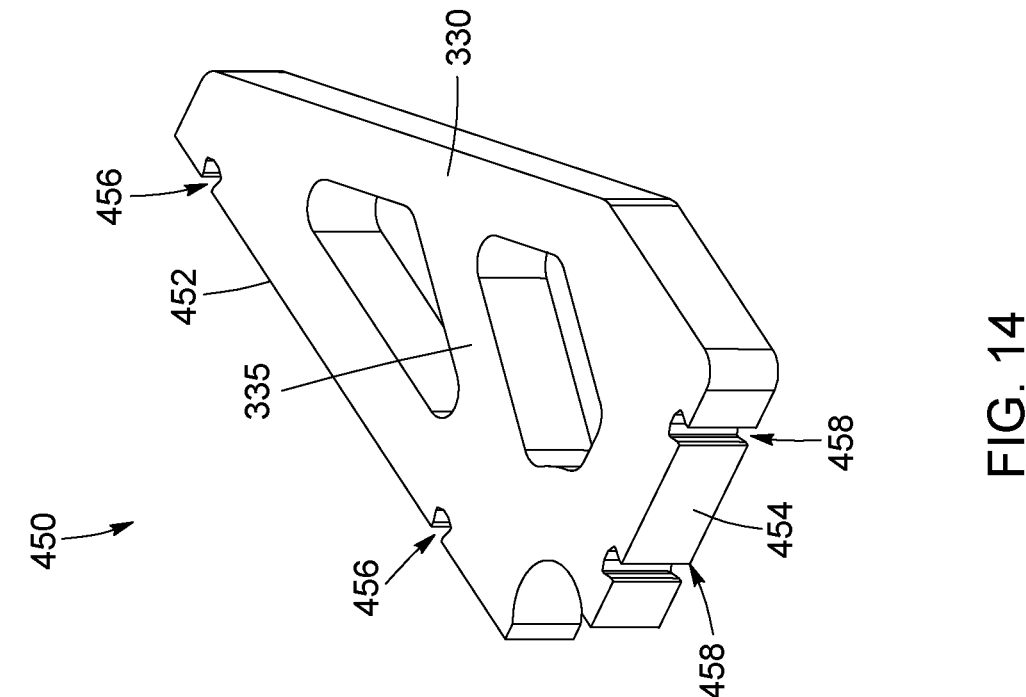
FIG. 14 is a perspective view of a support bracket for the modular building system illustrated in FIG. 12.

Still in this embodiment, another base slab 320' can be positioned adjacent the base slab 320 with the rear faces 332 of both base slabs 320, 320' extending against each other such that the rear grooves 334 face each other to thereby provide the structure 20 with an extended base. Specifically, the base slabs 320, 320' can be connected together using an adjacent slab connector 336 engaging both rear grooves 334 in the same manner as previously described. When the base slabs 320, 320' in this manner to form an extended base, the support bracket 450 can be installed in a reversed configuration in which the planar edge face 454 contacts the upright wall panel 220 and the side planar edge face 452 contacts the base slab 320. Furthermore, as shown in FIG. 12, the support brackets 450 can alternately be disposed in a standard orientation and in a reverse orientation to form a composite counterfort wall which may provide additional support for the upright wall panels 220, which can be useful and/or required when using larger upright wall panels 220 (e.g., panels of 18 inches by 36 inches) for example.

Referring now to FIGS. 16 to 21, there is shown the modular building system 10 including a plurality of connectors 500, in accordance with another embodiment. The connectors 500 can be used to connect together the support bracket 450 and the upright wall panels 200, the support bracket 450 and the base slabs 320 and/or adjacent upright wall panels 220 or adjacent base slabs 320. In one embodiment, the connectors 500 can be used interchangeably with the upright panel connector 460, the base connector 462 and/or the adjacent slab connectors 336. In one embodiment, the upright panel connector 460, the base connector 462 and the adjacent slab connectors 336 as described above and the connectors 500 can all be used in the same modular building system 10.

In this embodiment, each connector 500 includes a first connector body 502 manufactured from a sheet of pliable material such as metal which has been bent to define a generally rectangular central wall 504 and a pair of lateral walls 506 which are angled relative to the central wall 504. As best shown in FIG. 21, the central wall 504 and the lateral walls 506 together define a trapezoidal cross-section corresponding to the cross-section of the holding channel 206 of the grooves 204, 304, 456, 458, thereby allowing the connector 500 to be received in one of the grooves 204, 304, 456, 458 and to be slidably moved along the groove 204, 304, 456, 458 while being prevented from being pulled out from the groove 204, 304, 456, 458 through the access slit 208.

Figures 16, 17:
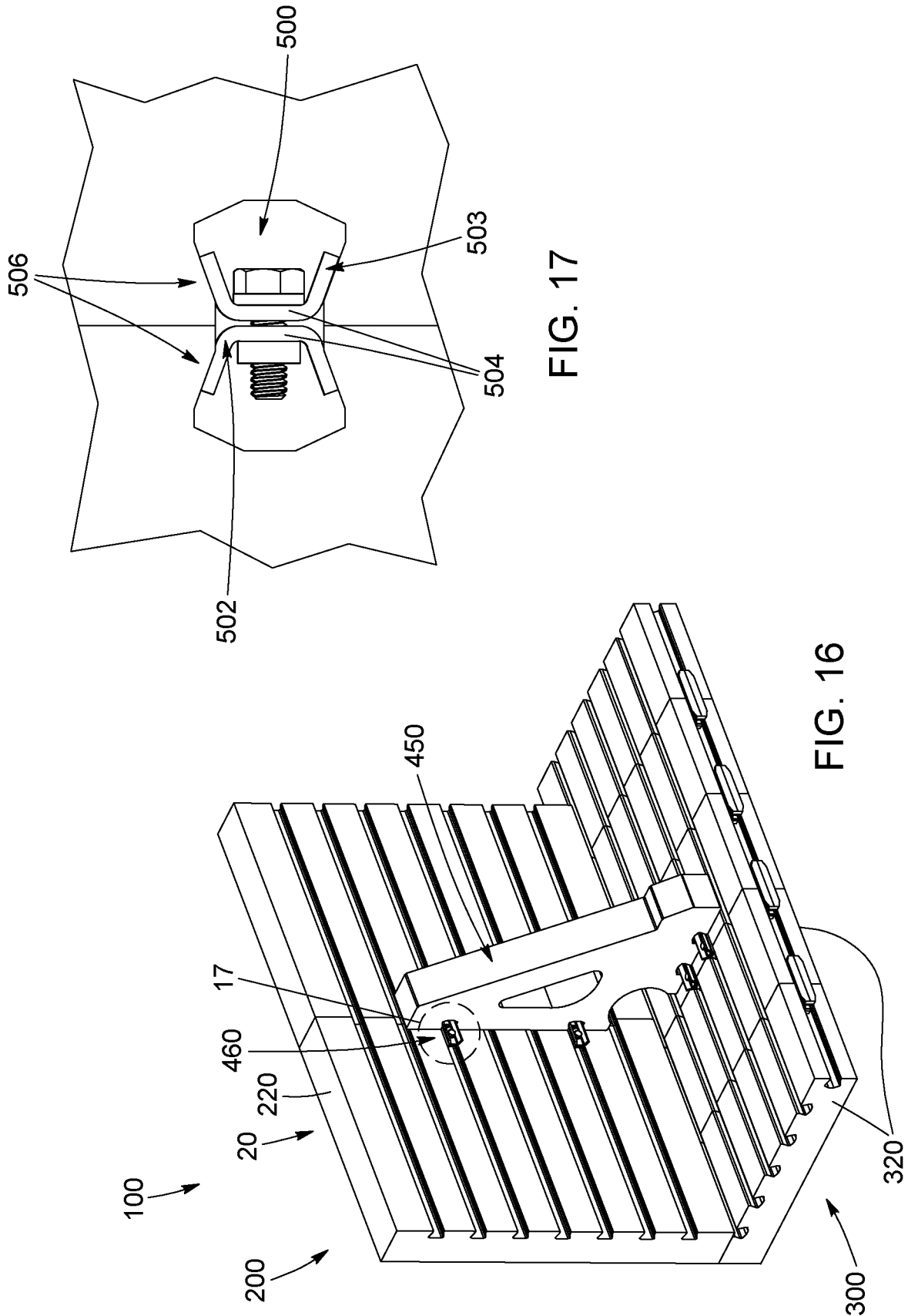
FIG. 16 is a perspective view of a hardscape structure built using a modular building system including a plurality of connectors, in accordance with another embodiment.
FIG. 17 is an enlarged view of the hardscape structure illustrated in FIG. 16, taken from area 17, showing a connector connecting a support bracket to a wall panel of the modular building system.

Still in this embodiment, the connector 500 further includes a second connector body 503 which is substantially similar to the first connector body 502. In this embodiment, the second connector body 503 is placed against the first connector body 502 such that the central wall 504 of the first and second connector bodies 502, 503 abut each other and the lateral walls 506 of the first and second connector bodies 502, 503 extend away from each other, as best shown in FIG. 17. The connector 500 further includes a fastener 550 for securing together the first and second connector bodies 502, 503. The fastener 550 includes a threaded rod 508 which extends away from the central wall 504 and generally perpendicularly to the central wall 504. In the illustrated embodiment, the connector 500 includes a central fastener opening 510 defines in the central wall 504 and a pair of side fastener openings 512 located on either side of the central fastener opening 510. As shown in FIG. 20, the threaded rod 508 may be inserted through the central fastener opening 510 and abut an inner shoulder defined in the central fastener opening 510 to prevent the threaded rod 508 from fully passing through the central wall 504. Alternatively, the threaded rod 508 may threadably engage corresponding inner threads defined in the central fastener opening 510. In yet another embodiment, the threaded rod 508 may be welded or secured to the connector body 502 using an adhesive or by crimping such that the threaded rod 508 becomes integrated with the connector 500.

Alternatively, as shown in FIG. 21, the connector 500 may include a threaded insert 552 which is secured within the central fastener opening 510 and which thereby provides a threaded connection with the threaded rod 508. Similarly to the threaded rod 508, the insert 552 could further be attached to the connector 500 by crimping or using another appropriate securing method.

Referring now to FIGS. 22 to 24F, there is shown the modular building system 10, in accordance with another embodiment.

In this embodiment, the support brackets 450 are configured for engaging directly the upright wall panels 220 and the base slabs 320, without requiring the use of the upright panel and base connectors 460, 462. Specifically, in this embodiment, each base slab 320 includes a base unitary body 601 having a top face 610 opposite a bottom face 620, and transverse members 630 extending outwardly from the unitary body 601 in opposite directions. In the illustrated example, the base slab 320 includes four transverse members 630 arranged in parallel pairs on each side of the unitary body 601. Each pair of transverse members 630 can be spaced from each other to form a partial opening 632 therebetween. Additionally, each transverse member 630 can include a stepped or rabbeted edge 634 provided on the bottom face 620 of the unitary body 601. When connecting adjacent base slabs 320 together, the transverse members 630 of each base slab 320 contacts the corresponding transverse members 630 of the adjacent base slab 320. In this configuration, the partial openings 632 of the adjacent base slabs 320 are aligned with each other to define a complete hook opening 633 in the top face 610 of the base slab 320 to provide access to the rabbeted edge 634 below.

In this embodiment, the support bracket 450 includes a unitary body 801 having a bottom edge 810 and a side edge 820, respectively connectable to the base slab 320 and the upright wall panel 220. The support bracket 450 further includes hooks integrally formed as part of the bracket unitary body 801 to connect the support bracket 450 to the base slab 320 and the upright wall panel 220. More specifically, the support bracket 450 includes a pair of bottom hooks 830 protruding from the bottom edge 810 and a pair of side hooks 840 protruding from the side edge 820. The side hooks 840 are configured for engaging the upright wall panel 220 and therefore define the first engagement portion 402 of the connecting member 400, and the bottom hooks 830 are configured for engaging the base slabs 320 and therefore define the second engagement portion 404 of the connecting member 400.

In this embodiment, the support bracket 450 can be connected to the base slab 320 via the bottom hooks 830 engaging the rabbeted edges 634 of the transverse members 630 through the hook openings 633 in the top face 610 of the base slab 320. It will be understood that the hook openings 633 and the rabbeted edges 634 therefore define the second section grooves 304 of the base slab 320.

It will be appreciated that providing two bottom hooks 830 to connect the support bracket 450 to the base slab 320 may contribute to preventing rotation of the support bracket 450 relative to the base slab 320 when installed. Alternatively, the support bracket 450 may include a single bottom hook or more than two bottom hooks 830.

In this embodiment, each upright wall panel 220 include a front face 710 opposite a rear face 720 and a plurality of panel grooves 730 defined on the rear face 720. Specifically, the panel grooves 730 are shaped and sized to allow insertion of the side hooks 840 of the support bracket 450 therein. In the illustrated example, the side hooks 840 are adapted to extend upwardly within the panel grooves 730 to effectively hook onto the upright wall panel 220. However, the side hooks 840 could instead be configured to extend downwardly within the panel grooves 730. It should thus be understood that the panel grooves 730 are preferably provided with an alcove or recess for receiving the side hooks 840 therein. In this embodiment, the panel grooves 730 have a dovetail-shaped cross-section. Furthermore, the panel grooves 730 are adapted to align with corresponding panel grooves 730 of adjacent upright wall panels 220. The support bracket 450 can therefore be adapted to secure adjacent upright wall panels 220 to each another by having the side hooks 840 extend within aligned panels grooves 730 of two adjacent upright wall panels 220 such that the support bracket 450 overlaps both the adjacent upright wall panels 220.

Figure 22:
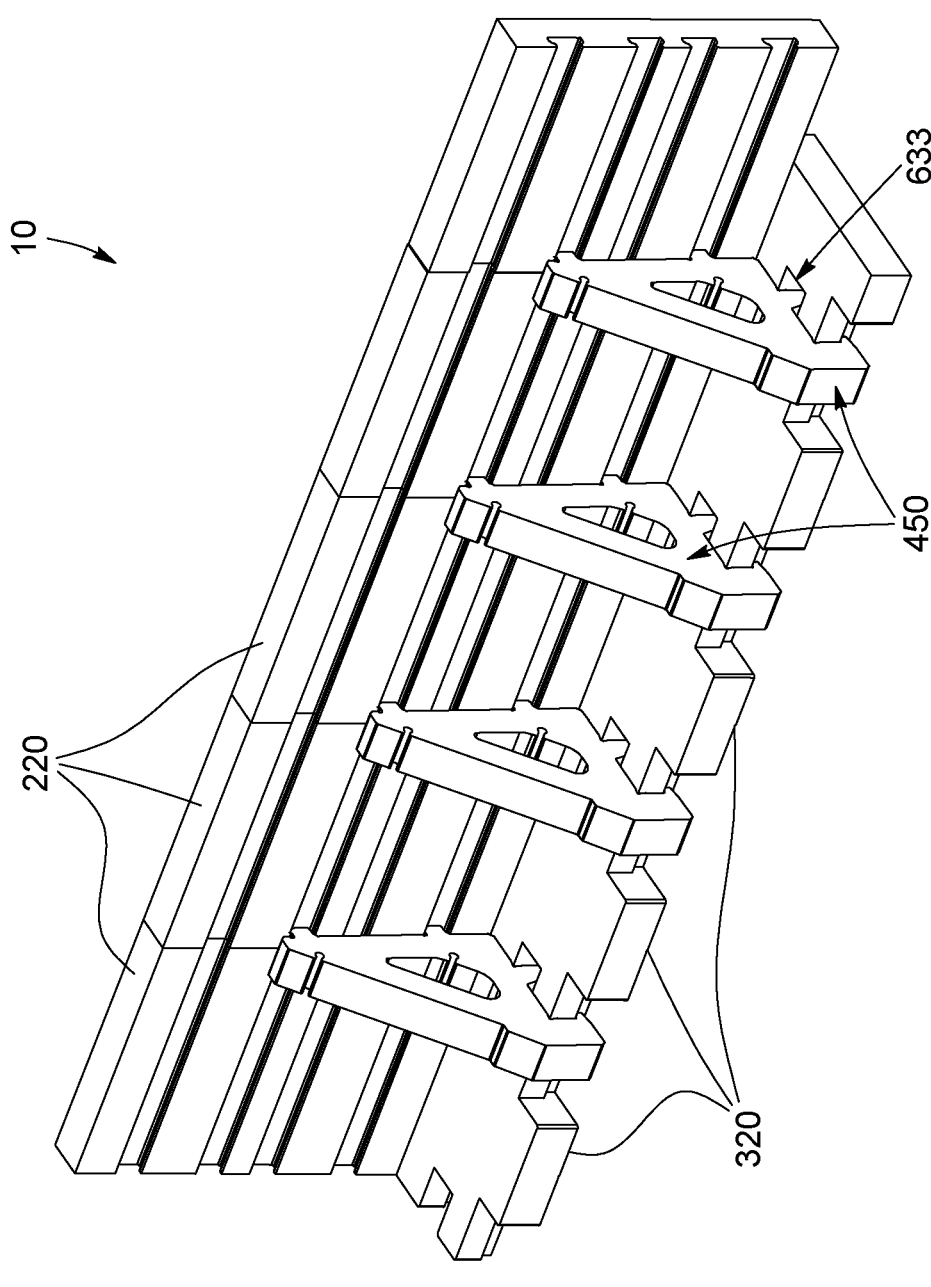
FIG. 22 is a perspective view of a hardscape structure built using a modular building system, according to another embodiment.
Figure 23:
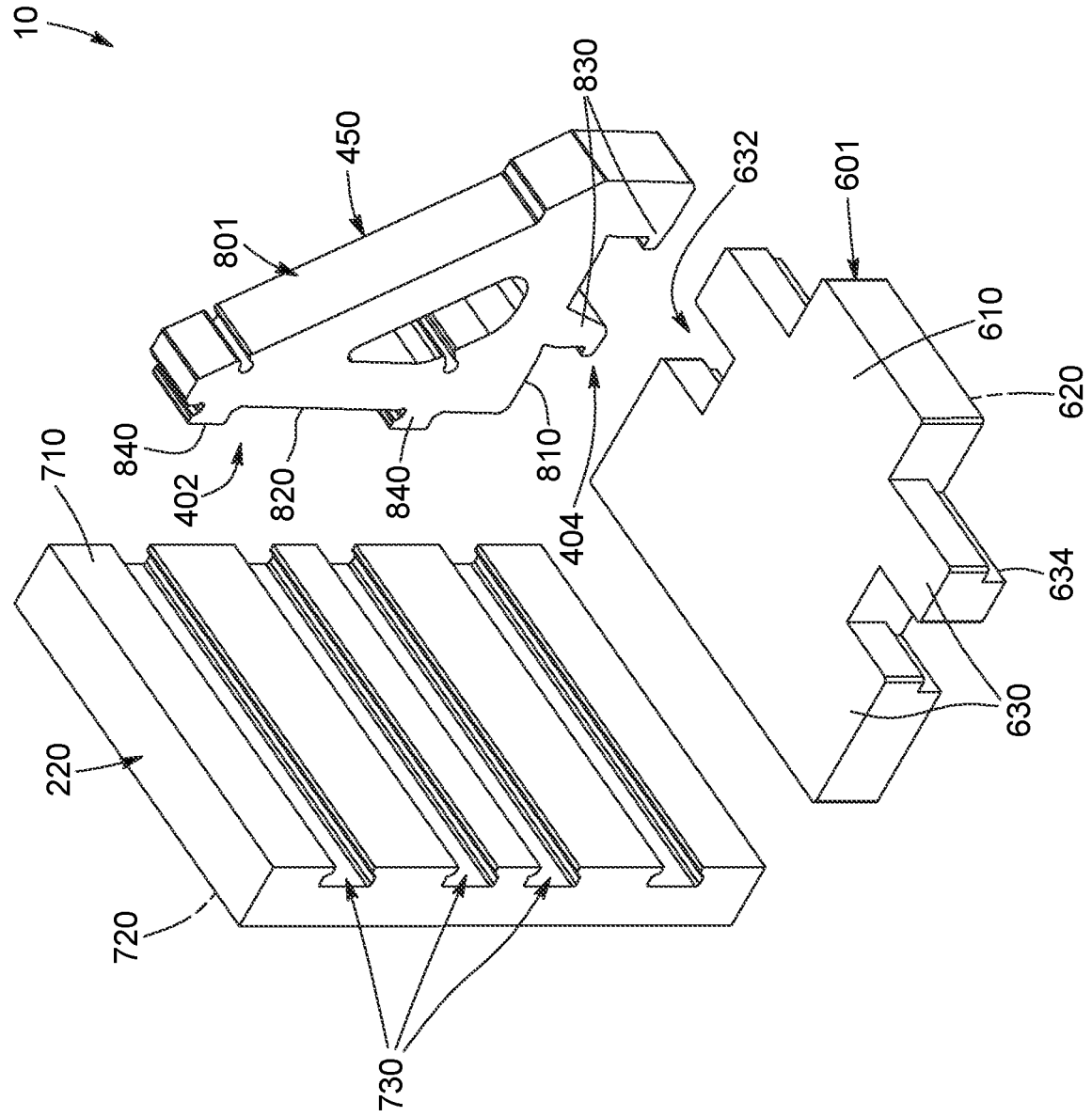
FIG. 23 is an exploded view of the modular building system illustrated in FIG. 22, showing a bracket provided with hooks and a base unit provided with rabbeted edges.
Figure 24C:
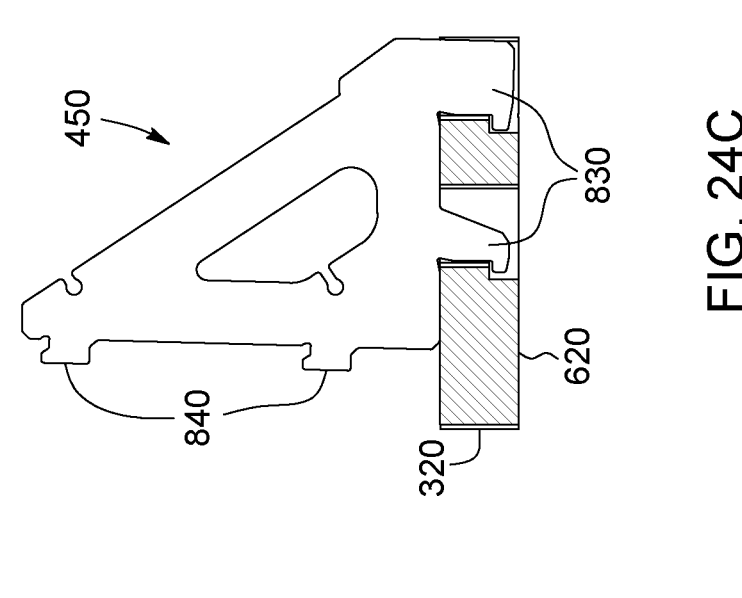
Figure 24B:
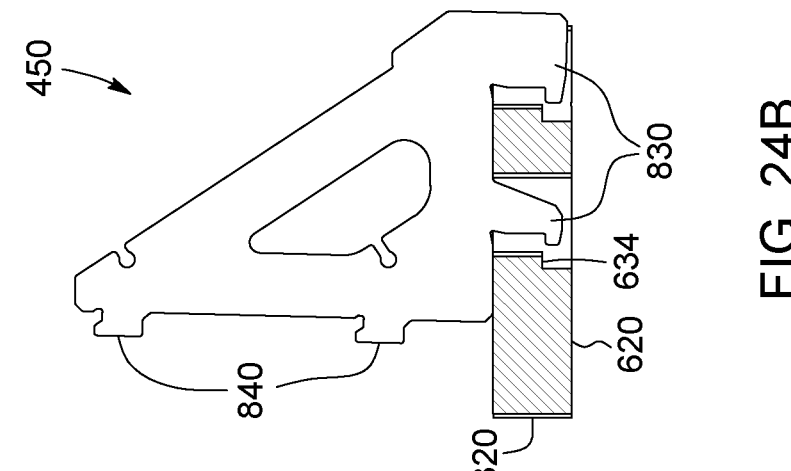
Figure 24A:
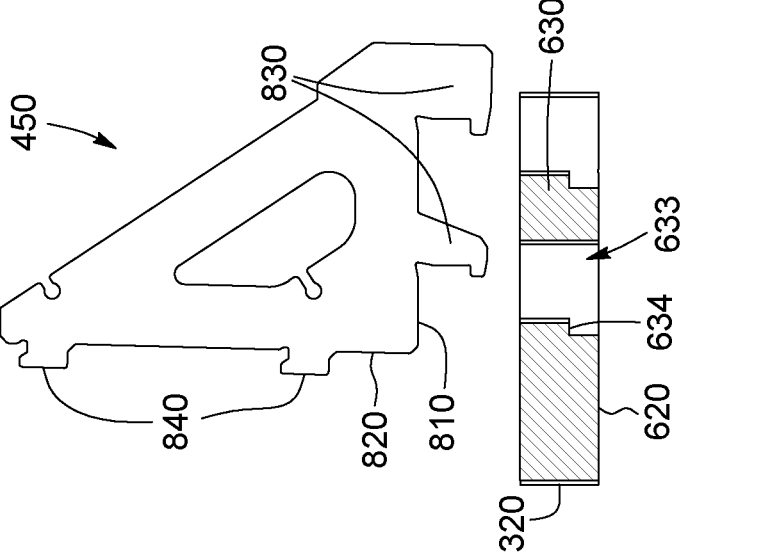

With reference to FIGS. 24A to 24F, a method of assembling the modular building system 10 as illustrated in FIGS. 22 and 23 will now be described. As shown in FIG. 24A, the base slab 320 can be positioned substantially flat on the ground while the support bracket 450 is lowered into position, with one of the bottom hooks 830 entering the partial opening 632 (as shown in FIGS. 24A and 24B). Then, the support bracket 450 can be displaced towards the front edge of the base slab 320 such that the bottom hooks 830 engage the rabbeted edges 634 to thereby secure the support bracket 450 onto the base slab 320, as shown in FIG. 24C. The upright wall panel 220 can then be installed and connected to the support bracket 450 by aligning the panel grooves 730 with the side hooks 840 to allow the side hooks 840 to enter the panel grooves 730, as shown in FIG. 24D). Once the side hooks 840 are located within the panel grooves 730, the upright wall panel 220 can be lowered onto the base slab 320 such that the side hooks 840 engage the dovetail portion of the panel grooves 730, as shown in FIGS. 24E and 24F. The side hooks 840 can be secured within the panel grooves 730 by gravity which urges the side hooks 840 downwardly and into engagement with the panel grooves 730. In some embodiments, a small gap 735, shown in FIG. 24F, may be provided between the upright wall panel 220 and the support bracket 450 to avoid interference with the variations that may occur when manufacturing the upright wall panel 220 and/or the support bracket 450. In one embodiment, backfill material or net stone may then be placed over the base slab 320 to generally form a backfill layer over the base slab 320. This backfill layer would provide additional weight on the base slab 320 to further prevent movement of the structure 20. Additionally, the backfill layer 320 may abut the upright wall panel 220 and therefore create tension in the support bracket 450. This will further contribute to preventing movement of the upright wall panel 220, the support bracket 450 and the base slab 320 to ensure that the bottom hooks 830 and the side hooks 840 remain in engagement with the base slab 320 and the upright wall panel 220.

Figures 25, 26A:
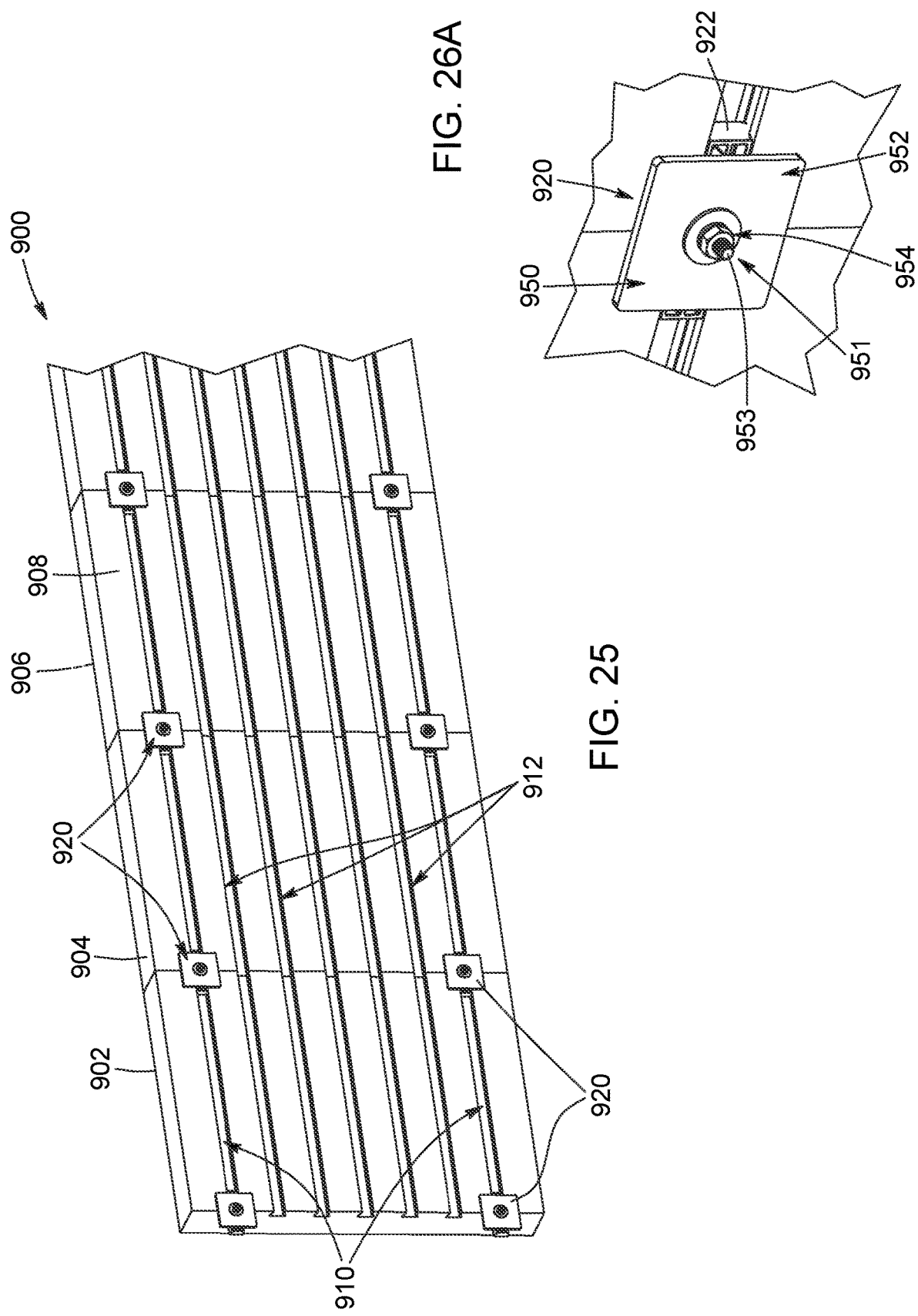
FIG. 25 is a perspective view of a hardscape structure built using a modular building system, according to another embodiment, showing adjacent wall panels connected to each other using connecting members and compression members connected to the connecting members.
FIG. 26A is an enlarged view of the hardscape structure illustrated in FIG. 25, showing details of a compression plate connected to a connecting member.
Figures 26B, 26C, 26D, 26E:
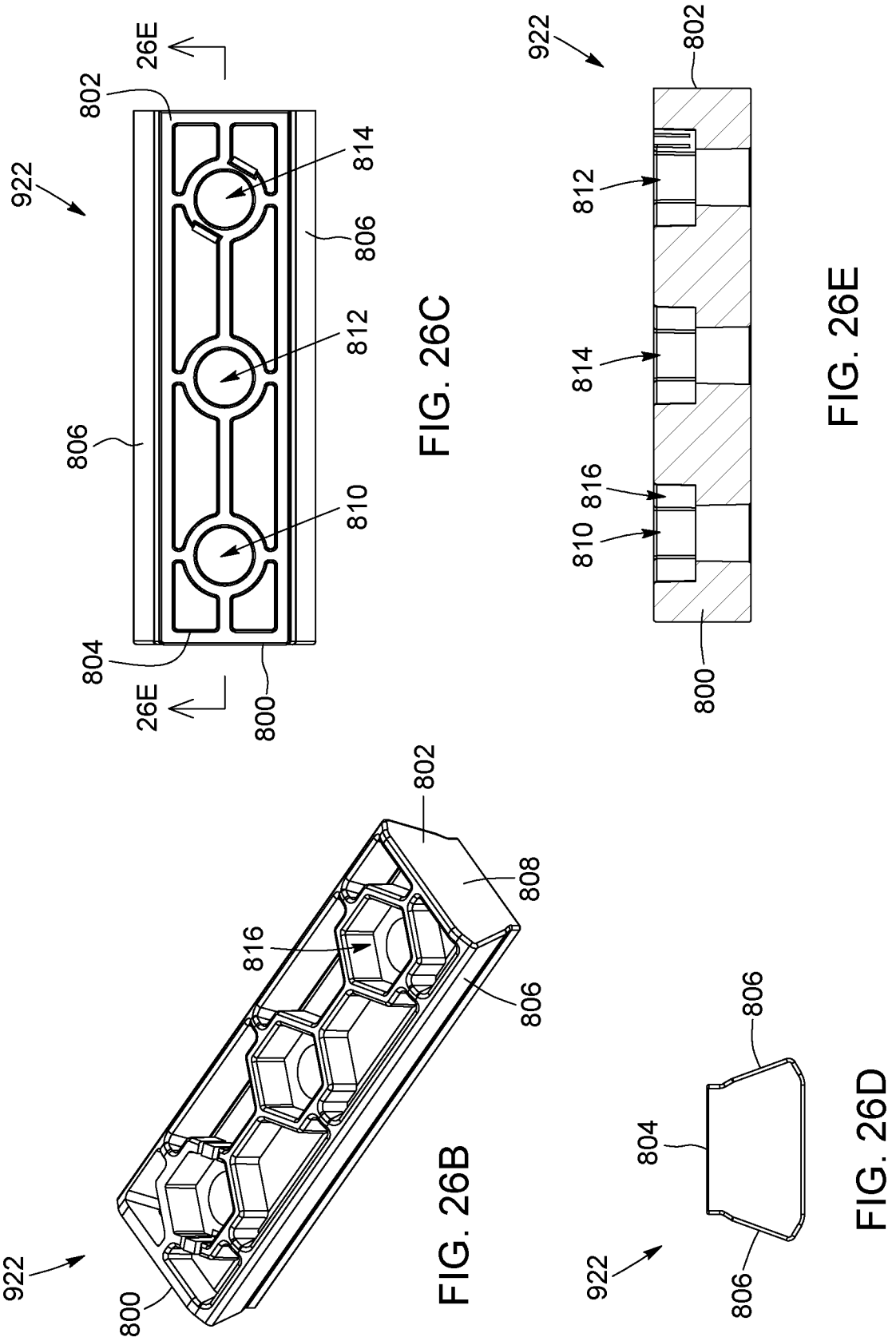
FIG. 26B is a perspective view of a connector for the modular building system illustrated in FIG. 25.
FIG. 26C is a side elevation view of the connector for the modular building system illustrated in FIG. 25.
FIG. 26D is a top plan view of the connector for the modular building system illustrated in FIG. 25.
FIG. 26E is a cross-section view of the connector illustrated in FIG. 26C, taken along cross-section line 26-26.

Referring now to FIGS. 25 to 26E, there is shown a modular building system 900, in accordance with another embodiment. In this embodiment, the modular building system 900 includes a first upright wall panel 902 defining the first hardscape structure section 200 and a second upright wall panel 904 defining the second hardscape structure section 300.

In the embodiment illustrated in FIGS. 25 to 26E, the modular building system 900 does not include a base slab. Alternatively, the modular building system 900 could include base slabs generally similar to the base slabs 320 described above, and which could be connected to the upright wall panels 902, 904 using a support bracket 450 as described above or in any other suitable manner.

Similarly to the upright wall panel 220 described above, the first and second upright wall panels 902, 904 includes a front face 906 and a rear face 908 opposite the front face 906. In this embodiment, the first and second upright wall panels 902, 904 are disposed adjacent each other such that the rear faces 908 of the first and second upright wall panels 902, 904 are substantially co-planar with each other. The first upright wall panel 902 includes a plurality of first section grooves 910 and the second upright wall panel 904 includes a second plurality of section grooves 912. The first and second pluralities of section grooves 910, 912 both extend generally horizontally in the rear face 908 of their respective upright wall panel 902, 904. The first and second pluralities of section grooves 910, 912 are further positioned such that when the first and second upright wall panels 902, 904 are disposed adjacent each other, the first and second pluralities of section grooves 910, 912 are aligned with each other.

The first and second upright wall panels 902, 904 are further connected together using a connecting member 920. Specifically, the connecting member 920 includes a connector 922 sized and shaped to be snuggly received in the first and second section grooves 910, 912. Specifically, the first and second section grooves 910, 912 both have a dovetail-shaped cross-section and the connector 922 has a corresponding dovetail-shaped cross-section.

In the illustrated embodiment, the modular building system 900 further includes a compression member 950 configured to be disposed against the rear faces 908 of the first and second upright wall panels 902, 904, in alignment with the connector 922, and to be connected to the connector 922 using a fastener 951. Specifically, the compression member 950 includes a rectangular compression plate 952 defining a single, continuous body. Alternatively, the compression member 950 could have any other suitable shape or configuration. The fastener 951 could include a threaded bolt 953 configured to extend through the connector 922 and through a center of the compression plate 952 and to be secured thereto using a washer and nut assembly 954. The connector 922 and the compression plate 952 are further positioned so as to overlap both the first and second upright wall panels 902, 904. In this position, the compression plate 952 contacts the rear faces 908 of both the first and second upright wall panels 902, 904.

By tightening the nut assembly 954, the compression plate 952 can be urged towards and maintained in abutment against the rear faces 908 to thereby substantially clamp the rear faces 908 between the compression plate 952 and the connector 922. In this configuration, the compression plate 952 frictionally engages the rear faces 908 to thereby secure the first and second upright wall panels 902, 904 together. In one embodiment, friction is further created between the connector 922 and the first and second upright wall panels 902, 904 when the nut assembly 954 is tightened.

In the illustrated embodiment, the first and second upright wall panels 902, 904 are connected together using two compression plates 952 disposed in different grooves so as to be firmly connected to one another. Alternatively, the first and second upright wall panels 902, 904 could be connected together using a single compression plate, or more than two compression plates.

Referring to FIGS. 26B to 26E, the connector 922 is generally elongated and includes a first end 800 and a second end 802 located opposite the first end 800. In the illustrated embodiment, the connector 922 further has a dovetail-shaped or trapezoidal cross-section which is sized and shaped to be received in the correspondingly dovetail-shaped first section grooves 204 of the upright wall panel 902, 904. Specifically, the connector 922 generally includes a generally rectangular front face 804 and a pair of generally rectangular lateral faces 806 which are angled relative to the front face 804 and which converge towards the front face 804. In the illustrated embodiment, the connector 922 further includes a pair of end faces 808 which extend parallel to each other.

The connector 922 further includes a first fastener bore 810 located near the first end 800, a second fastener bore 812 located near the second end 802 and a third fastener bore 814 generally centered between the first and second fasteners bores 810, 812. The first, second and third fastener bores 810, 812, 814 are all shaped and sized to receive the bolt 953 and allow the bolt 953 to extend through the connector 922. Each fastener bore 810, 812, 814 further includes a head recess 816 sized and shaped to snuggly receive a head 956 of the bolt 953. In the illustrated embodiment, the head 956 of the bolt 953 is hexagonal and the head recess 816 is therefore hexagonal as well. It will be appreciated that this configuration facilitates the screwing of a nut on the bolt 953 by preventing the bolt 953 from turning when the nut 954 is screwed on the bolt 953.

It will be appreciated that because of its cross-sectional shape, the connector 922 cannot be inserted through the access slit 208 of the corresponding groove 910, 912, and must therefore be inserted through the groove end openings of the corresponding groove 910, 912, and then be slidably moved to its desired position along the groove 910, 912.

In one embodiment, the connector 922 is made of a plastic polymer and is manufactured by molding. Alternatively, the connector 922 may be made of any suitable material using any manufacturing process which a skilled person would consider to be appropriate.

Figures 27A, 27B:
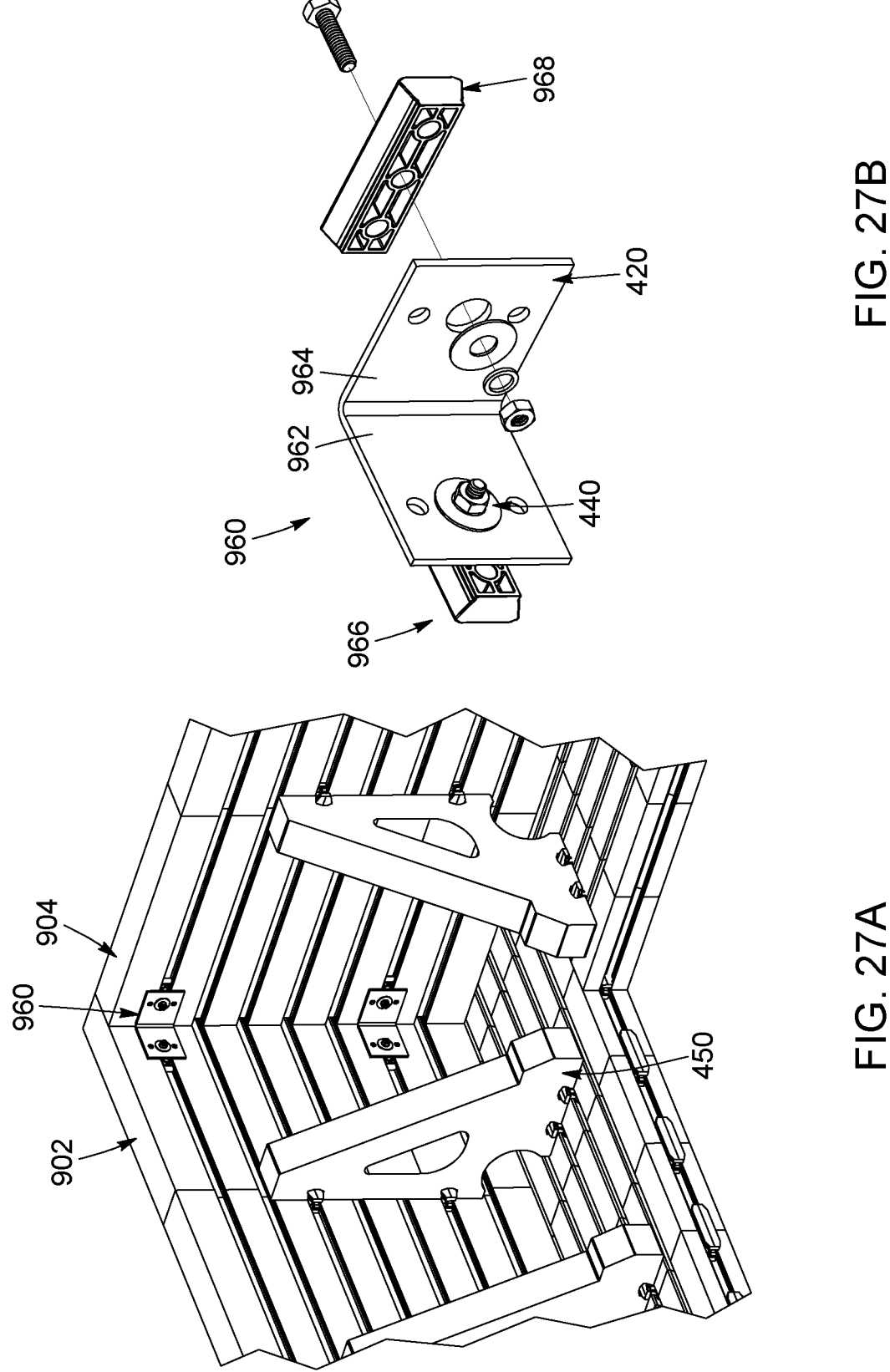
FIG. 27A is a perspective view of a hardscape structure built using the modular building system including a plurality of corner connectors, according to one embodiment.
FIG. 27B is a partially exploded view of a corner connector for the hardscape structure illustrated in FIG. 27A.

Now referring to FIGS. 27A and 27B, the modular building system 900 can further include a corner connector 960 for connecting together the first and second upright wall panels 902, 904 when the first and second upright wall panels 902, 904 are disposed orthogonally to each other rather than being coplanar with each other. In this embodiment, the corner connector 960 is generally L-shaped and is manufactured from a rectangular sheet of metal which has been bent at an angle of about 90 degrees to define a first panel portion 962 and a second panel portion 964 which is generally orthogonal to the first panel portion 962. The first panel portion 962 acts as a first compression plate and is adapted to be connected to a first connector 966 engaging one of the first section grooves 910 of the first upright wall panel 902. The second panel portion 964 acts as a second compression plate and is adapted to be connected to a second connector 968 engaging one of the second section grooves 912 of the second upright wall panel 904. Alternatively, the first and second panel portions 962, 964 of the corner connector 960 may not be perpendicular to each other, but may instead be angled at any desired angle between about 5 degrees and about 175 degrees. In yet another embodiment, instead of being manufactured from a single sheet of metal, the corner connector 960 could have another suitable configuration.

It will be understood that although the corner connector 960 is described above and shown in FIGS. 27A and 27B configured as an interior connector disposed in an interior corner between two adjacent upright wall panels 902, 904. The corner connector 960 could instead be configured as an exterior connector. Specifically, the first and second upright wall panels 902, 904 could instead be disposed relative to each other such that their respective grooves face away from each other, rather than towards each other. For example, the first and second upright wall panels 902, 904 could be used to build an enclosure and be disposed such that their grooves are disposed in an exterior-facing surface of the enclosure. In this case, the corner connector would be substantially similar to the corner connector 960, but would be visible from an exterior of the enclosure and would be generally hidden from view from the interior of the enclosure.

Figures 28A, 28B:
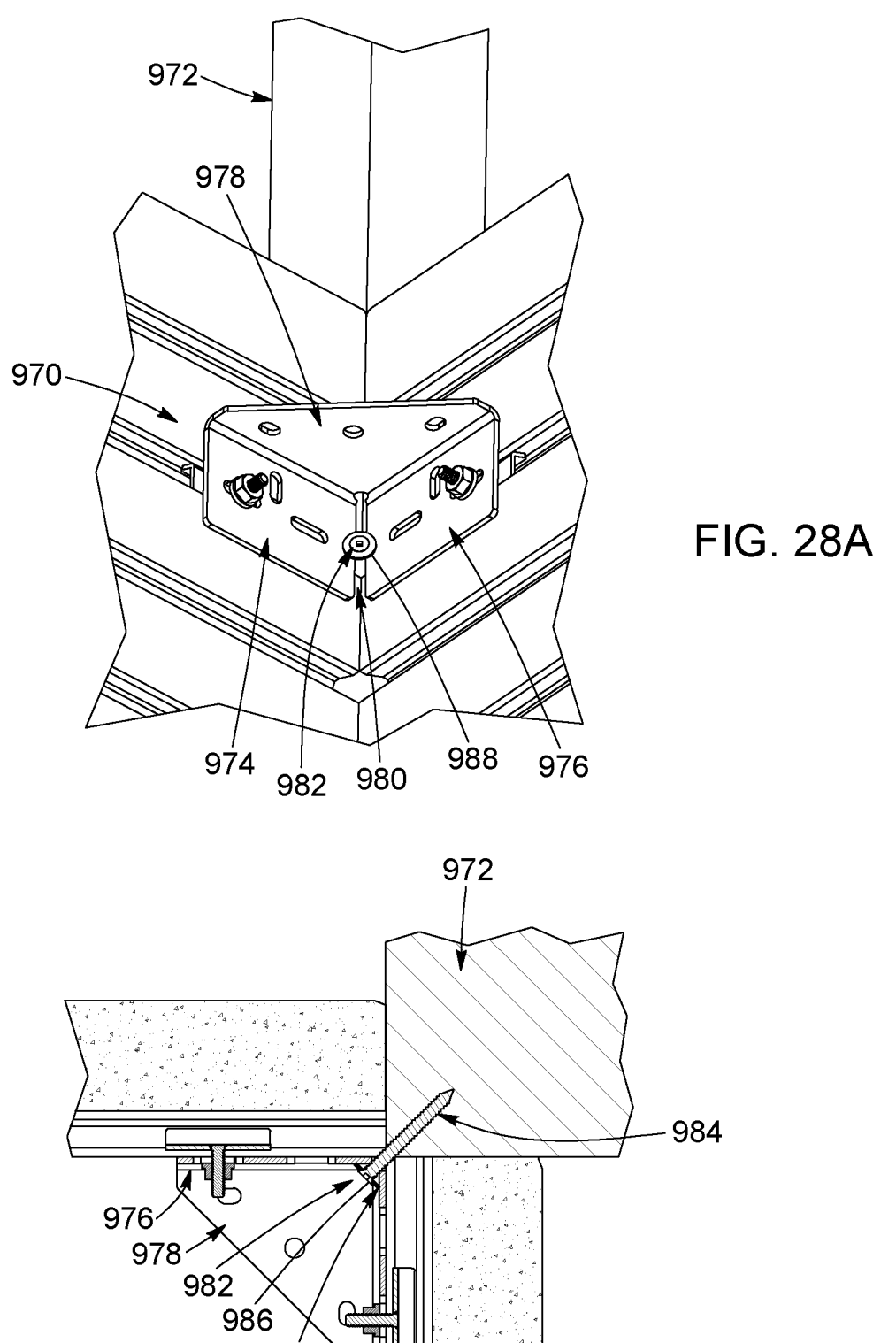
FIG. 28A is a perspective view of a portion of a hardscape structure built using the modular building system including a corner connector, according to another embodiment.
FIG. 28B is a bottom cross-sectional view of the corner connector illustrated in FIG. 28A.

FIGS. 28A and 28B further show a corner connector 970, in accordance with another embodiment. In this embodiment, the corner connector 970 is configured to connecting together the first and second upright wall panels 902, 904 positioned perpendicularly as well as connect the connecting together the first and second upright wall panels 902, 904 to a corner post 972 extending between the first and second upright wall panels 902, 904. More specifically, the corner connector 970 includes a first panel portion 974 and a second panel portion 976 which extends generally orthogonally to the first panel portion 974. The corner connector 970 further includes a triangular connection panel 978 which extends orthogonally to the first and second panel portions 974, 976 and which connects the first and second panel portions 974, 976.

As shown in FIGS. 28A and 28B, the first and second panel portions 974, 976 are spaced apart to define a corner slot 980 for receiving a screw 982. The screw 982 includes a threaded body 984 and a screw head 986. In the illustrated embodiment, the threaded body 984 extends through a washer 988 which abuts the screw head 986. Still in the illustrated embodiment, the corner post 972 is made of a relatively soft material such as wood or the like such that the threaded body 984 can engage the corner post 972 when the screw 982 is turned. The threaded body 984 is sized and shaped to be inserted through the corner slot 980, but the washer 988 is larger or wider than the corner slot 980 such that the washer 988 abut the first and second panel portions 974, 976 when the screw 982 is screwed into the corner post 972. Alternatively, the first and second panel portions 974, 976 may not be spaced apart and the corner connector 970 may instead include a screw hole defined between the first and second panel portions 974, 976.

Figure 29A:
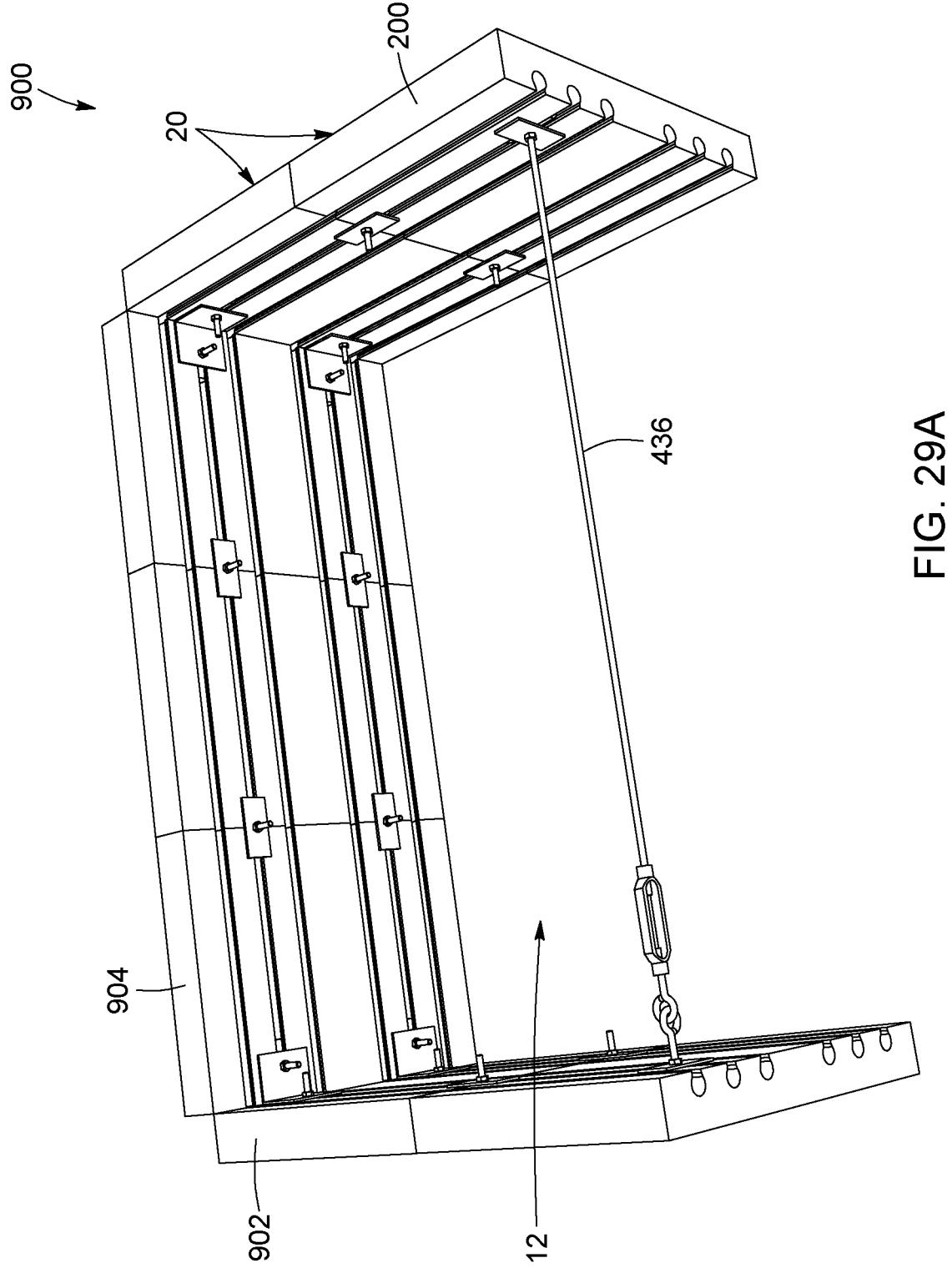
FIG. 29A is a perspective view of a portion of an enclosure built using a modular building system, in accordance with one embodiment, including upright wall panels connected together in a freestanding configuration.

Turning to FIG. 29A, the modular building system 900 can be used to build an enclosure or part of an enclosure in which a plurality of upright wall panels 902, 904 are disposed around a central space 12. The upright wall panels 902, 904 could be connected to each other using the connectors 922 and the compression plates 952 as described above. Additionally, opposite upright wall panels could further be connected together using a mechanical link 436 spanning across the open area 12. This configuration could allow the enclosure to be built without a base slab or a bracket since the mechanical link 436 can be adapted to support the constraints which were initially supported by the bracket and base slab.

In the illustrated embodiment, the mechanical link 436 includes a rigid tension rod. Alternatively, the mechanical link 436 may have a different configuration. For example, the mechanical link 436 could include a first angle bar and a second angle bar slidably mounted to the first angle bar to thereby allow a length of the mechanical link 436 to be adjusted. Angle brackets could further be provided and engaged with corresponding connectors in the panel grooves and the mechanical link 436 could be secured to the angle brackets at opposite ends thereof. Once the mechanical link 436 has been set to the desired length, which may correspond generally to a distance between the two opposite upright wall panels, the first angle bar could be secured to the second angle bar using one or more fasteners.

Figure 29B:
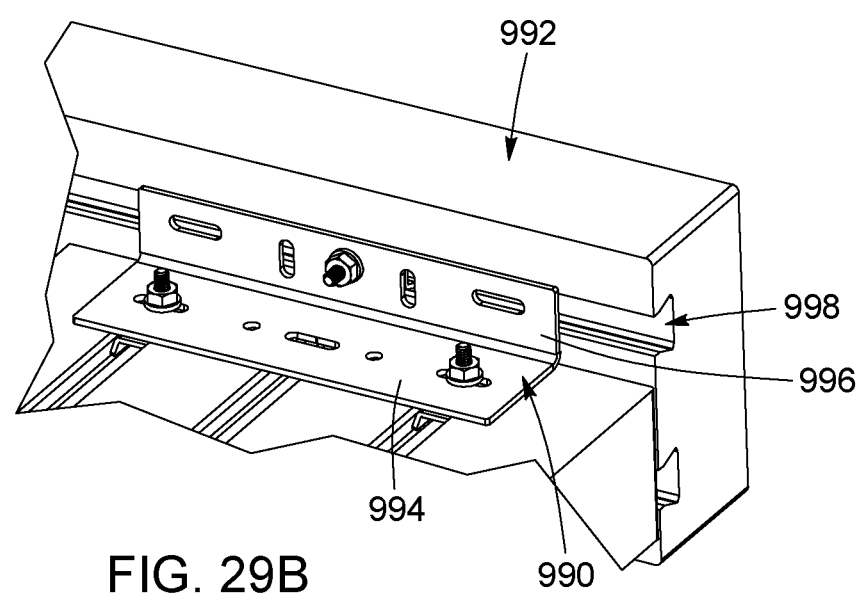
FIG. 29B is a perspective view of a portion of a hardscape structure enclosure built using a modular building system including a coping bracket, in accordance with one embodiment.
Figure 29C:
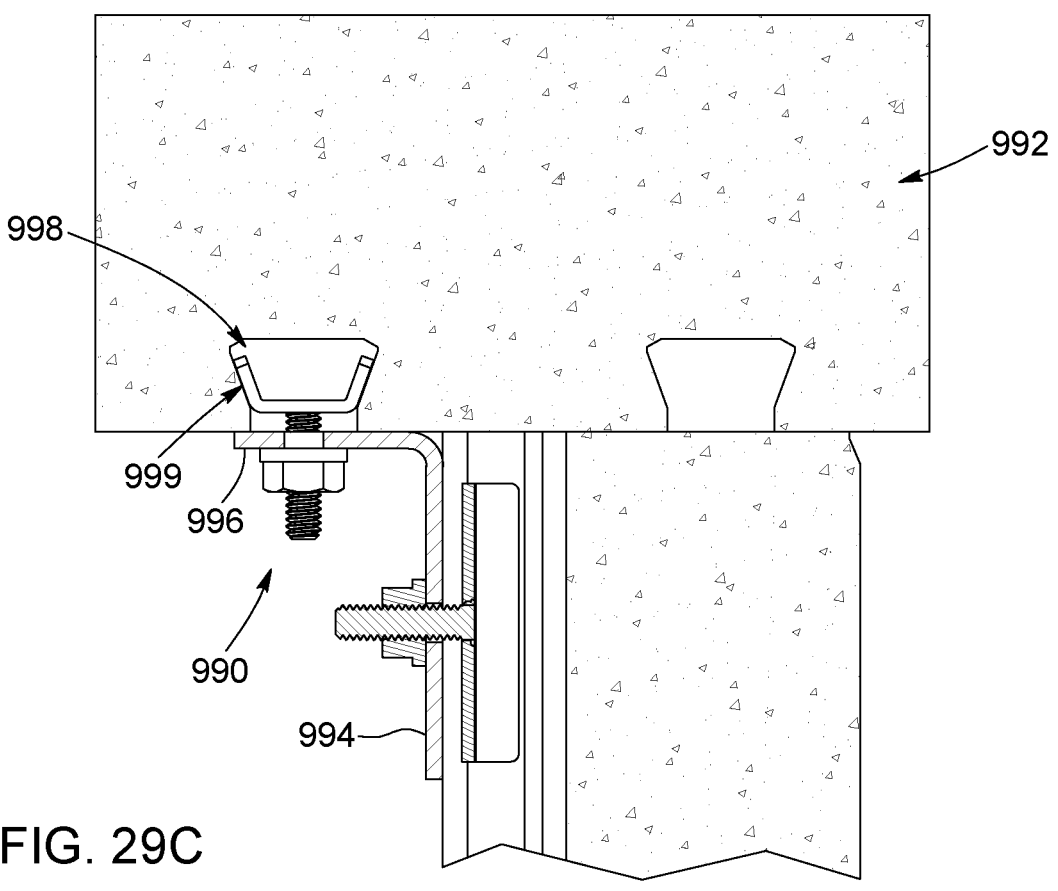
FIG. 29C is a cross-sectional view of the portion of the hardscape structure illustrated in FIG. 29B, showing details of the coping bracket.
Figure 30:
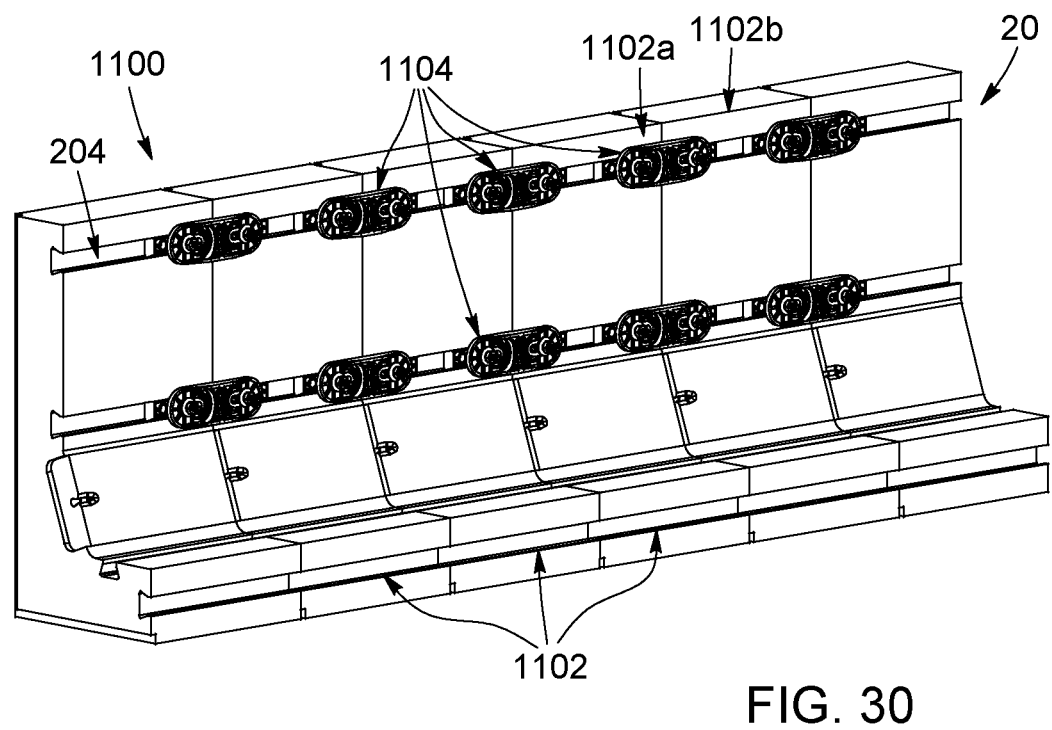
FIG. 30 is a rear perspective view of a hardscape structure built using a modular building system, in accordance with another embodiment.

Referring now to FIGS. 29B and 29C, the modular building system 900 can further include a coping bracket 990 which allows coping sections 992 to be secured to each upright wall panel 902, 904. The coping bracket 990 is generally L-shaped and includes a first panel portion 994 adapted to be secured to the upright wall panel 902, 904 and a second panel portion 996 extending substantially orthogonally to the first panel portion 994. As shown in FIG. 29C, the coping section 992 is wider than the upright wall panel 902, 904. When the coping bracket 990 is connected to the upright wall panel 902, 904, the first panel portion 994 extends against the upright wall panel 902, 904 and the second panel portion 996 extends away from the upright wall panel 902, 904 to support the coping section 992 in a cantilevered configuration.

In the illustrated embodiment, the coping section 992 includes a plurality of coping grooves 998 which are adapted to receive a connector 999 which is sized and shaped to engage a corresponding coping groove 998. The connector 999 is further connected to the second panel portion 996 of the coping bracket 990 to thereby secured the coping section 992 to the coping bracket 990.

In one embodiment, each coping section 992 may further be supported by a plurality of coping brackets 990. In this embodiment, the coping brackets 990 may be spaced apart from each other longitudinally along the coping section 992. In this embodiment, the coping grooves may further be adapted to receive and hold one or more light sources such as LEDs or the like, which could be positioned between consecutive coping brackets 990.

Referring now to FIGS. 30 to 38, there is shown a modular building system 1100, in accordance with another embodiment. In this embodiment, the modular building system 1100 does not include upright panel members and base slabs. Instead, the modular building system 1100 includes a plurality of wall sections 1102 which are all substantially identical to each other and a plurality of connecting members 1104 connecting together the wall sections 1102.

More specifically, the wall sections 1102 are disposed generally side-by-side and the connecting assemblies 1104 overlap adjacent wall sections 1102 to connect together the adjacent wall sections 1102. Each wall section 1102 is generally L-shaped and includes a generally elongated panel portion 1300 and a base portion 1302 extending generally perpendicularly to the panel portion 1300. In the embodiment illustrated in FIGS. 30 to 38, the wall section 1102 is positioned in an upright position in which the panel portion 1300 is generally vertical and is located above the base portion 1302. The base portion 1302 includes a base surface 1304 which is adapted to be placed against a ground surface when the wall section 1102 is in the upright position.

In the illustrated embodiment, the wall section 1102 includes a pair of opposite, generally L-shaped lateral faces 1306, a rear panel face 1308 and a front panel face 1310 opposite the rear panel face 1308. The wall section 1102 further includes a top base face 1312 and a rear base face 1314 located on the base portion 1302 and extending generally perpendicular to each other. The wall section 1102 further includes an intermediate rear face 1316 which extends between the rear panel face 1308 and the top base face 1312 and which is angled relative to the rear panel face 1308 and the top base face 1312.

Referring specifically to FIGS. 32 to 35, the wall section 1102 further includes a plurality of grooves 1318a, 1318b, 1318c, 1318d extending between the lateral faces 1306 of the wall section 1102. More specifically, the wall section 1102 includes a first panel groove 1318a and a second panel groove 1318b located below the first panel groove 1318a, both the first and second panel grooves 1318a, 1318b being defined on the rear panel face 1308 near the intermediate rear face 1316. The wall section 1102 further includes a top base groove 1318c defined in the top base face and a rear base groove 1318d defined in the rear base face 1314.

Figures 33, 34, 35:
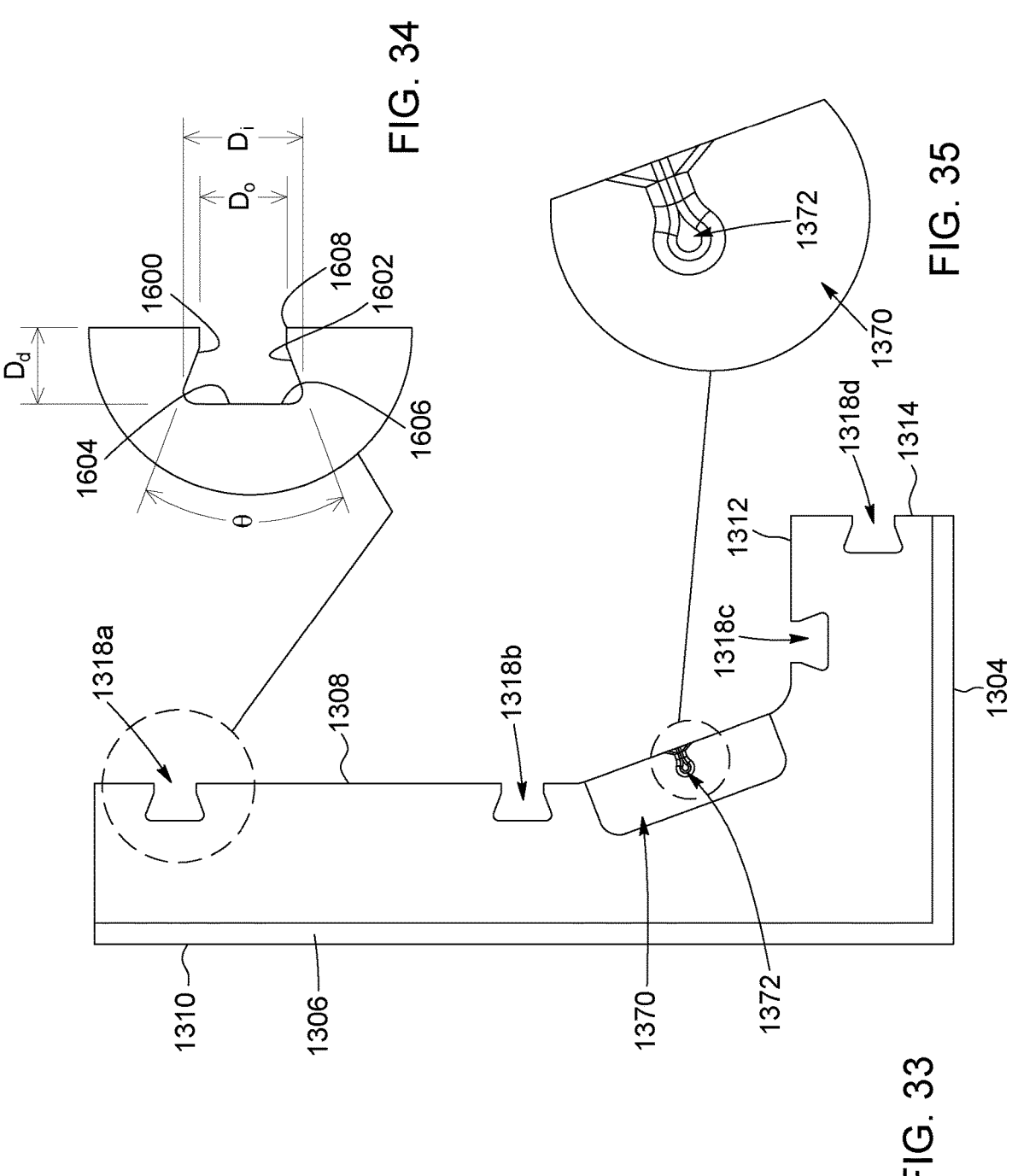
FIG. 33 is a side elevation view of a wall section of the modular building system illustrated in FIG. 30.
FIG. 34 is an enlarged view of the wall section illustrated in FIG. 33, taken from area A.
FIG. 35 is an enlarged view of the wall section illustrated in FIG. 33, taken from area B.

In this embodiment, all of the grooves 1318a, 1318b, 1318c, 1318d are identical to each other and have an upper inner sidewall 1600, a lower inner sidewall 1602 opposite the upper inner sidewall 1600 and a center inner sidewall 1604 extending between the upper and lower inner sidewalls 1600, 1602, as best shown in FIG. 34. Specifically, each one of the upper and lower inner sidewalls 1600, 1602 has an inner end 1606 connected to the center inner sidewall 1604 and an outer end 1608 located away from the center inner sidewall 1604.

Still in this embodiment, the grooves 1318a, 1318b, 1318c, 1318d have a dovetail-shaped or trapezoidal cross-section. Specifically, the upper and lower inner sidewalls 1600, 1602 converge or taper away from the center inner sidewall 1604. In one embodiment, the upper and lower inner sidewalls 1600, 1602 taper at a taper angle θ of 40 degrees. In one embodiment, the inner ends 1606 of the upper and lower inner sidewalls 1600, 1602 are spaced from each other by a distance $D_i$ of 27 mm, and the outer ends 1608 of the upper and lower inner sidewalls 1600, 1602 are spaced from each other by a distance $D_o$ of 19.6 mm. In one embodiment, each groove 1318a, 1318b, 1318c, 1318d further has a depth $D_d$ of 17 mm. Alternatively, the grooves 1318a, 1318b, 1318c, 1318d could have different dimensions and/or configurations.

The wall section 1102 further includes a generally rectangular recess 1370 defined in one of the lateral faces and a blind hole 1372 located in the rectangular recess 1370. The blind hole 1372 is adapted to receive a fastener such as a push pin adapted to attach to the wall section 1102 a connector bag which contains the components of one or more connection members 1104. When the modular building system 1100 is assembled, the bag may be removed from the wall section 1102, the components may be removed from the bag and the bag and the push pin may be discarded. It will be appreciated that this configuration allows the connection member 1104 to be conveniently packaged with the wall section 1102 when provided to the user. Alternatively, the wall section 1102 may not include a rectangular recess 1370 or a blind hole 1372.

In this embodiment, the plurality of wall sections 1102 includes a plurality of pairs of wall sections 1102 disposed adjacent each other. For example, the plurality of wall sections 1102 includes a first wall section 1102a and a second wall section 1102b located adjacent the first wall section 1102a. In the illustrated embodiment, all wall sections 1102 are identical to each other, such that when the first and second wall sections 1102a, 1102b are both placed in the upright position and are placed side-by-side such that the rear panel face 1308 of the first wall section 1102a is coplanar to the rear panel face 1308 of the second wall section 1102b, the grooves 1318a, 1318b, 1318c, 1318d of the first wall section 1102a are aligned with the corresponding grooves 1318a, 1318b, 1318c, 1318d of the second wall section 1102b.

Figure 32:
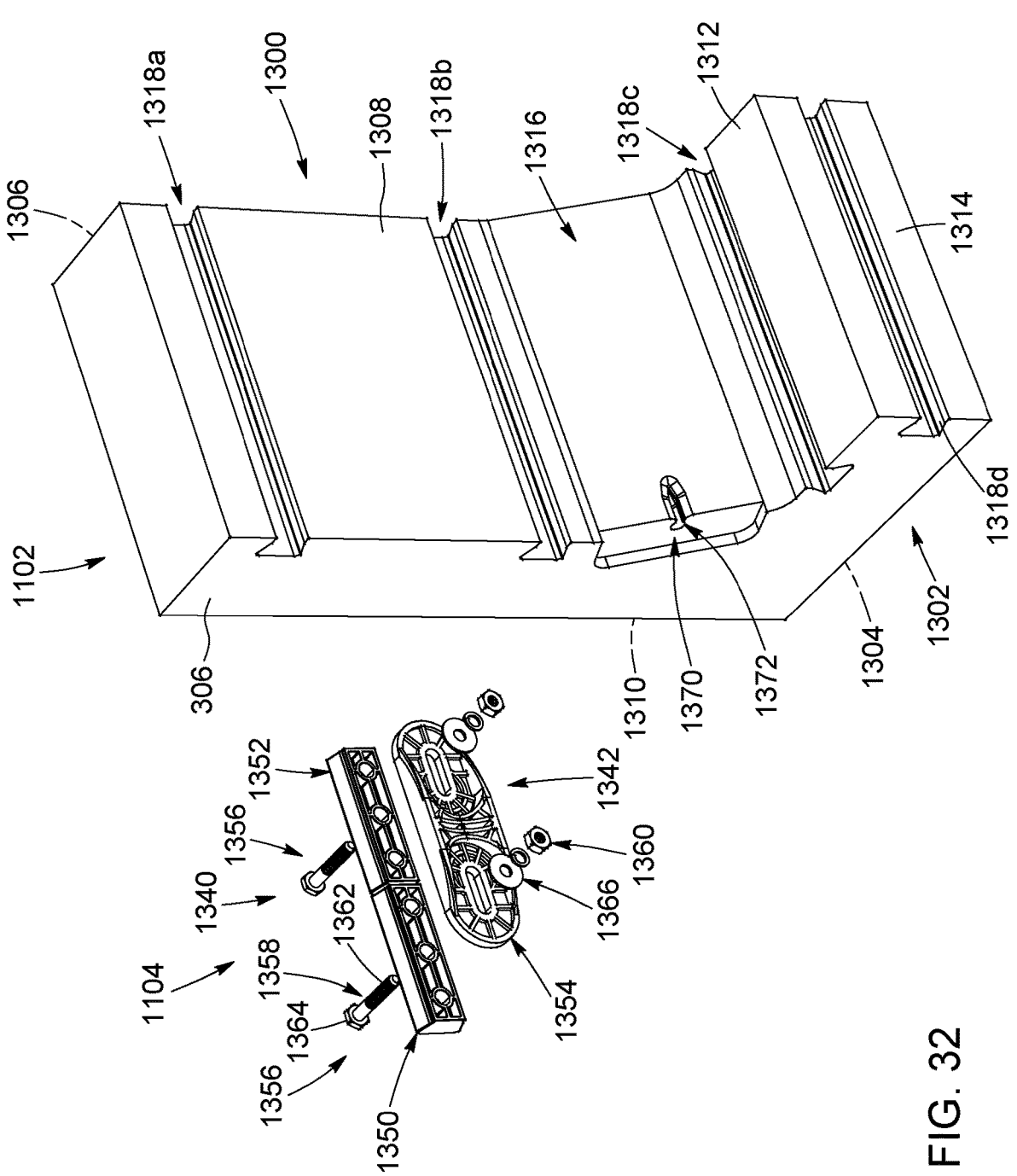
FIG. 32 is an exploded perspective view of a wall section and of a connection assembly for the modular wall system illustrated in FIG. 30.

Referring specifically to FIG. 32, each connecting members 1104 includes a first connector 1350 which is adapted to be received in one of the grooves 1318a, 1318b, 1318c, 1318d of the first wall section 1102a and a second connector 1352 which is adapted to be received in the one of the grooves 1318a, 1318b, 1318c, 1318d of the second wall section 1102b. Specifically, in the illustrated embodiment, the first connector 1350 is adapted to be received in the first panel groove 1318a of the first wall section 1102a and the second connector 1352 is adapted to be received in the first panel groove 1318a of the second wall section 1102b.

Still in the illustrated embodiment, the modular building system 1100 further includes a plurality of compression members 1342. Specifically, each compression member 1342 includes a compression plate 1354 which overlaps both the first connector 1350 and the second connector 1352 and a pair of fasteners 1356 for attaching the first and second connectors 1350, 1352 to the compression plate 1354. In the illustrated embodiment, each fastener 1356 includes a bolt 1358 and a corresponding nut 1360 threadably engaging the bolt 1358. Specifically, the bolt 1358 includes a threaded body 1362 extending through one of the first and second connectors 1350, 1352 and a head 1364 abutting the connector 1350, 1352. In the illustrated embodiment, the connection member 1104 further includes a washer 1366 disposed around the threaded body 1362 and between the nut 1360 and the compression plate 1354.

When the nut 1360 is tightened on the bolt 1358, the head 1364 of the bolt 1358 pushes the connector 1350, 1352 against the upper and lower inner sidewalls 1600, 1602 of the groove 1318*a*, thereby increasing friction between the connector 1350, 1352 and the upper and lower inner sidewalls 600, 602 to prevent the connector 1350, 1352 from sliding longitudinally within the groove 1318*a*. Similarly, the nut 1360 abuts the washer 1366 and pushes the compression plate 1354 against the rear panel face 1308, thereby increasing friction between the compression plate 1354 and the wall section 1102.

Figures 36, 37:
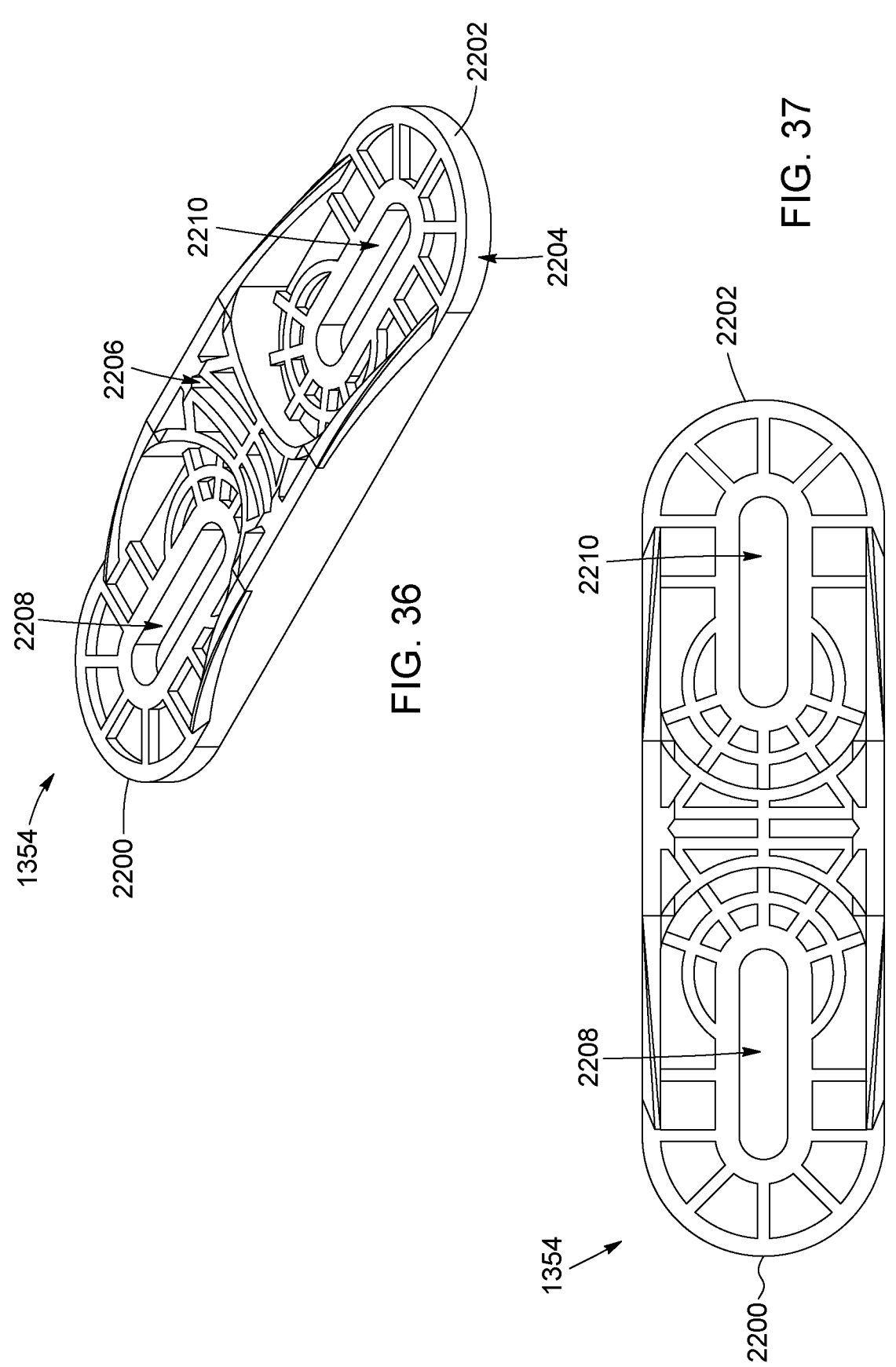
FIG. 36 a top perspective view of a compression plate of a connection assembly for the modular building system illustrated in FIG. 30.
FIG. 37 is a top plan view of the compression plate of a connection assembly for the modular building system illustrated in FIG. 30.

Referring now to FIGS. 36 and 37, the compression plate 354 is generally elongated and includes a first end 1200 and a second end 1202 located opposite the first end 1200. In the embodiment illustrated in FIGS. 12 and 13, the first and second ends 1200, 1202 are rounded, and the compression plate 354 is therefore generally oblong. Alternatively, the compression plate 354 could be rectangular or have any other shape which a skilled person would consider to be appropriate.

Still in the illustrated embodiment, the compression plate 1354 includes a generally planar body panel 2204 and a plurality of ribs 2206 extending over the body panel 2204 to provide rigidity to the body panel 2204. Alternatively, the compression plate 1354 could have any other configuration which a skilled person would consider to be appropriate.

The compression plate 1354 further includes first and second elongated slots 2208, 2210 which extend generally longitudinally relative to a longitudinal axis of the compression plate 1354. The first elongated slot 1208 is located near the first end 2200 of the compression plate 1354 and the second slot 2210 elongated is located near the second end 2202.

It will be appreciated that providing the compression plate 1354 with slots instead of circular holes may facilitate the connection of the first and second wall sections 1102*a*, 1102*b* by eliminating the need for the compression plate to be in a very specific position relative to the first and second connectors 1350, 1352 and by allowing lateral adjustments of the compression plate's position relative to the first and second connectors 1350, 1352.

When the first and second wall sections 1102*a*, 1102*b* are connected using the connection assembly 1104, the compression plate 1354 is oriented such that the first end 2200 is disposed towards the first wall section 1102*a* and the second end 2202 is disposed towards the second wall section 1102*b*. In this configuration, the first elongated slot 2208 is adapted to receive the bolt 1358 extending through the first connector 1350 and the second elongated slot 1210 is adapted to receive the bolt 1356 extending through the second connector 1352.

In one embodiment, the compression plate 1354 is made of a polymer and is manufactured by molding. Alternatively, the compression plate 1354 may be made of any suitable material using any manufacturing process which a skilled person would consider to be appropriate.

Figure 38:
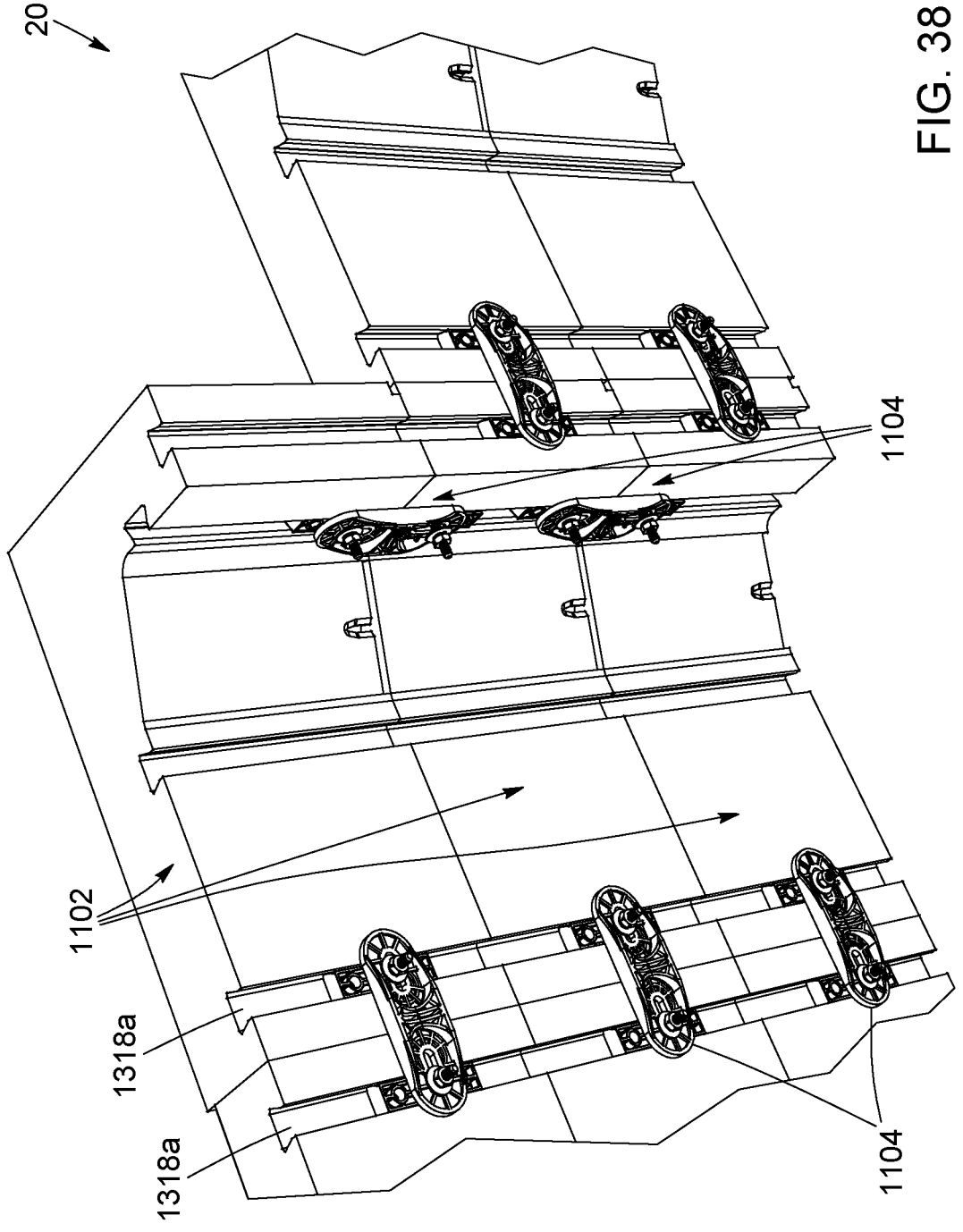
FIG. 38 is a perspective view showing a portion of another hardscape structure built using the modular building system illustrated in FIG. 30.

As further shown in FIG. 38, the connecting member 1104 could also be used to connect together wall sections 1102 which are laying on their sides and stacked on top of each other, instead of being positioned in an upright position. Specifically, the wall sections 1102 could be positioned adjacent each other in an end-to-end configuration. As shown in FIG. 38, in this configuration, the first panel grooves 1318*a* may be located proximal each other, but may be parallel to each other and spaced from each other instead of being aligned. In this case, the connectors 1350, 1352 may further extend parallel to each other and be spaced from each other as they are received in the first panel grooves

1318*a*, with the compression member 1342 extending between the connectors 1350, 1352 while overlapping the adjacent wall sections 1102.

It will be appreciated that in the wall system 1100 illustrated above, the wall sections 1102 do not include grooves on every face. More specifically, the base surface 1304 and the front panel face 1310 are devoid of any grooves. In some embodiments, the wall sections 1102 may be disposed so as to form an enclosure.

In this configuration, the wall sections 1102 are disposed and oriented such that the base surface 1304 and/or the front panel face 1310 faces outwardly so as to substantially hide the connection members 1104 and the grooves from view from the exterior of the enclosure. In one embodiment, the enclosure may further contain soil which further hides the connection members 1104 and the grooves from view.

Alternatively, one or more grooves, generally similar to the other grooves of the wall section 1102, could be provided on the base surface 1304 and/or on the front panel face 1310 to receive additional connections members 1104. These additional connections members 1104 could be used to connect adjacent panels together, similarly to the connections members 1104 used with the grooves above or could be used for attaching decorative or functional elements to the wall sections 1102 such as planters, lighting, shelving or the like.

Referring to FIGS. 39 to 45, there is shown a modular building system 4200, in accordance with yet another embodiment. In this embodiment, the modular building system 4200 includes a plurality of straight wall sections 4202 disposed side-by-side to form straight walls and a plurality of radius wall sections 4204 disposed side-by-side to form curved walls.

Figure 39:
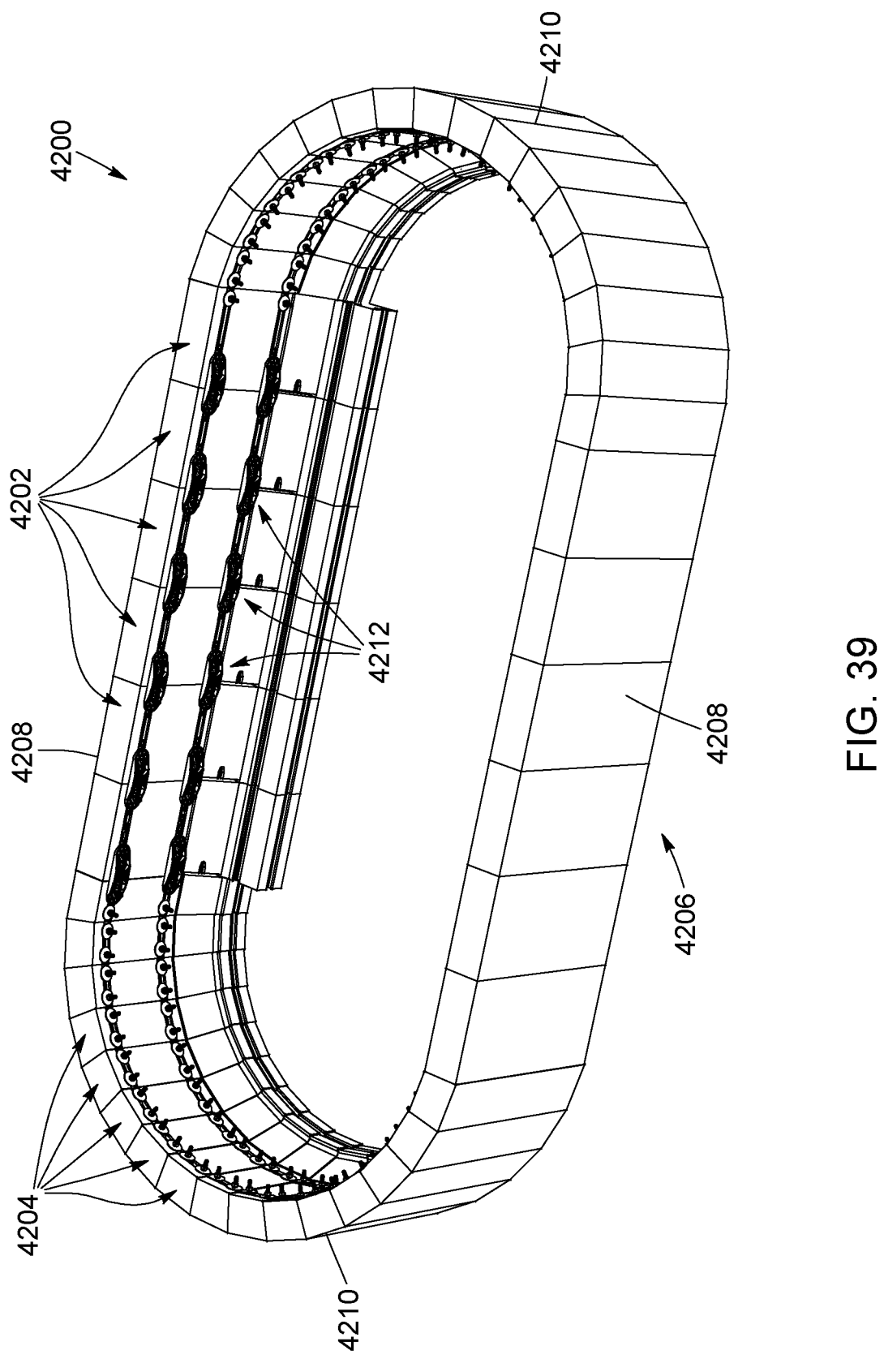
FIG. 39 is a perspective view of an enclosure built using a modular building system, in accordance with another embodiment, in which the modular building system includes straight wall sections and radius wall sections.

For example, FIG. 39 shows the wall system 4200 in a configuration in which the wall sections 4202, 4204 are disposed so as to form an oblong enclosure 4206 which includes a pair of straight walls 4208 made of straight wall sections 4202 and a pair of curved walls 4210 made of radius wall sections 4204.

Figure 40:
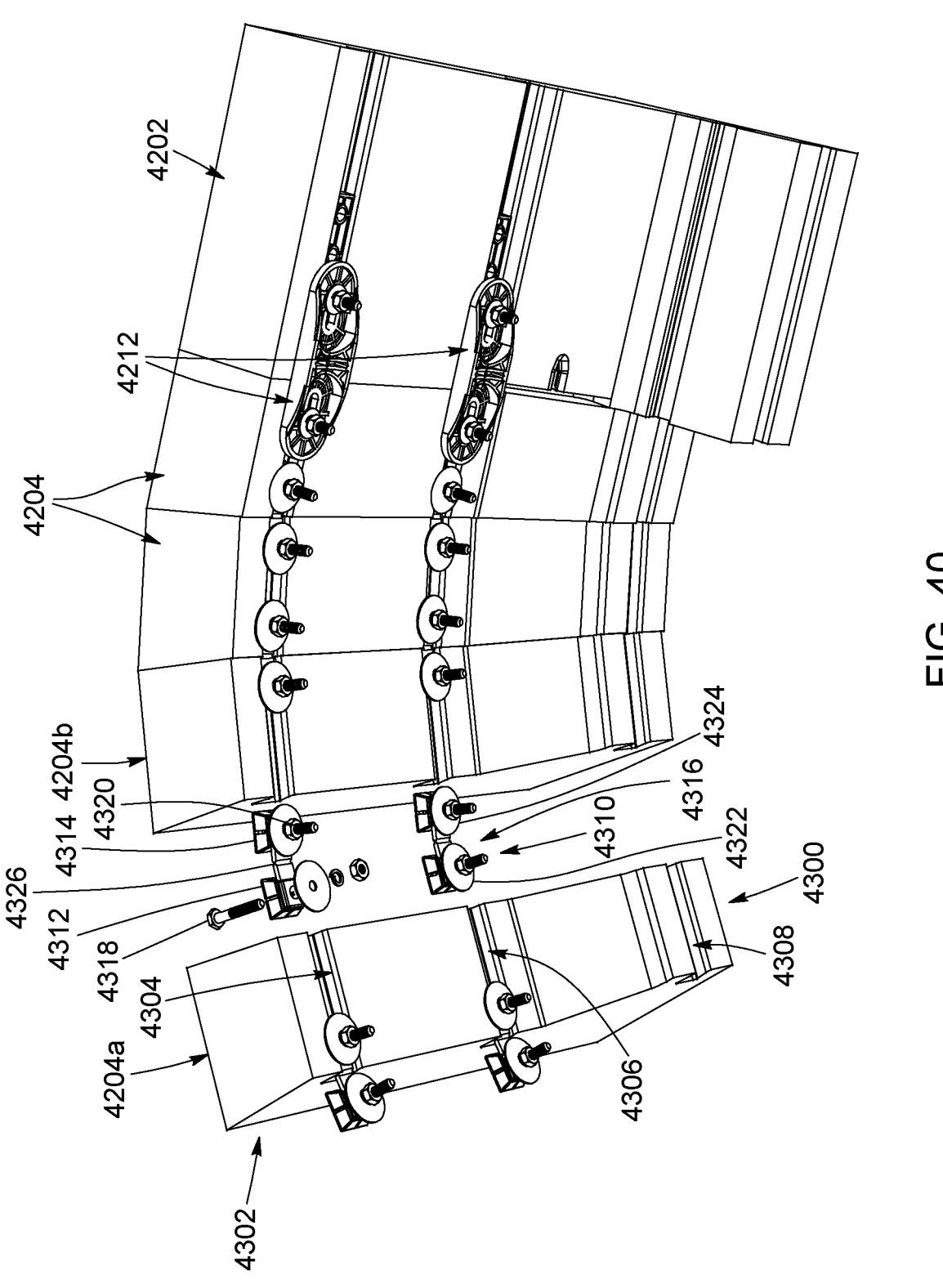
FIG. 40 is a partially exploded view of a portion of the enclosure built using the modular building system illustrated in FIG. 39.

As shown in FIG. 40, the straight wall sections 4202 are generally similar to the wall sections 102 of the wall system 100 described above and can be connected to adjacent wall sections 4202, 4204 using one or more straight connecting assemblies 4212 which are generally similar to the connecting assemblies 104 of the wall system 100 described above.

In the illustrated embodiment, each radius wall section 4204 includes a base portion 4300 adapted to be placed on a ground surface and a panel portion 4302 extending upwardly from the base portion 4300. In this embodiment, each radius wall section 4204 includes a first panel groove 4304 defined in the panel portion 4302, a second panel groove 4306 defined in the panel portion 4302 below the first panel groove 4304 and a base groove 4308 defined in the base portion 4300.

Still in the illustrated embodiment, the first and second panel grooves 4304, 4306 and the base groove 4308 have a trapezoidal cross-section. Alternatively, the grooves may have a keyhole-shaped cross-section or any other cross-section which a skilled person would consider to be appropriate.

Figures 41, 42:
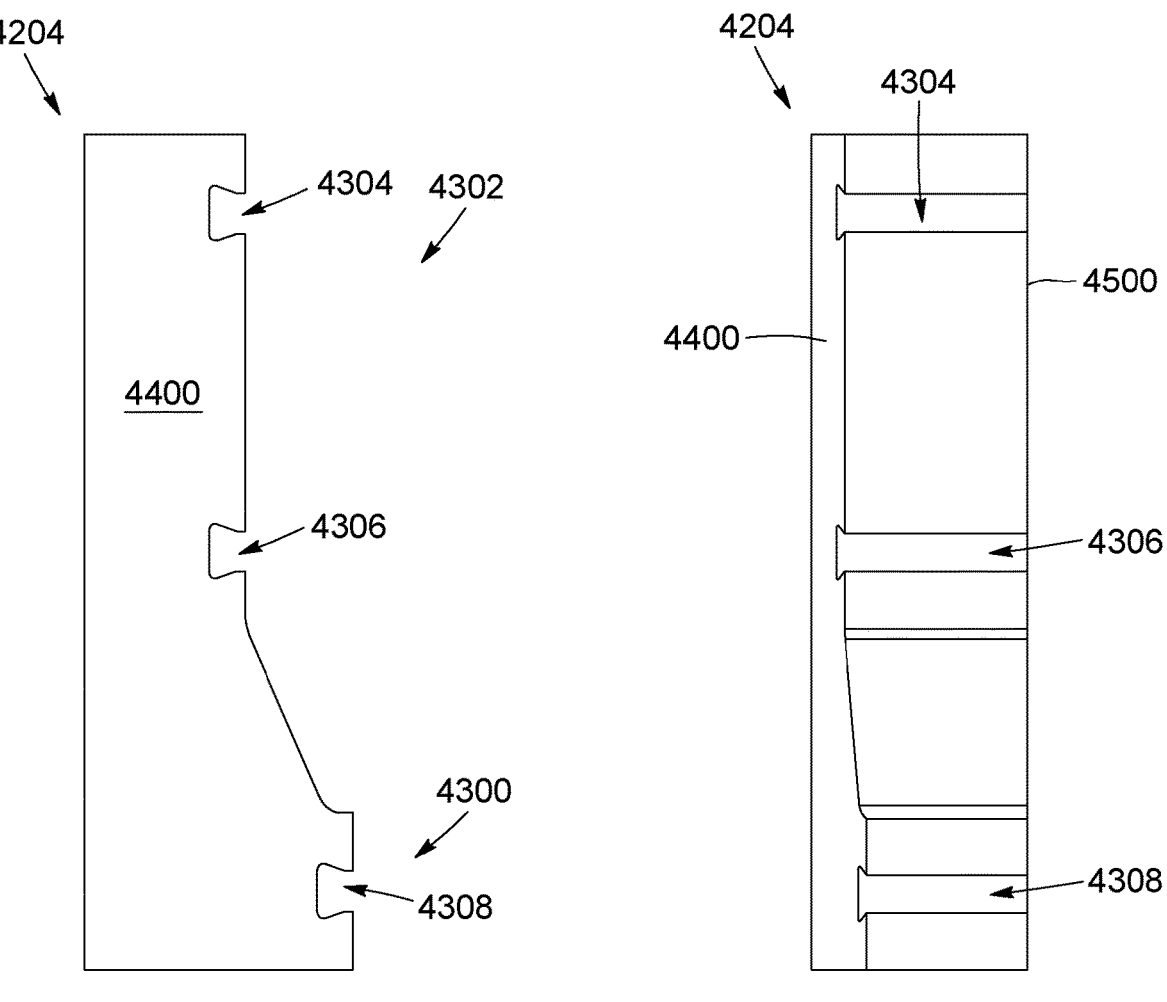
FIG. 41 is a side elevation view of a radius wall section for the modular building system illustrated in FIG. 39.
FIG. 42 is a rear elevation view of the radius wall section for the modular building system illustrated in FIG. 39.
Figure 43:
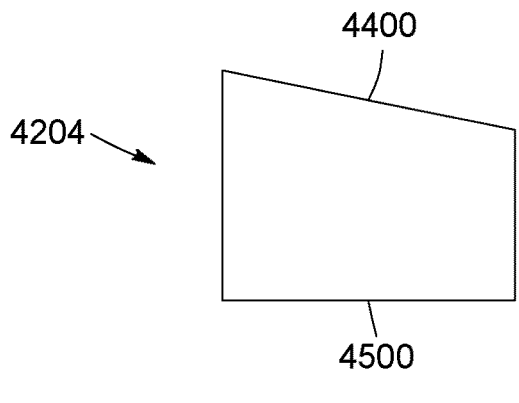
FIG. 43 is a top plan view of the radius wall section for the modular building system illustrated in FIG. 39.
Figure 46:
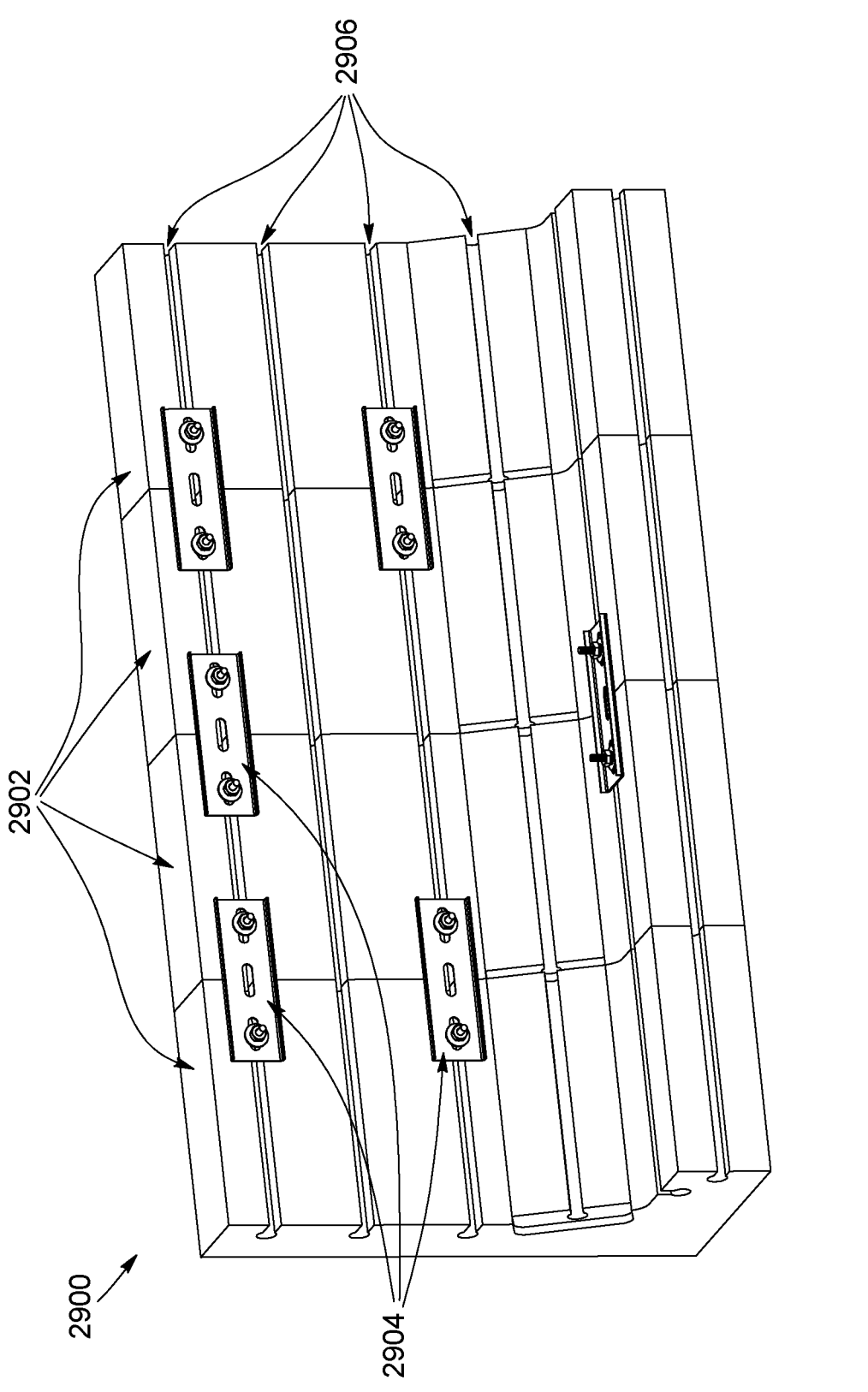
FIG. 46 is a rear perspective view of a hardscape structure built using a modular building system, in accordance with another embodiment.

As best shown in FIGS. 41 to 43, each radius wall section 4202 further includes first and second lateral faces 4400, 4500 which extend generally vertically when the base portion 4300 is placed on a ground surface. Similar to the lateral faces 306 of the wall sections 1102 described above, the first and second lateral faces 4400, 4500 are adapted to be placed against corresponding lateral faces 4400, 4500 of adjacent wall sections 4202 or 4204. However, while the lateral faces 306 of the wall sections 1102 are parallel to each other, the first and second lateral faces 4400, 4500 are angled relative to each other, as best shown in FIG. 46. It will be appreciated that in this configuration, each radius wall section 4204 defines a relatively small arc of a circle, such that a circular pattern is formed when a plurality of radius wall sections 4204 are placed next to each other. In one embodiment, the first and second lateral faces 4400, 4500 are angled relative to each other by an angle of 11.25 degrees. Alternatively, the first and second lateral faces 4400, 4500 could be angled relative to each other according to a different angle.

In the illustrated embodiment, the adjacent radius wall sections 4204 are connected together using one or more radius connecting assemblies 4310 which is different from the straight connecting assemblies 4212 used to connect straight wall sections 4202. Specifically, each radius connecting assembly 4310 includes a first connector 4312 sized and shaped to be received in a groove 4304, 4306, 4308 of a first radius wall section 4204*a* and a second connector 4314 sized and shaped to be received in a groove 4304, 4306, 4308 of a second radius wall section 4204*b* adjacent the first radius wall section 4204*a*. The radius connecting assembly 4310 further includes a compression plate 4316 adapted to be connected to the first connector 4312 with a first fastener 4318 and to the second connector 4314 with a second fastener 4320.

In this embodiment, the compression plate 4316 includes a first compression plate portion 4322 and a second compression plate portion 4324 which is distinct from the first compression plate portion 4322. Specifically, the first and second compression plate portions 4322, 4324 are generally circular and are configured to abut the corresponding radius wall section 4202*a*, 4204*b* without overlapping the other one of the first and second radius wall sections 4202*a*, 4204*b*.

Still in this embodiment, the connecting assembly 4310 further includes a hinge 4326 connecting the first connector 4312 to the second connector 4314. The hinge 4326 allows the connectors 4312, 4314 to be angled relative to each other while remaining connected together to thereby connect the first and second radius wall sections 4204*a*, 4204*b* together.

Figure 44:
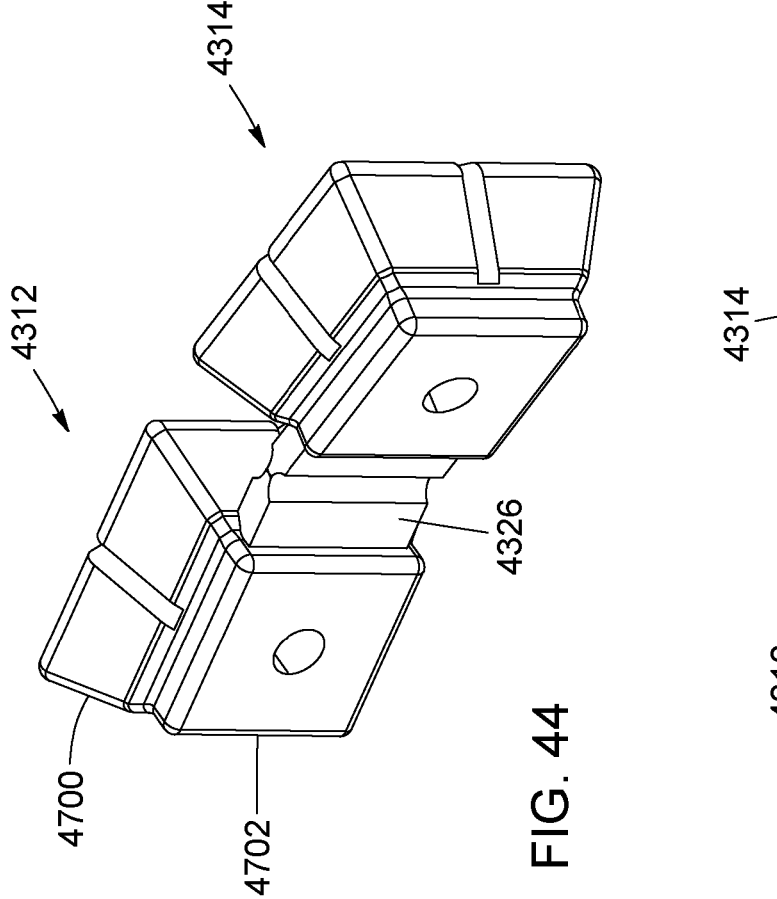
FIG. 44 is a perspective view of a connector for the modular building system illustrated in FIG. 39.
Figure 45:
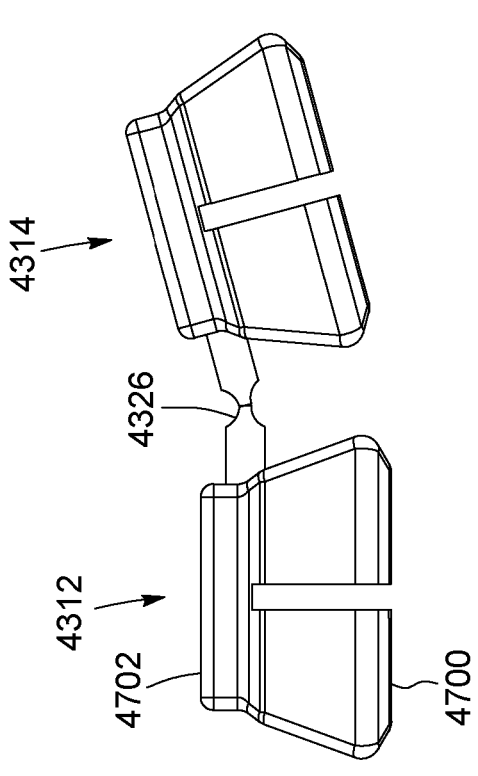
FIG. 45 is a top plan view of the connector for the modular building system illustrated in FIG. 39.

Referring now to FIGS. 44 and 45, each one of the first and second connectors 4312, 4314 includes a tapered base 4700 and a square projection 4702 extending away from the tapered base 4700.

In the illustrated embodiment, the hinge 4326 is a live hinge and the first and second connectors 4312, 4314 and the hinge 4326 are integrally formed together.

In one embodiment, the first and second connectors 4312, 4314 and the hinge 4326 are made of a polymer and are integrally formed together using molding or any other manufacturing process which a skilled person would consider to be suitable. In another embodiment, the hinge may not be a live hinge and may instead be another type of hinge which a skilled person would consider to be suitable.

Figure 47:
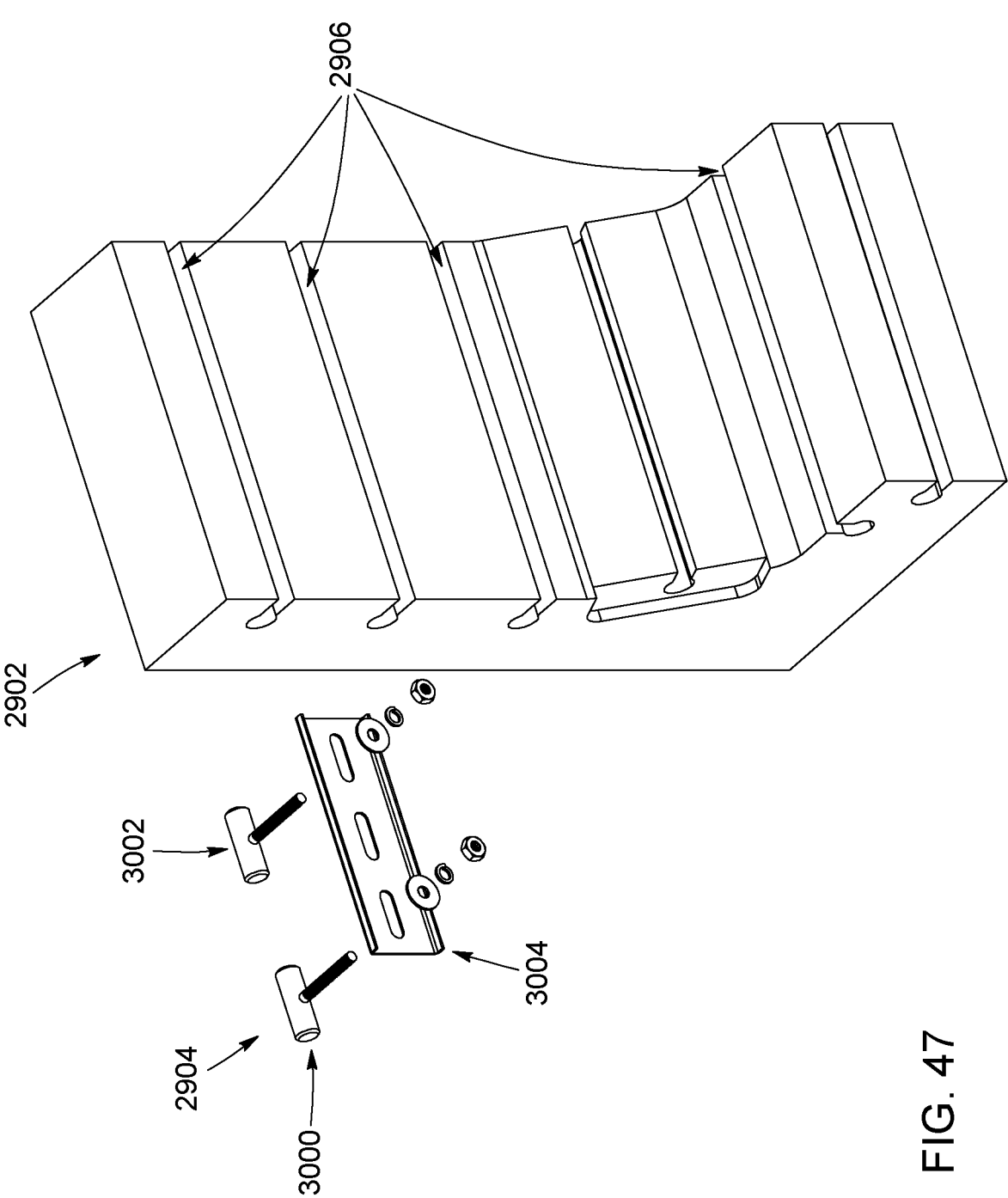
FIG. 47 is an exploded perspective view of a wall section and of a connection assembly for the modular wall system illustrated in FIG. 46.

Referring now to FIGS. 46 and 47, there is shown a modular building system 2900, in accordance with another embodiment. In this embodiment, the system 2900 includes a plurality of wall sections 2902 and a plurality of connecting assemblies 2904. The wall sections 2902 are generally similar to the wall sections 1102 described above. Specifically, each wall section 2902 has a plurality of grooves 2906, similarly to the wall sections 1102.

Figure 31:
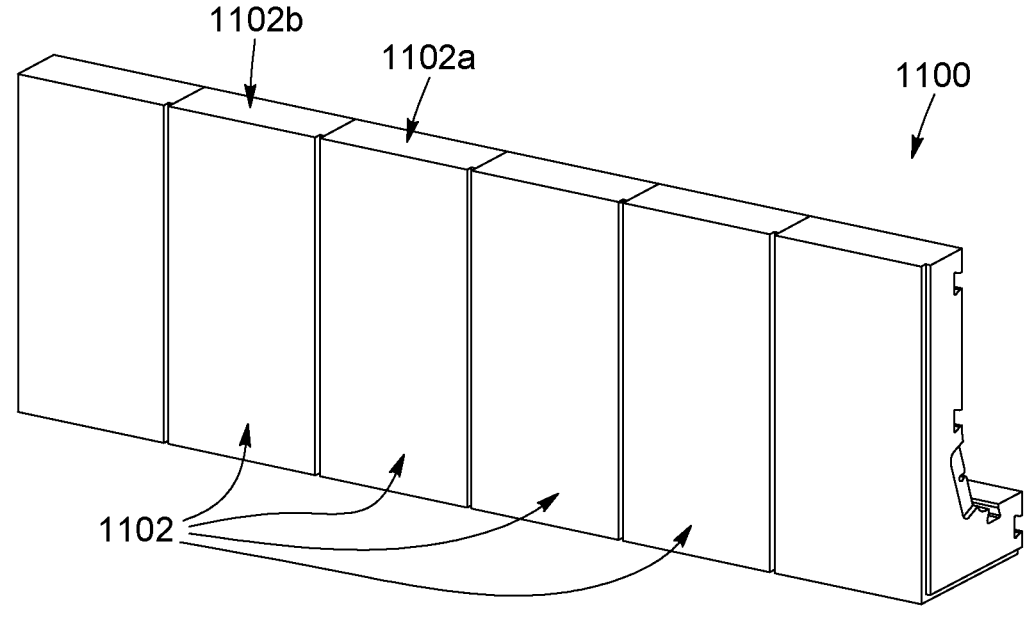
FIG. 31 is a front perspective view of the hardscape structure built using the modular wall system illustrated in FIG. 30.

In the embodiment illustrated in FIGS. 46 and 47, each groove 2906 has a keyhole-shaped cross-section instead of having a dovetail-shaped cross-section, as best shown in FIG. 31. Specifically, the groove 2906 includes a circular holding channel 3100 and an elongated access slit 3102 in communication with the holding channel 3100.

Similarly to the wall system 1100, each connecting assembly 2904 includes first and second connectors 3000, 3002 sized and shaped to be received in grooves 2906 of a first wall section 2902*a* and a second wall section 2902*b* adjacent the first wall section 2902*a*. The connecting assembly 2904 also includes a compression plate 3004 which is connected to both the first and second connectors 3000, 3002 to thereby connect together the first and second wall sections 2902*a*, 2902*b*.

Figure 48:
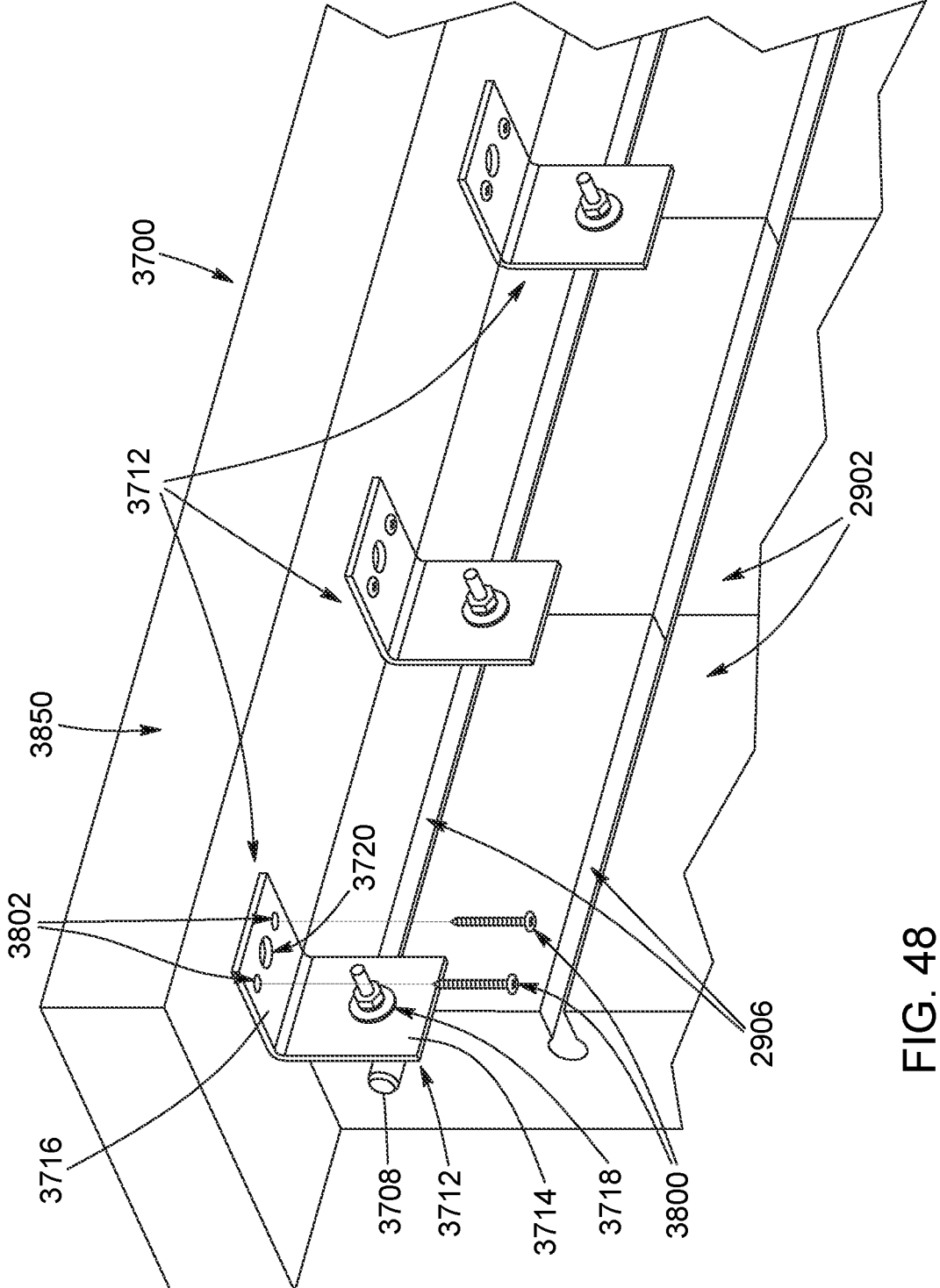
FIG. 48 is a perspective view of a portion of a hardscape structure built using a modular building system including a coping bracket, in accordance with one embodiment.

Turning to FIG. 48, the modular building system 2900 can further include a coping bracket 3712 which allows one or more coping sections 3700 to be secured to the wall sections 2902 while the coping sections 3700 extend generally perpendicularly to the wall sections 2902. In one embodiment, the coping bracket 3712 could be generally similar to the corner connector 960 described above. More specifically, each coping bracket 3712 is generally L-shaped and is manufactured from a rectangular sheet of metal which has been bent at an angle of about 90 degrees. In this configuration, the coping bracket 3712 therefore defines a first panel portion 3714 and a second panel portion 3716 which is generally orthogonal to the first panel portion 3714. The first panel portion 3714 includes a central fastener opening 3718 sized and shaped to receive a first connector 3708 engaging a groove 2906 of one or more of the wall sections 2902. The second panel portion 3716 also includes a central fastener opening 3720 sized and shaped to receive a second connector which can engage a groove of one or more precast coping sections, not shown. This configuration allows the existing grooves 2906 of the wall sections 2902 to be used for the additional purpose of mounting a coping to the wall, thereby eliminating the need to drill additional holes in the wall sections 2902 for the sole purpose of mounting the coping. As shown in FIG. 48, the coping 3700 could instead be manufactured using one or more pieces 3850 of wood, wood product or similar material. More specifically, the piece of wood 3850 could simply be placed on the second panel portion 3716 of the coping bracket 3712 and secured to the coping bracket 3712 using one or more screws 3800 inserted through corresponding screw holes 3802 defined in the second panel portion 3716. This configuration would eliminate the need for a second connector.

Figure 49:
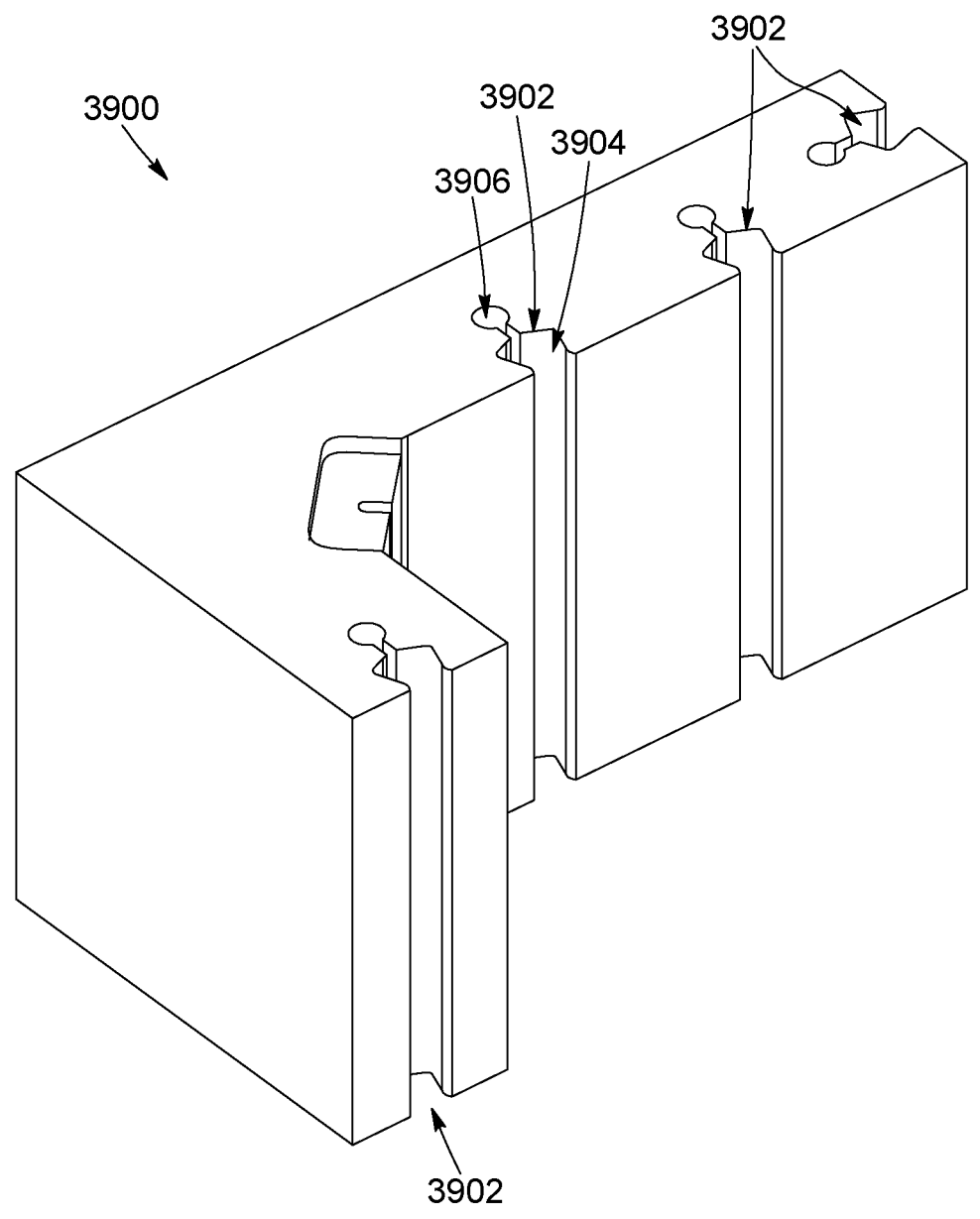
FIG. 49 is a perspective view of a wall section for a modular building system, in accordance with one embodiment, with the wall section lying on its side.
Figures 50, 51:
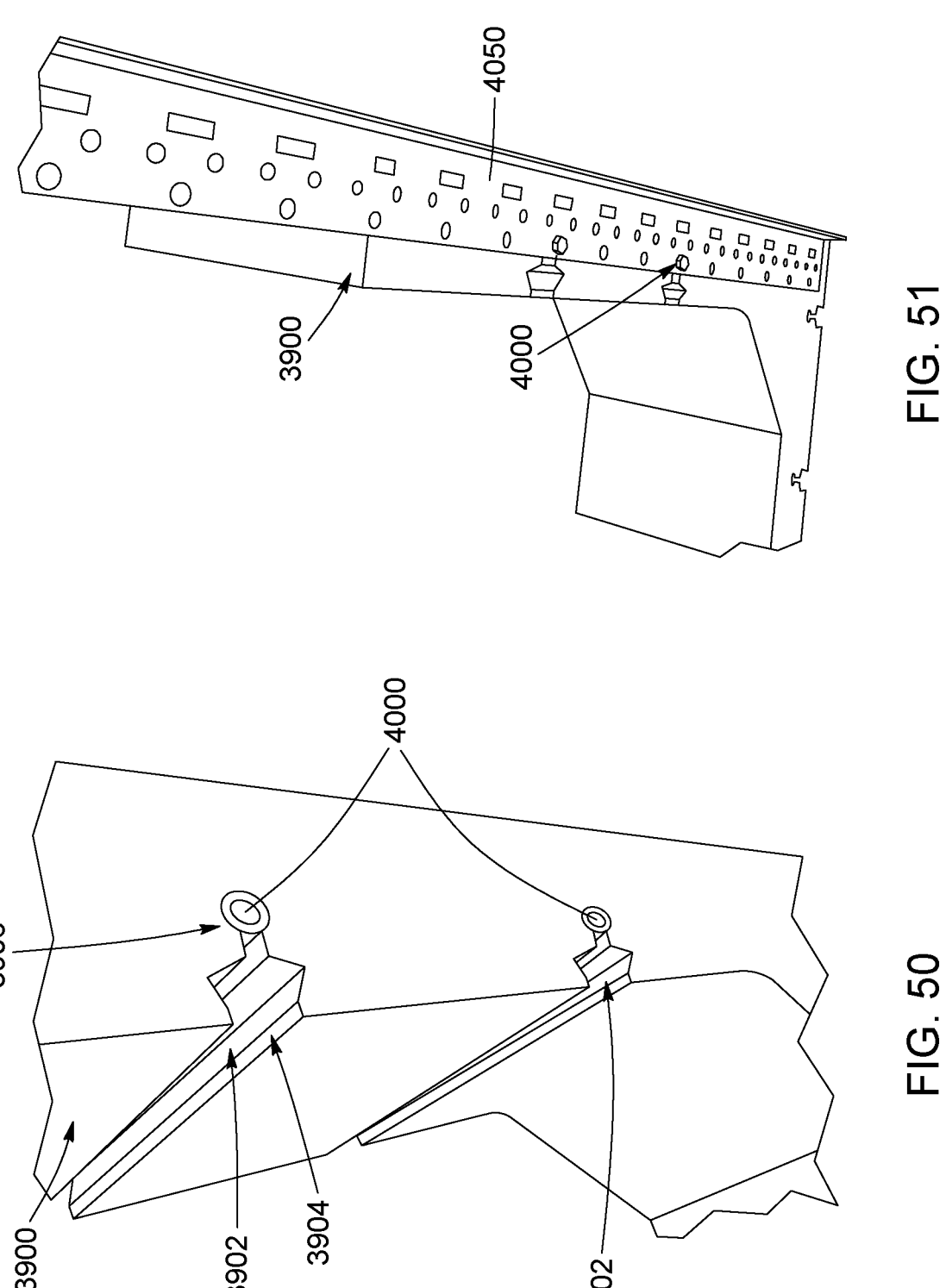
FIG. 50 is a perspective view showing a portion of the wall section illustrated in FIG. 49, with a tubular metallic insert received in an inner groove portion of the wall section.
FIG. 51 is another perspective view of the portion of the wall section illustrated in FIG. 49, with a metallic structure mounted to the wall section.

Referring now to FIGS. 49 to 51, there is shown a wall section 3900 for a modular building system, in accordance with another embodiment. In the embodiment illustrated in FIGS. 49 to 51, the wall section 3900 includes a plurality of grooves 3902, similarly to the wall sections 1102 and 2902 described above.

In this embodiment, each groove 3902 includes an outer groove portion 3904 having a trapezoidal cross-section and an inner groove portion 3906 defined in the outer groove portion 3904 and having a keyhole-shaped cross-section. This configuration, which generally represent a "hybrid" or combination of the grooves 1318*a*, 1318*b*, 1318*c*, 1318*d* from the modular building system 1100 and of the grooves 2906 from the modular building system 2900, allows the groove 3902 to receive both trapezoidal connectors similar to the connectors 1350, 1352 and keyhole-shaped connectors similar to the connectors 3000, 3002.

As shown in FIGS. 50 and 51, the grooves 3902 may further be used to secured other types of structures to the wall section 3900. For example, a tubular metallic insert 4000 could be received in the inner groove portion 3906 and would allow a metallic structure 4050 to be secured to the wall section 3900 using fasteners engaging the tubular metallic insert 4000. Other types of structures or equipment may further be secured to the wall section 3900 using other securing means which a skilled person would consider to be appropriate.

Turning now to FIGS. 52A to 54, there is shown a modular wall system 5500, in accordance with yet another embodiment. The modular wall system 5500 is generally similar to the modular wall system 1100 described above and includes a plurality of wall sections 5502 and a plurality of connecting assemblies 5504 connecting together the wall sections 5502.

The plurality of wall sections 5502 includes at least a first wall section 5502a and a second wall section 5502b adjacent the first wall section 5502a. Each wall section 5502a, 5502b is generally similar to the wall sections 1102 described above. More specifically, each wall section 5502a, 5502b is L-shaped and includes a generally elongated panel portion 5600 and a base portion 5602 extending generally perpendicularly to the panel portion 5600.

Each wall section 5502a, 5502b further includes a pair of opposite, generally L-shaped lateral faces 5604, a top face 5606, a rear panel face 5608 and a front panel face 5610 opposite the rear panel face 5608. The wall section 5502 further includes a top base face 5612 and a rear base face 5614 located on the base portion 5600 and extending generally perpendicular to each other. The wall section 5502 further includes an intermediate rear face 5616 which extends between the rear panel face 5608 and the top base face 5612 and which is angled relative to the rear panel face 5608 and the top base face 5612.

Still referring to FIGS. 52A to 54, the wall section 5502 further includes a plurality of grooves 5618a, 5618b, 5618c, 5618d, 5618e extending between the lateral faces 5604 of the wall section 5502. More specifically, the wall section 5502 includes an upper panel groove 5618a defined on the rear panel face 5608 and a lower panel groove 5618b also defined on the rear panel face 5608 and located below the upper panel groove 5618a towards the intermediate rear face 5616. In the embodiment illustrated in FIGS. 52A to 54, the wall section 5502 further includes a center panel groove 5618c located between the upper and lower panel grooves 5618a, 5618b. The wall section 5502 further includes a top base groove 5618d defined in the top base face 5612 and a rear base groove 5618e defined in the rear base face 5614. Similarly to the grooves described above, the grooves 5618a, 5618b, 5618c, 5618d, 5618e all have a generally dovetail-shaped cross-section.

Figures 52A, 52B:
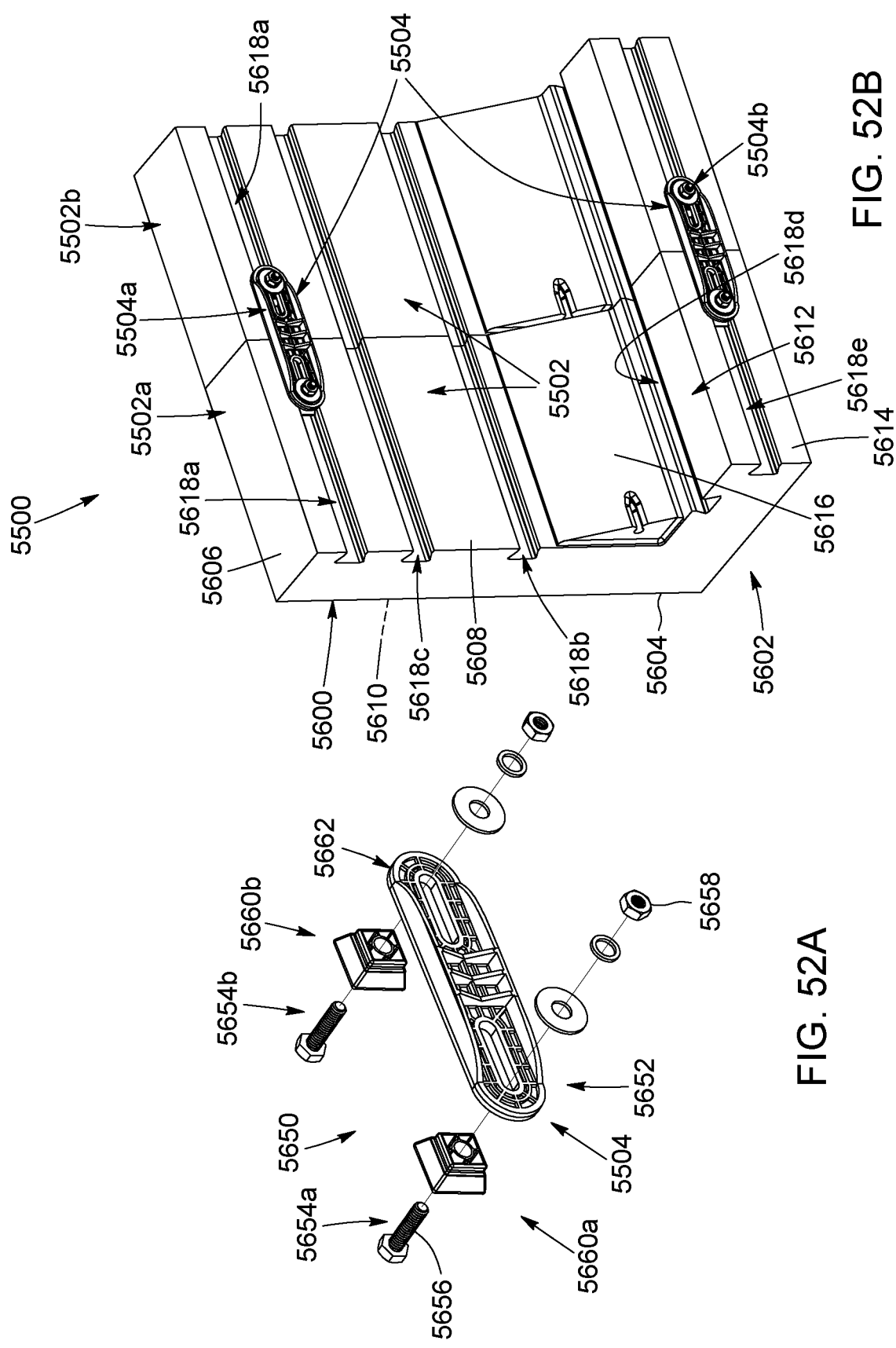
FIG. 52A is a rear perspective view of a hardware structure built using a modular wall system, in accordance with one embodiment.
FIG. 52B is an exploded perspective view of a connection assembly for the modular wall system illustrated in FIG. 52A.
Figures 53, 54:
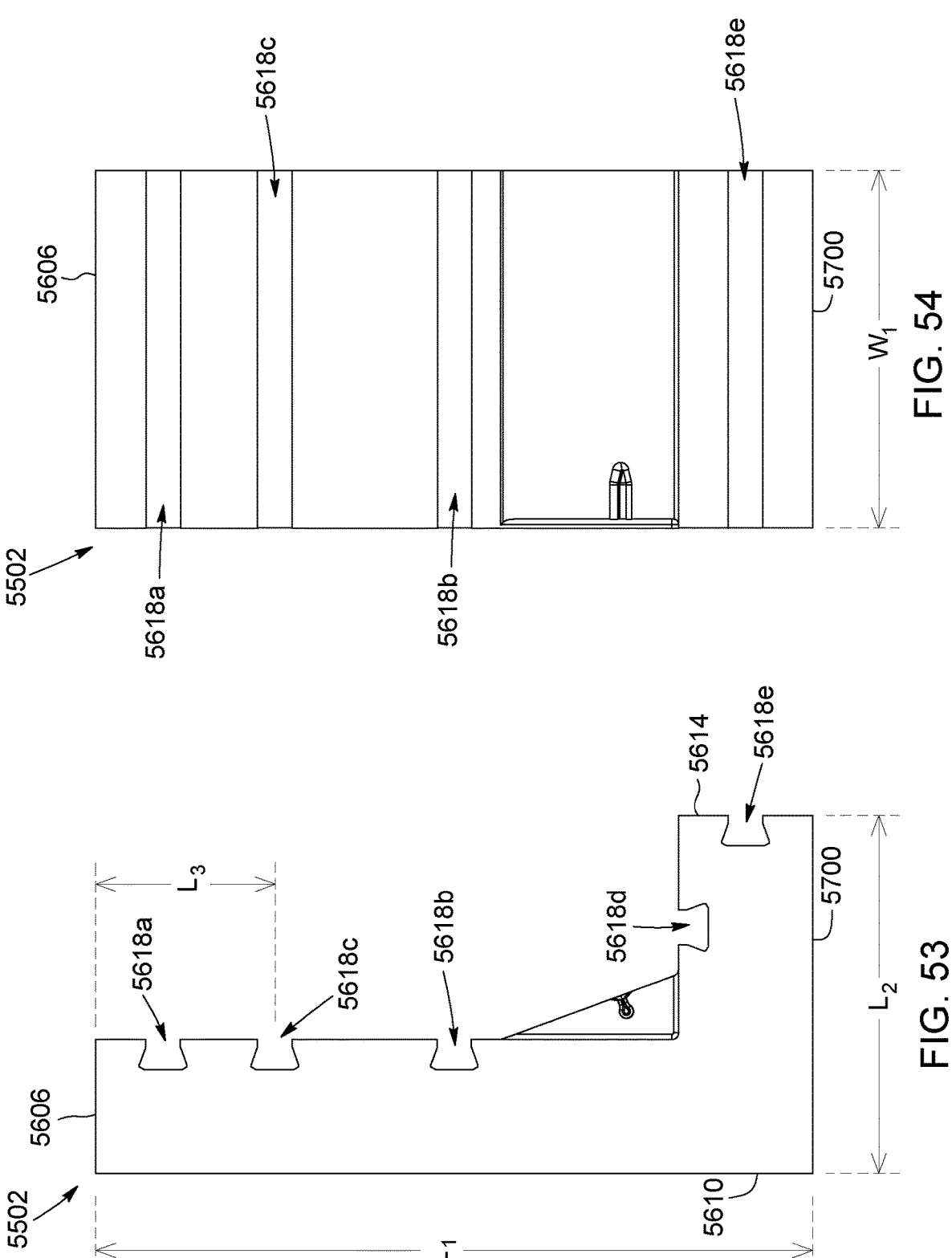
FIG. 53 is a side elevation view of the wall section for the modular building system illustrated in FIG. 52A.
FIG. 54 is a rear elevation view of the wall section for the modular building system illustrated in FIG. 52A.

In the configuration illustrated in FIG. 52A, the first and second wall sections 5502a, 5502b are connected together using an upper connecting assembly 5504a engaging the top panel grooves of the wall sections 5502a, 5502b and a lower connecting assembly 5504b engaging the rear base grooves of the wall sections 5502a, 5502b. It will be understood that this configuration is provided as an example and that the first and second wall sections 5502a, 5502b could instead be connected together using a single connecting assembly 5504 or more than two connecting assemblies 5504 engaging respective grooves of the first and second wall sections 5502a, 5502b.

In embodiment illustrated in FIGS. 52A to 54, each connecting assembly 5504 includes a connecting member 5650, a compression member 5652 and two fasteners 5654a, 5654b extending between the connecting member 5650 and the compression member 5652 to connect together the connecting member 5650 and the compression member 5652. Similarly to the connecting members 1104 described above, each fastener 5654a, 5654b includes a bolt 5656 and a nut 5658 which can engage the bolt 5656 and be tightened to push the compression member 5652 against the rear panel face 5608 to thereby increase friction between the compression member 5652 and the wall sections 5502a, 5502b and substantially prevent movement of the first and second wall sections 5502a, 5502b relative to each other.

In this embodiment, the connecting member 5650 includes first and second connectors 5660a, 5660b which are adapted to be received in respective corresponding grooves of the first and second wall sections 5502a, 5502b. For example, the first and second connectors 5660a, 5660b of the upper connecting assembly 5504a are adapted to be received respectively in the upper panel groove 5618a of the first wall section 5502a and in the upper panel groove 5618a of the second wall section 5502b.

Still in the embodiment illustrated in FIGS. 52A to 54, the compression member 5652 includes a single, continuous compression plate 5662 which overlaps both the first wall section 5502a and the second wall section 5502b. The compression plate 5662 therefore creates a link between the first and second wall sections 5502a, 5502b and thereby prevents the first and second wall sections 5502a, 5502b from moving away from each other.

Figure 56:
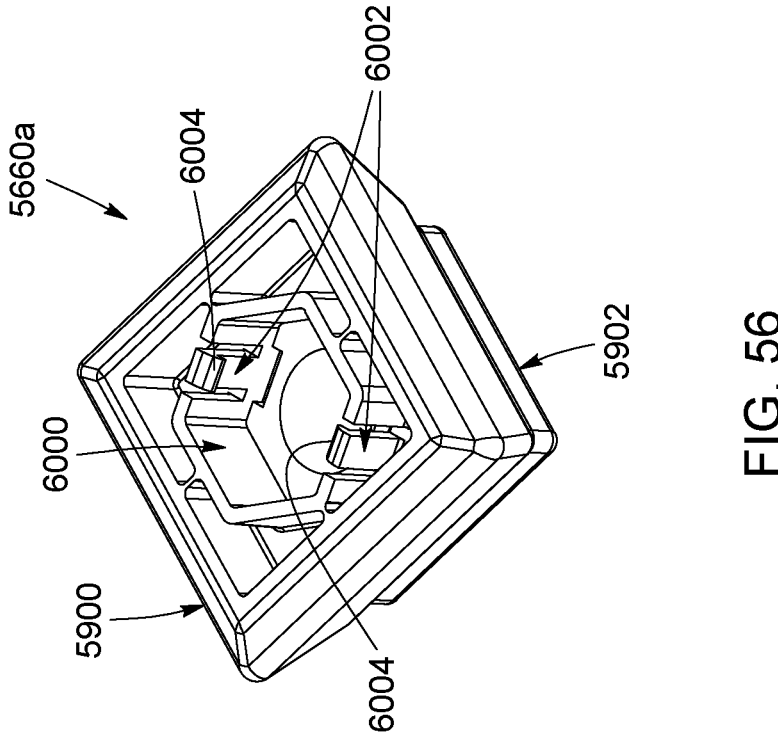
FIG. 56 is a bottom perspective view of the connector for the connecting assembly illustrated in FIG. 52B.
Figure 55:
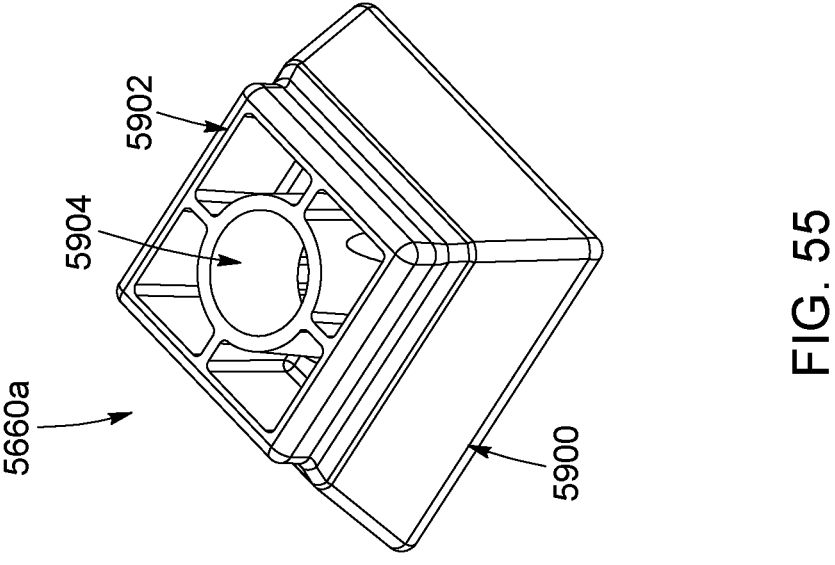
FIG. 55 is a top perspective view of a connector for the modular building system illustrated in FIG. 52A.

Now referring to FIGS. 55 and 56, each connector 5660a, 5660b is generally square and includes a tapered base 5900 and a square projection 5902 extending away from the tapered base 5900. The connector 5660a, 5660b further includes a circular fastener bore 5904 extending through the tapered base 5900 and the square projection 5902 for receiving a corresponding fastener 5654a, 5654b, and a fastener recess 6000 extending into the tapered base 5900 to receive a bolt head of the bolt 5656. More specifically, the fastener recess 6000 is located opposite the square projection 5902 and is generally coaxial to the fastener bore 5904. In this embodiment, the bolt head is hexagonal and the recess 6000 is correspondingly hexagonal to snuggly receive the bolt head and thereby to prevent the bolt 5656 from rotating relative to the connector 5660a, 5660b once the bolt head is received in the fastener recess 6000.

In the embodiment illustrated in FIGS. 55 and 56, the connector 5660a, 5660b further includes a pair of clip arms 6002a, 6002b resiliently connected to the tapered base 5900 and located opposite each other across the fastener recess 6000. Each clip arm 6002a, 6002b includes a retaining tab 6004 extending generally perpendicularly to the clip arm 6002a, 6002b and extending towards the other retaining tab 6004. In this configuration, the retaining tabs 6004 are spaced from each other by a distance which is smaller than a diameter or a size of the bolt head. When the fastener 5654a, 5654b is inserted in the fastener bore 5904, the bolt head will therefore eventually abut the retaining tabs 6004, which will cause the clip arms 6002a, 6002b to be deformed away from each other from their initial position. The clip arms 6002a, 6002b are further configured such that when the bolt head is fully engaged in the fastener recess 6000, the bolt head is past the retaining tabs 6004, which allows the clip arms 6002a, 6002b to move back towards each other towards their initial position. In this configuration, the retaining tabs 6004 abut the rear of the bolt head and thereby prevent the bolt 5656 from further moving axially relative to the connector 5660a, 5660b. It will be understood that this configuration may generally facilitate the installation of the connecting assemblies 5504 within the grooves.

Figures 57, 58:
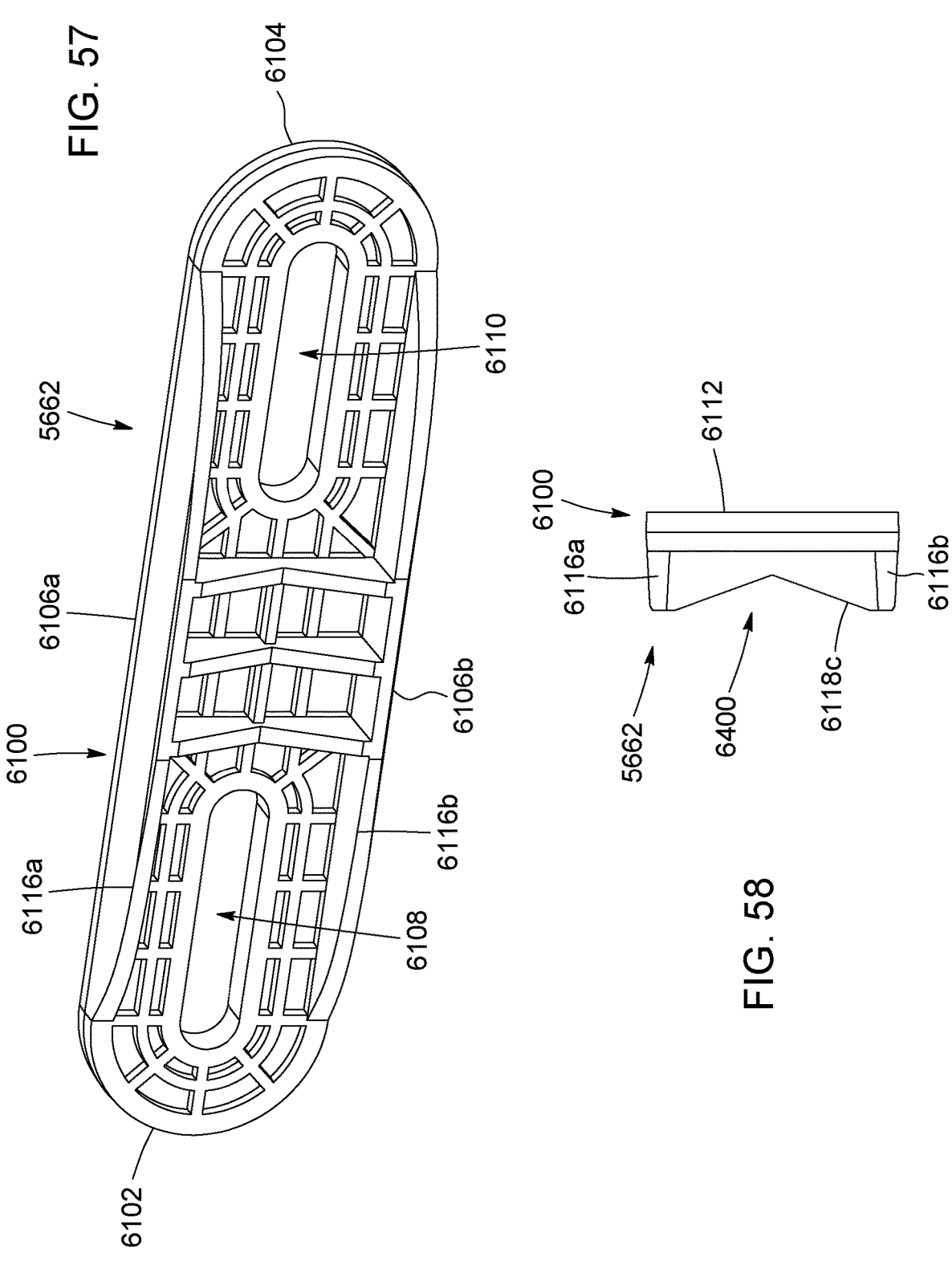
FIG. 57 is a perspective view of a compression member for the connecting assembly illustrated in FIG. 52B.
FIG. 58 is a side elevation view of the compression member for the connecting assembly illustrated in FIG. 52B.

Now turning to FIGS. 57 and 58, the compression plate 5662 is generally elongated and includes a generally planar body panel 6100 having a first end 6102, a second end 6104 located opposite the first end 6102 and a pair of opposite sides 6106a, 6106b extending between the first and second ends 6102, 6104. The compression plate further includes first and second elongated slots 6108, 6110 defined in the body panel 6100 and extending generally longitudinally relative to a longitudinal axis of the compression plate 5662 for receiving the fasteners 5654a, 5654b connecting the compression plate 5662 to the connectors 5660a, 5660b.

Still in the embodiment illustrated in FIGS. 57 and 58, the body panel 6100 further includes a front face 6112 adapted to be placed against the rear panel face 5608 of the first and second wall sections 5502a, 5502b and a rear face 6114 located opposite the front face 6112. The compression plate 5662 further includes a pair of spaced-apart and elongated longitudinal projections 6116a, 6116b extending away from the rear face 6114 of the body panel 6100 along the sides 6106a, 6106b of the body panel 6100 and a plurality of transversal projections 6118 extending generally transversely to the body panel 6100 between the longitudinal projections 6116a, 6116b. In the embodiment illustrated in FIGS. 57 and 58, the plurality of transversal projections 6118 includes three spaced-apart transversal projections 6118a, 6118b, 6118c longitudinally located between the first and second elongated slots 6108, 6110. Each transversal projection 6118 includes a V-shaped indent 6400 extending towards the body panel 6100, as best shown in FIG. 58.

Figure 59:
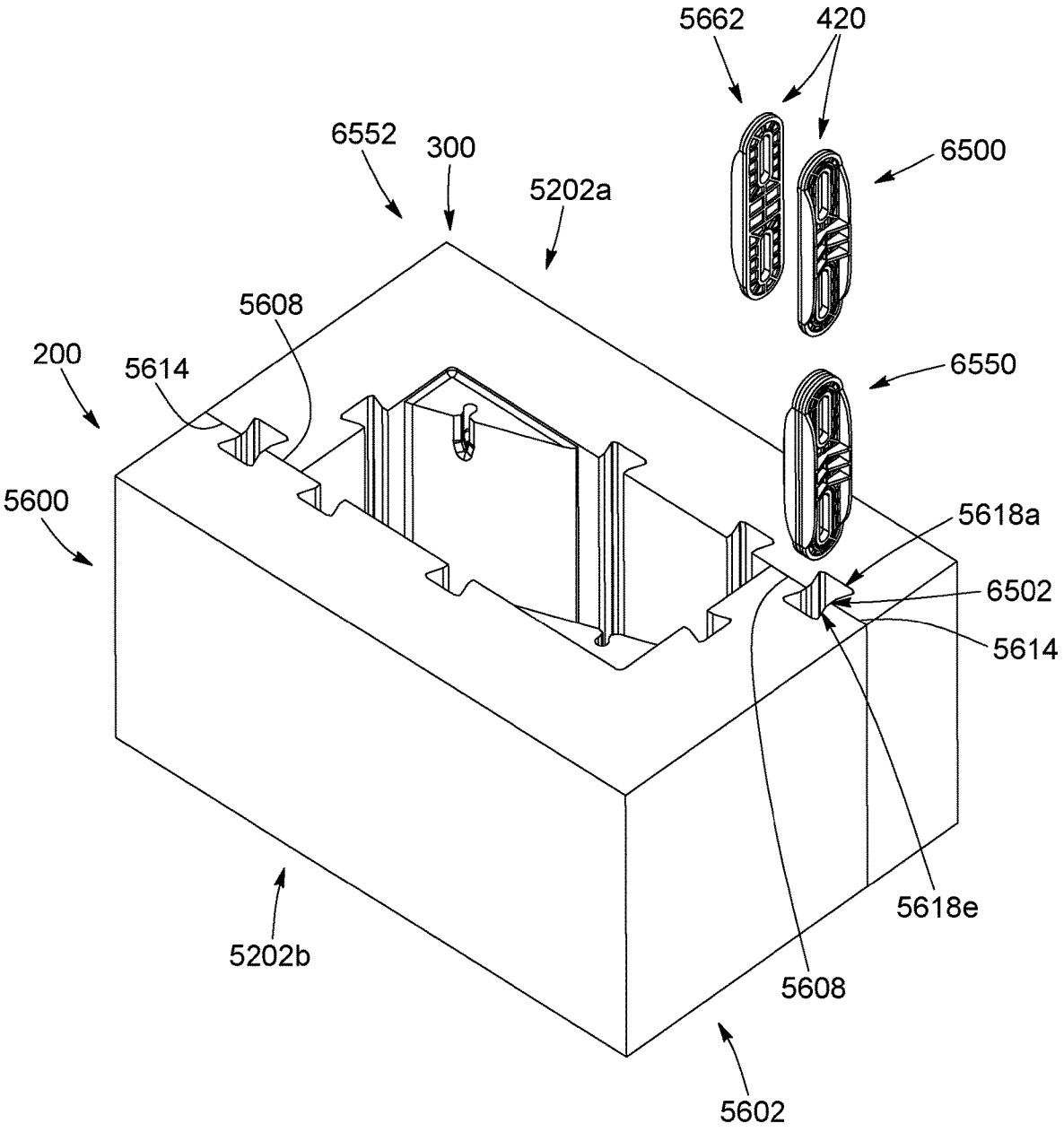
FIG. 59 is a partially exploded perspective view of a rectangular frame unit including first and second wall sections of the modular building system illustrated in FIG. 52, with a coupling assembly shown being assembled to be slidably inserted in a coupling recess formed between the first and second wall sections.
Figure 60:
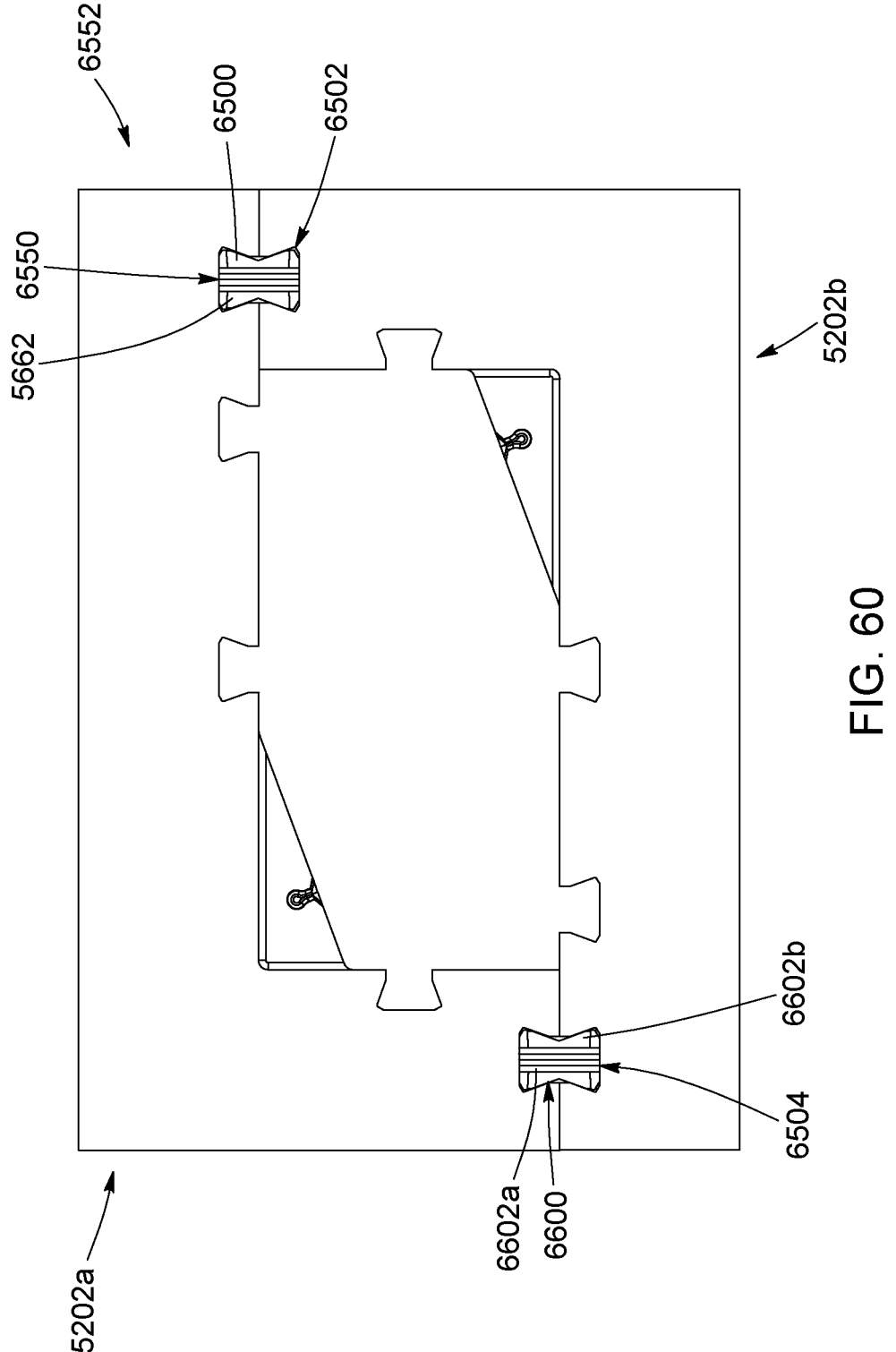
FIG. 60 is a top plan view of the rectangular frame unit illustrated in FIG. 59, with two coupling assemblies connecting together the first and second wall sections.
Figure 61:
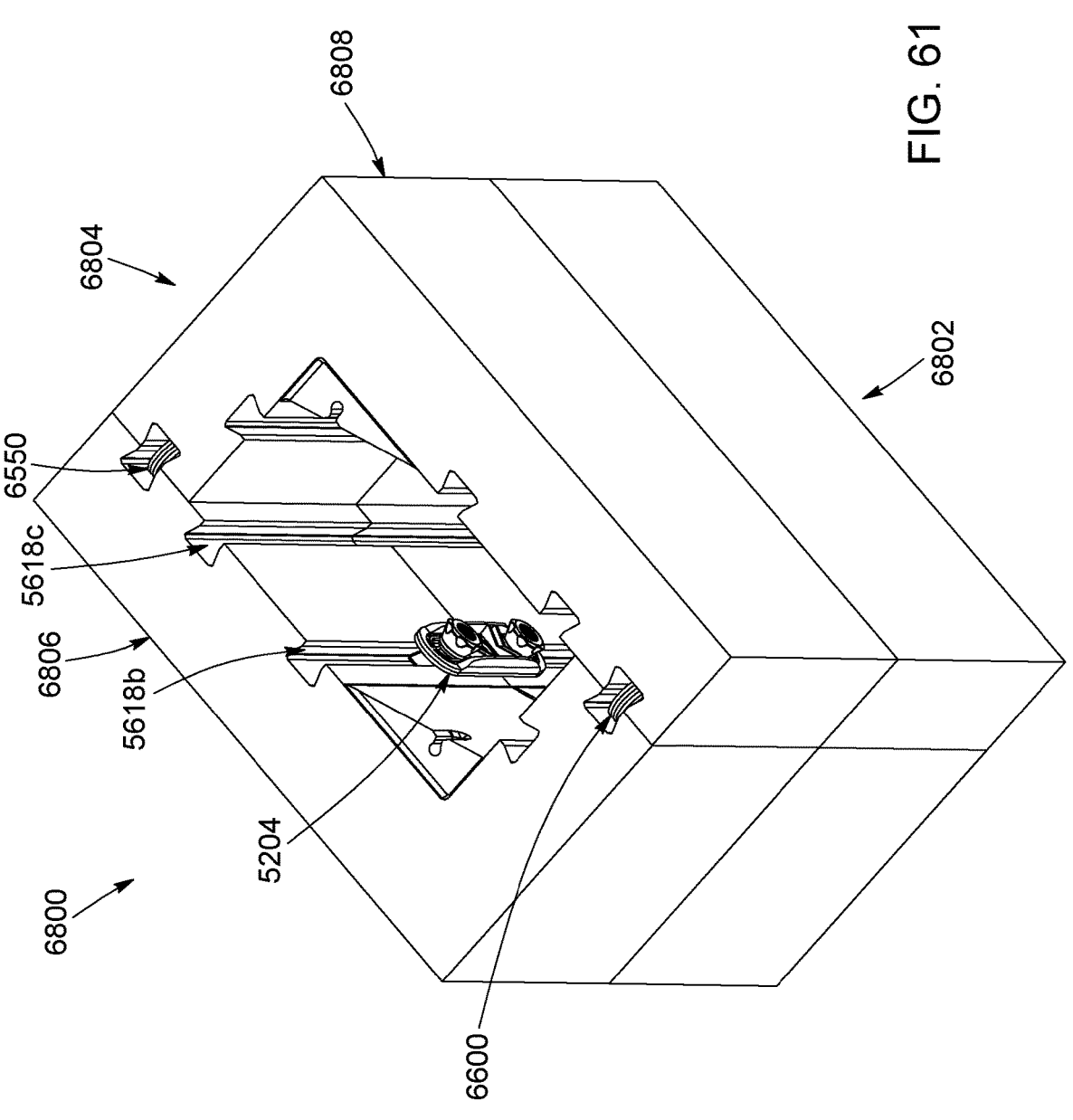
FIG. 61 is a perspective view of a hardscape structure made of first and second rectangular frame units as illustrated in FIG. 59, with the first rectangular frame unit lying on its side and the second rectangular frame unit stacked on top of the first rectangular frame unit.

Referring now to FIGS. 59 to 61, the compression plate 5662 is sized and shaped to be able to be combined with another, identical compression plate 6500 to form a coupling member 6550 which is adapted to connect two adjacent wall sections. More specifically, the body panel 6100 of the two compression plates 5662, 6500 are positioned parallel to each other and the front faces 6112 of the two compression plates 5662, 6500 are placed against each other, as shown in FIG. 59, and define a generally bowtie-shaped cross-section when viewed from one of the first and second ends 6102, 6104 of the body panel 6100, as best shown in FIG. 60. The two compression plates 5662, 6500 could further be connected together using one or more fasteners to prevent the two compression plates 5662, 6500 from moving relative to each other.

In the example illustrated in FIGS. 59 to 61, the first and second wall sections 5202a, 5202b are configured to form together a rectangular frame unit 6552. More specifically, the first and second wall sections 5202a, 5202b are lying on their sides such that their rear panel faces 5608 face each other. The first and second wall sections 5202a, 5202b are further positioned in an inverted configuration in which the base portion 5602 of each wall section 5202a, 5202b is oriented towards the panel portion 5600 of the other wall section 5202a, 5202b. In this configuration, the rear base face 5614 of the first wall section 5502a is placed against the rear panel face 5608 of the second wall section 5502b, and the rear base face 5614 of the second wall section 5502b is placed against the rear panel face 5608 of the first wall section 5502a. Furthermore, the upper panel groove 5618a of the first wall section 5502a is aligned with the rear base groove 5618e of the second wall section 5502b and the upper panel groove 5618a of the second wall section 5502b is aligned with the rear base groove 5618e of the first wall section 5502a.

In this configuration, the upper panel groove 5618a of the first wall section 5502a and the rear base groove 5618e of the second wall section 5502b together form a first coupling recess 6502 having a generally bowtie-shaped cross-section defined by the dovetail-shaped cross-sections of the two grooves 5618a, 5618e.

The first coupling recess 6502 is sized and shaped to slidably receive the coupling member 6550 which thereby holds the first and second wall sections 5202a, 5202b together and prevents the first and second wall sections 5202a, 5202b from moving away from each other.

Still referring to FIGS. 59 to 61, the upper panel groove 5618a of the second wall section 5502b and the rear base groove 5618e of the first wall section 5502a together define a second coupling recess 6504, which is sized and shaped to receive an additional coupling member 6600, identical to the coupling member 6550 and similarly made of two compression plates 6602a, 6602b.

It will be appreciated that in this embodiment, the first and second wall sections 5502a, 5502b could therefore be connected together using only compression plates 5662, 6500, without requiring connectors or fasteners, to define together the rectangular frame unit 6552 described above. The rectangular frame unit 6552 may further be combined with additional frame units to define various structures.

For example, FIG. 61 shows a structure 6800 made of a first rectangular frame unit 6802 lying on its side and a second rectangular frame unit 6804 also lying on its side and stacked on top of the first rectangular frame unit 6802, each rectangular frame unit 6802, 6804 being made of first and second wall sections 6806, 6808 connected together using coupling members 6810, similarly to the rectangular 6552 frame unit described above.

In this embodiment, the first and second rectangular frame units 6802, 6804 may further be connected together using one or more connecting assemblies 5204. More specifically, the first wall section 6806 of the first rectangular frame unit 6802 and the first wall section 6806 of the second rectangular frame unit 6804 are adjacent each other and disposed in a side-by-side configuration such that their panel portions 5600 are disposed towards each other and that their base portions 5602 are disposed towards each other. In this configuration, the lower panel grooves 5618b of the first and second rectangular frame units 6802, 6804 are in longitudinal alignment with each other, and the center panel grooves 5618c of the first and second rectangular frame units 6802, 6804 are also in longitudinal alignment with each other. The lower panel grooves 5618b and the center panel grooves 5618c and may therefore each receive a connecting assembly 5504 for connecting together the first and second rectangular frame units 6802, 6804.

It will be appreciated that each connecting assembly 5504 includes a compression plate which is similar to the compression plates 5662, 6500 forming the coupling members 6550, 6600. This allows the number of different parts used for assembling the structure to be substantially minimized, thereby further minimizing the cost and the complexity associated with the assembly of the structure 6800.

Figure 62:
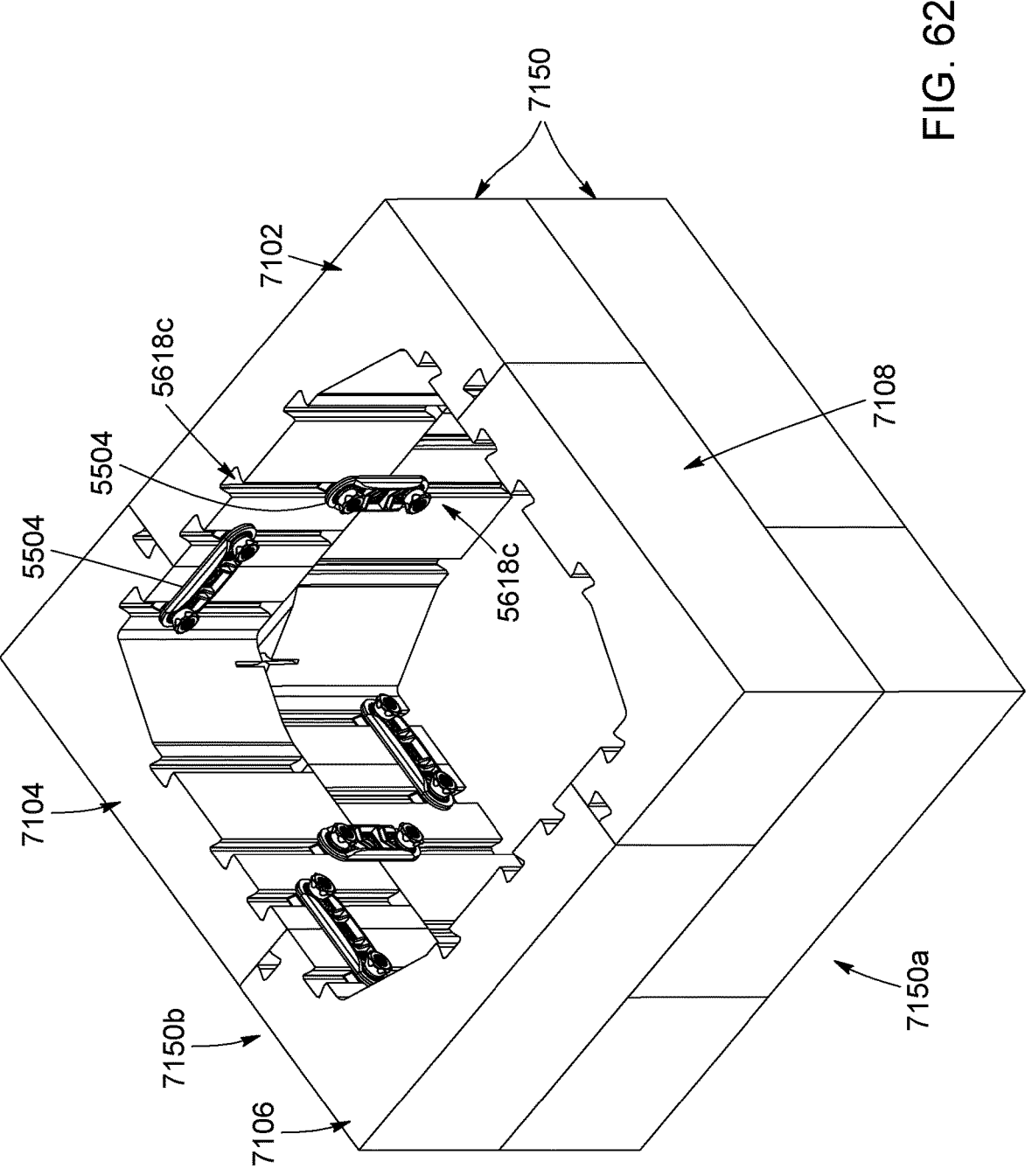
FIG. 62 is a perspective view of another hardscape structure made of lower and upper square frame units including wall sections of the modular wall system illustrated in FIG. 59, with the upper square frame unit being stacked on top of the lower square frame unit and configured such that the wall sections of the upper square frame unit are staggered relative to the wall sections of the lower square frame unit.

FIG. 62 shows a structure 7100 including a lower square frame unit 7150a and an upper square frame unit 7150b stacked on top of the lower square frame unit 7150a. Each square frame unit 7150 includes first, second, third and fourth wall sections 7102, 7104, 7106, 7108 lying on their sides and placed end-to-end in a cyclic pattern. Specifically, the first and second wall sections 7102, 7104 are positioned relative to each other such that the second wall section 7104 is pivoted at about a 90-degree angle relative to the first wall section 7102 and the top face 5606 of the first wall section 7102 is placed against the rear base face 5614 of the second wall section 7104. Similarly, the third wall section 7106 is positioned relative to the second wall section 7104 such that the third wall section 7106 is pivoted at about a 90-degree angle relative to the second wall section 7104 and the top face 5606 of the second wall section 7104 is placed against the rear base face 5614 of the third wall section 7106. Still similarly, the fourth wall section 7108 is positioned relative to the third wall section 7106 such that the fourth wall section 7108 is pivoted at about a 90-degree angle relative to the third wall section 7106 and the top face 5606 of the third wall section 7106 is placed against the rear base face 5614 of the fourth wall section 7108. In this arrangement, the first wall section 7102 is further pivoted at about a 90-degree angle relative to the fourth wall section 7108 and the top face 5606 of the fourth wall section 7108 is placed against the rear base face 5614 of the first wall section 7102.

Furthermore, while the wall sections 7102, 7104, 7106, 7108 of the upper square frame unit 7150*b* are lying on a first one of their lateral faces, the wall sections 7102, 7104, 7106, 7108 of the lower square frame unit 7150*a* are lying on the other one of their lateral faces. In this configuration, the wall sections 7102, 7104, 7106, 7108 of the upper square frame unit 7150*b* are therefore generally staggered relative to the wall sections 7102, 7104, 7106, 7108 of the lower square frame unit 7150*a* instead of being aligned with the wall sections 7102, 7104, 7106, 7108 of the lower square frame unit 7150*a*. In other words, each wall section 7102, 7104, 7106, 7108 of one of the units 7150*a*, 7150*b* overlaps two adjacent wall sections 7102, 7104, 7106, 7108 of the other unit 7150*a*, 7150*b*. It will be appreciated that this configuration prevents the formation of relatively long vertical joints in the structure 7100, which could define structural weaknesses in the structure 7100. Instead, by staggering the wall sections 7102, 7104, 7106, 7108 between adjacent units 7150*a*, 7150*b*, the length of the vertical joints in the structure 7100 is limited to the width of a wall section 7102, 7104, 7106, 7108.

It will also be appreciated that in this arrangement, due to the configuration of the wall sections 7102, 7104, 7106, 7108 and specifically of the location of the center panel groove 5618*c* on the wall sections 7102, 7104, 7106, 7108, the center panel grooves 5618*c* of the lower square frame unit 7150*a* are aligned with the center panel grooves 5618*c* of the upper square frame unit 7150*b*.

This allows the center panel grooves 5618*c* to receive connecting assemblies 5504 to thereby connect together the lower and upper square frame units 7150*a*, 7150*b*. The first, second, third and fourth wall sections 7102, 7104, 7106, 7108 of each square frame unit 7150*a*, 7150*b* may further be connected together using additional connecting assemblies 5504.

Figure 63B:
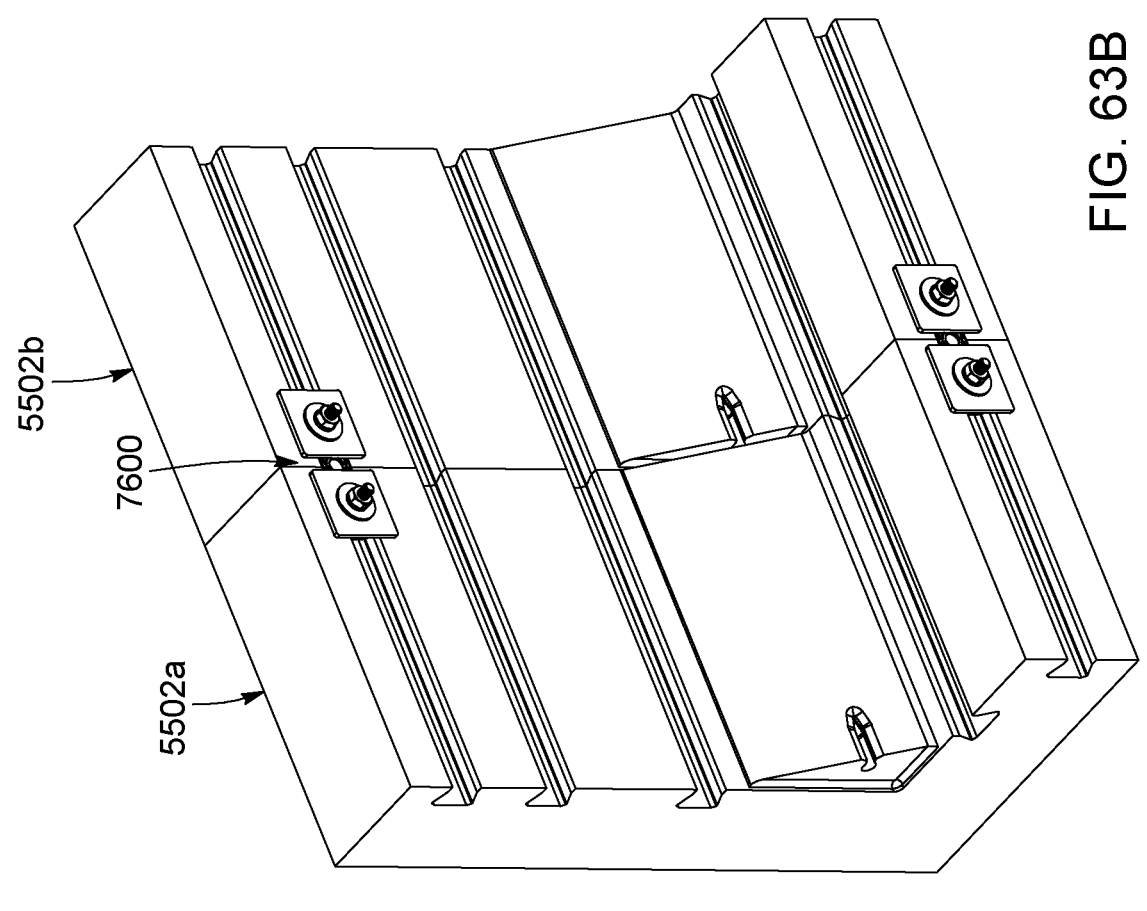
FIG. 63B is an exploded perspective view of a connection assembly for the modular wall system illustrated in FIG. 63A.
Figure 63A:
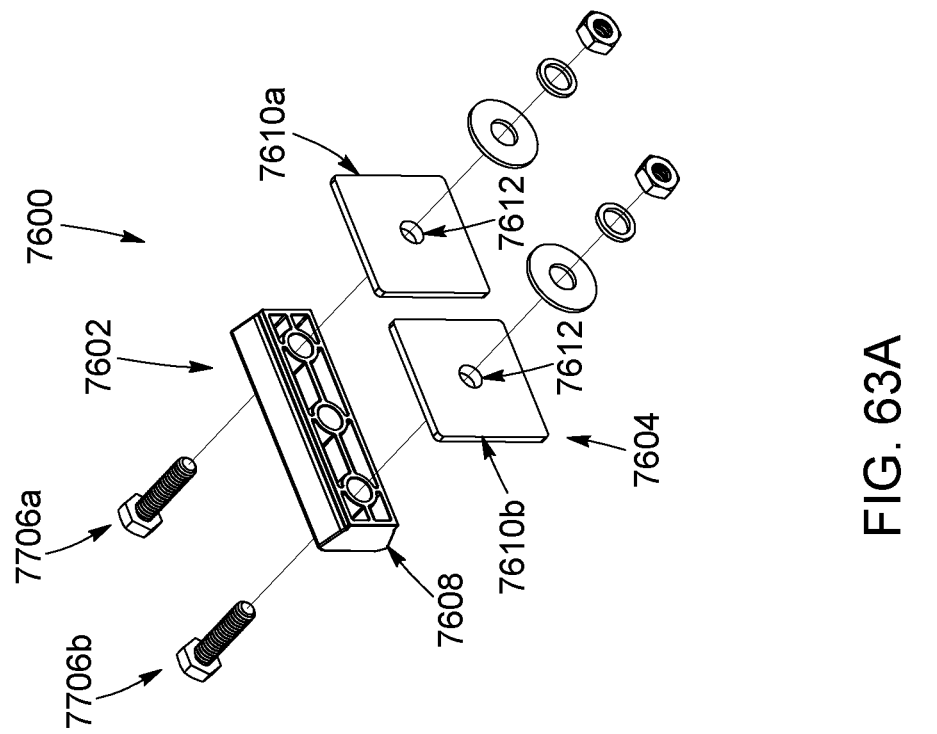
FIG. 63A is a rear perspective view of a hardware structure built using a modular wall system, in accordance with another embodiment.

Turning now to FIGS. 63A and 63B, there is shown a connecting assembly 7600 for connecting together the first and second wall sections 5502*a*, 5502*b*, in accordance with another embodiment.

In this embodiment, the connecting assembly 7600 still includes a connecting member 7602, a compression member 7604 and two fasteners 7606*a*, 7606*b* extending between the connecting member 7602 and the compression member 7604 to connect together the connecting member 7602 and the compression member 7604.

However, in this embodiment, the connecting member 7602 includes a single, continuous connector 7608 received in corresponding grooves of the first and second wall sections 5502*a*, 5502*b* and overlapping the first and second wall sections 5502*a*, 5502*b*, while the compression member 7604 includes first and second compression plates 7610*a*, 7610*b* distinct from each other and respectively disposed over the first and second wall sections 5502*a*, 5502*b*. The connector 7608 is generally similar to the connector 1350 described above, and each compression plate 7610*a*, 7610*b* is generally square-shaped and includes a central hole 7612 through which the corresponding fastener 7606*a*, 7606*b* extends. In this configuration, the connector 7608 therefore creates a link between the first and second wall sections 5502*a*, 5502*b*, and thereby prevents the first and second wall sections 5502*a*, 5502*b* from moving relative to each other.

Figure 64B:
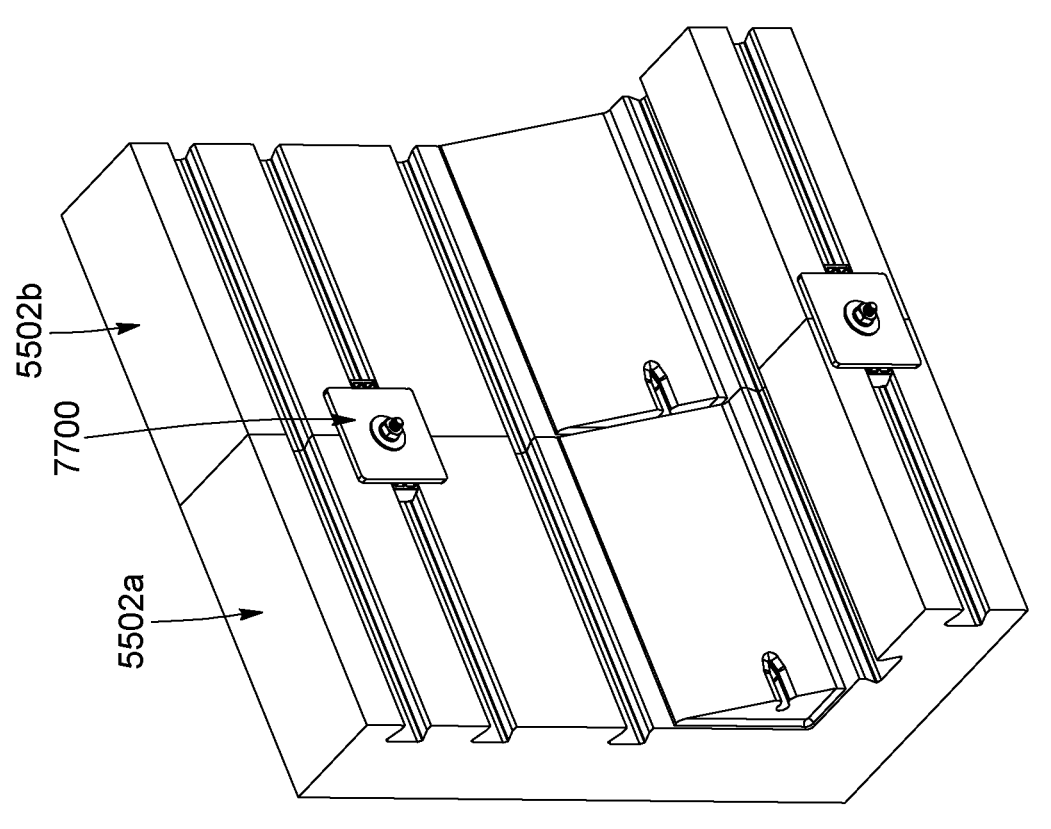
FIG. 64B is an exploded perspective view of a connection assembly for the modular wall system illustrated in FIG. 64A.
Figure 64A:
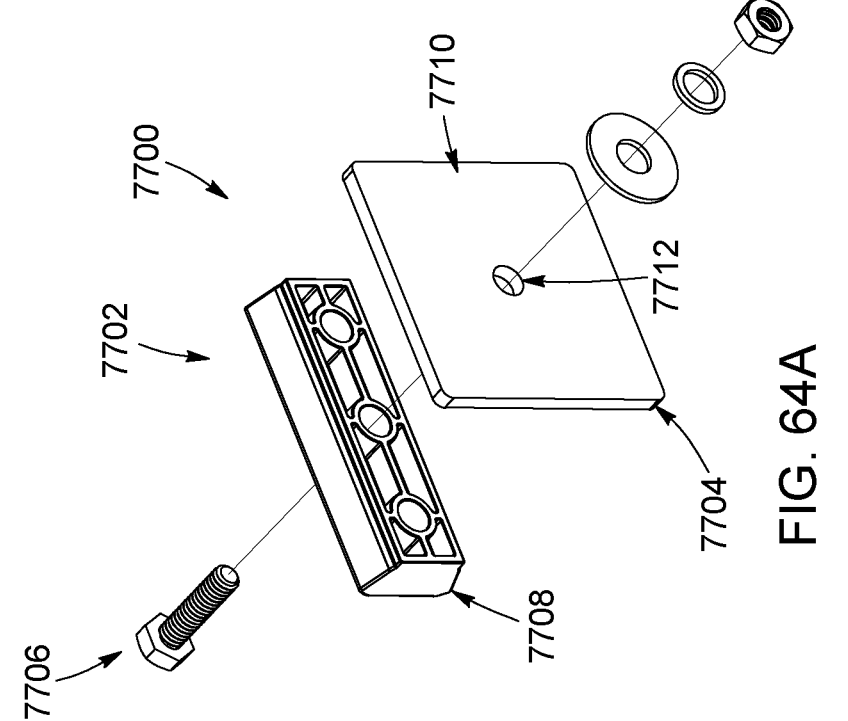
FIG. 64A is a rear perspective view of a hardware structure built using a modular wall system, in accordance with yet another embodiment.
Figure 65:
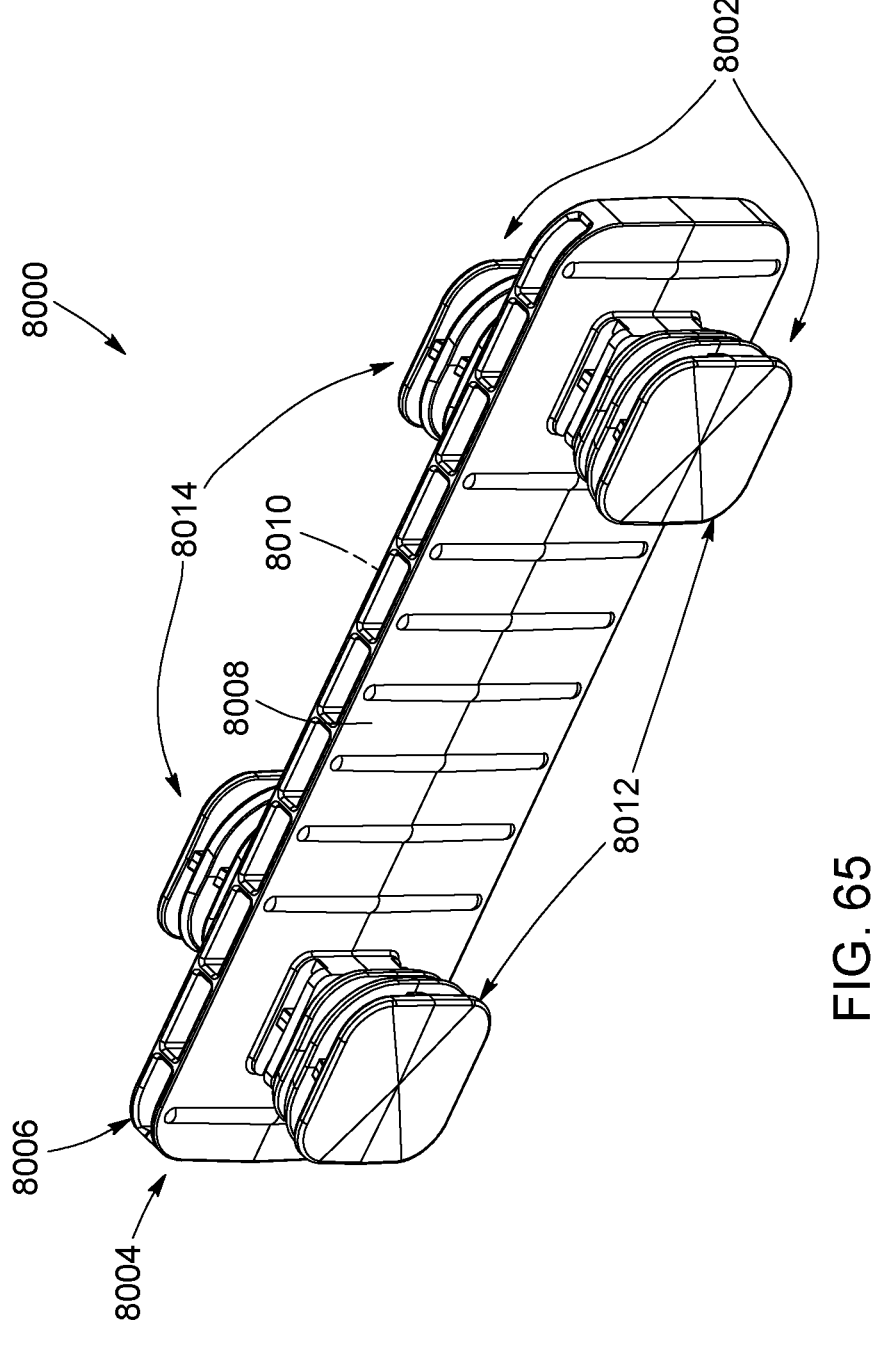
FIG. 65 is a perspective view of a connecting assembly for a modular building system, in accordance with another embodiment.

Referring now to FIGS. 64 and 64B, there is shown a connecting assembly 7700 for connecting together the first and second wall sections 5502*a*, 5502*b*, in accordance with yet another embodiment.

In this embodiment, the connecting assembly 7700 includes a connecting member 7702, a compression member 7704 and a fastener 7706 extending between the connecting member 7702 and the compression member 7704 to connect together the connecting member 7702 and the compression member 7704. More specifically, the connecting member 7702 includes a connector 7708, generally similar to the connector 1350 described above, which is received in corresponding grooves of the first and second wall sections 5502*a*, 5502*b*, and the compression member 7704 includes a single square-shaped compression plate 7710 having a central hole 7712 for receiving the fastener 7706. In this configuration, both the connector 7708 and the compression plate 7710 overlap the first and second wall sections 5502*a*, 5502*b* to thereby creates a link between the first and second wall sections 5502*a*, 5502*b* and prevent the first and second wall sections 5502*a*, 5502*b* from moving relative to each other.

Referring now to FIGS. 65 to 70, there is provided a connecting assembly 8000 for connecting together the first and second wall sections 5502*a*, 5502*b*, in accordance with yet another embodiment. In the illustrated embodiment, the connecting assembly 8000 includes a connecting member 8002 and a compression member 8004. In this embodiment, instead of being provided as separate components which are connectable using at least one fastener, the connecting member 8002 and the compression member 8004 are integrally formed together. Specifically, the compression member 8004 includes an elongated central plate 8006 which has a first face 8008 and a second face 8010 opposite the first face 8008. The connecting member 8002 includes a first pair of connecting portions 8012 extending away from the first face 8008 of the central plate 8006 and a second pair of connecting portions 8014 extending away from the second face 8010 of the central plate 8006. In the illustrated embodiment, all four connecting portions 8012, 8014 are generally identical. Specifically, all four connecting portions 8012, 8014 are generally pyramidal and are sized and shaped to snuggly engage a corresponding groove. Specifically, the connecting portions 8012, 8014 are sized and shaped such that, when the first or second pair of connecting portions 8012, 8014 are received in the corresponding grooves of the the first and second wall sections 5502*a*, 5502*b* such that the connecting assembly 8000 overlaps the first and second wall sections 5502*a*, 5502*b*, the central plate 8006 is substantially pressed against the first and second wall sections 5502*a*, 5502*b*. This configuration therefore forms an interference fit between the connecting assembly 8000 and the first and second wall sections 5502*a*, 5502*b*, which creates friction to thereby secure the first and second wall sections 5502*a*, 5502*b* together. The connecting portions 8012, 8014 themselves may also be sized and shaped to create friction within the grooves.

In this embodiment, the connecting assembly 8000 may therefore be forced into position manually by a user or using a tool such as a hammer or the like to push the connecting assembly 8000 laterally along the groove.

In the illustrated embodiment, the first pair of connecting portions 8012 are not aligned with the second pair of connecting portions 8014, but are instead offset relative to the first pair of connecting portions 8012. Alternatively, the first pair of connecting portions 8012 could be aligned with the second pair of connecting portions 8014.

Figure 66:
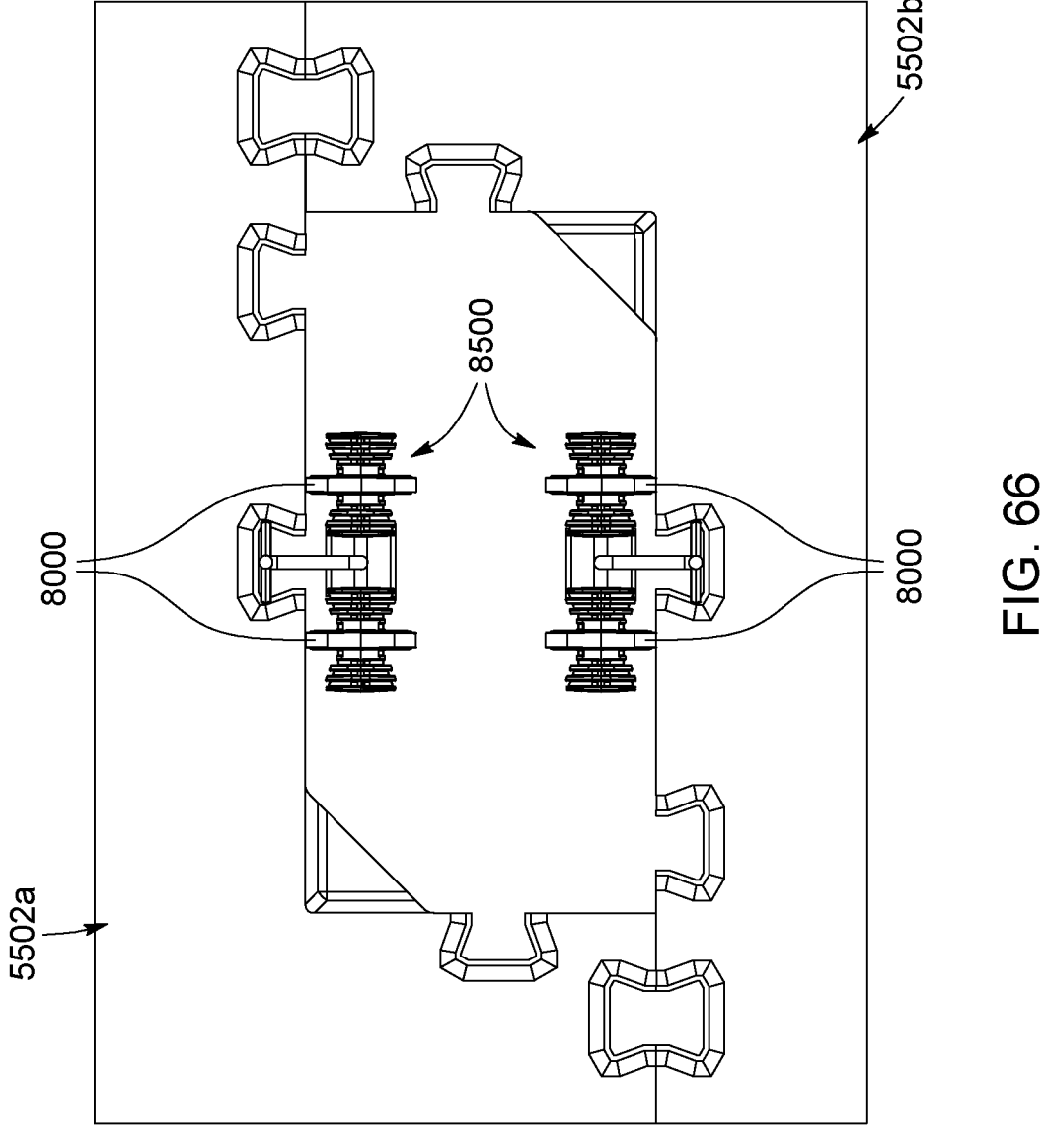
FIG. 66 is a top plan view of a pair of wall sections positioned in a head-to-toe configuration and a pair of connector providing assemblies connected to the wall sections, each connector providing assembly including two connecting assemblies illustrated in FIG. 65.

As shown in FIGS. 66 to 70, the connecting assembly 8000 may further be packaged so as to be conveniently provided along with the first and second wall sections 5502a, 5502b. For example, the first and second wall sections 5502a, 5502b could be positioned head-to-toe as shown in FIG. 66 to form a rectangular shape on a pallet, in a crate or the like to be provided to a customer. Two connector providing assemblies 8500 further engage corresponding grooves of the first and second wall sections 5502a, 5502b so as to be nested within the first and second wall sections 5502a, 5502b when the first and second wall sections 5502a, 5502b are provided to the customer.

In this embodiment, all the components of the connector providing assembly 8500 are formed together from a plastic polymer by molding and remain attached to each other by one or more sprues until the customer detaches the components from each other.

Specifically, as best shown in FIG. 67, each connector providing assembly 8500 includes a hook member 8550 for engaging the grooves, a sprue portion 8600 extending away from the hook member 8550 and the two connecting assemblies 8000 detachably connected from the sprue portion 8600. When the customer receives the first and second wall sections 5502a, 5502b with the connector providing assembly 8500, the customer may remove the hook member 8550 from the groove in which it is engaged and may detach the connecting assemblies 8000 from the sprue portion 8600.

In the illustrated embodiment, the hook member 8550 is generally U-shaped and includes spaced-apart barbed arms 8502 which create friction in the groove to thereby prevent the connector providing assembly 8500 from moving during transport or shipping. Alternatively, the hook member 8550 could have any other suitable configuration.

Figure 70:
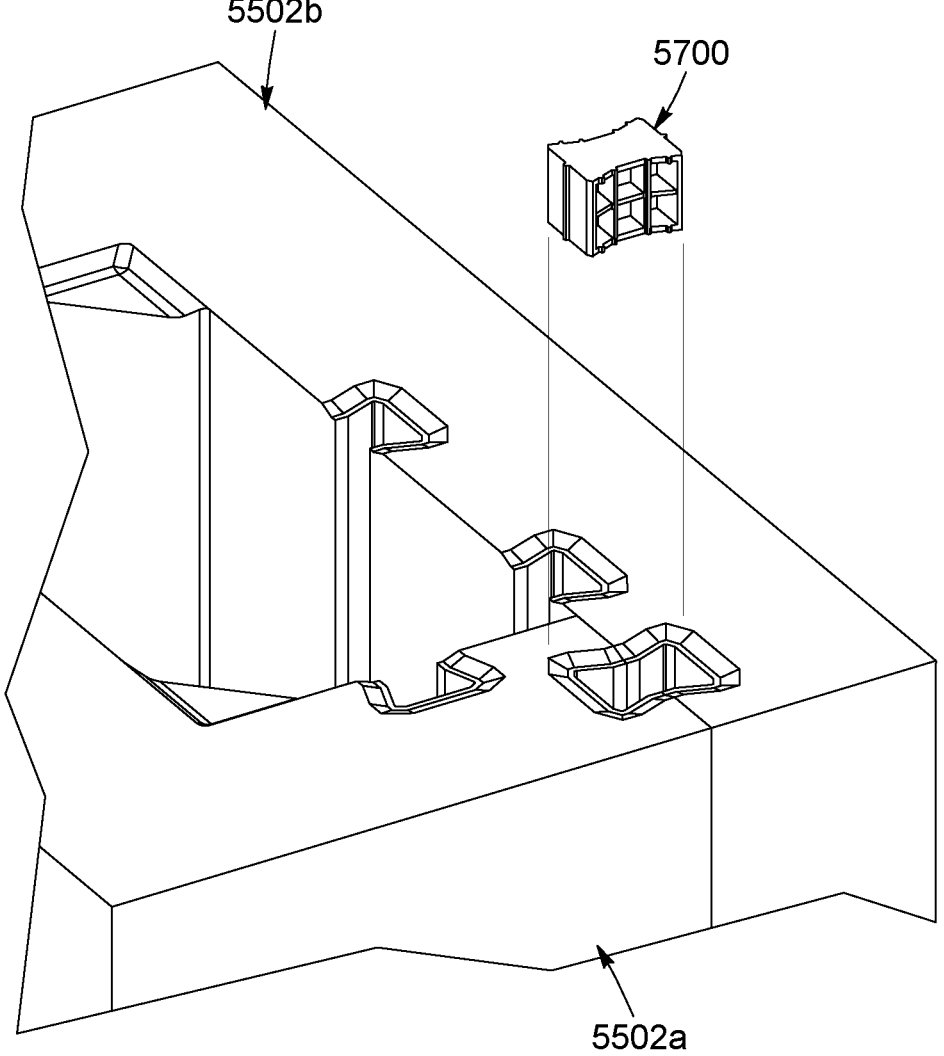
FIG. 70 is a partially exploded view of a mating surface connector provided in the connector providing assembly illustrated in FIG. 66, with the mating surface connector engaging opposing grooves of first and second wall sections.
Figures 71, 72:
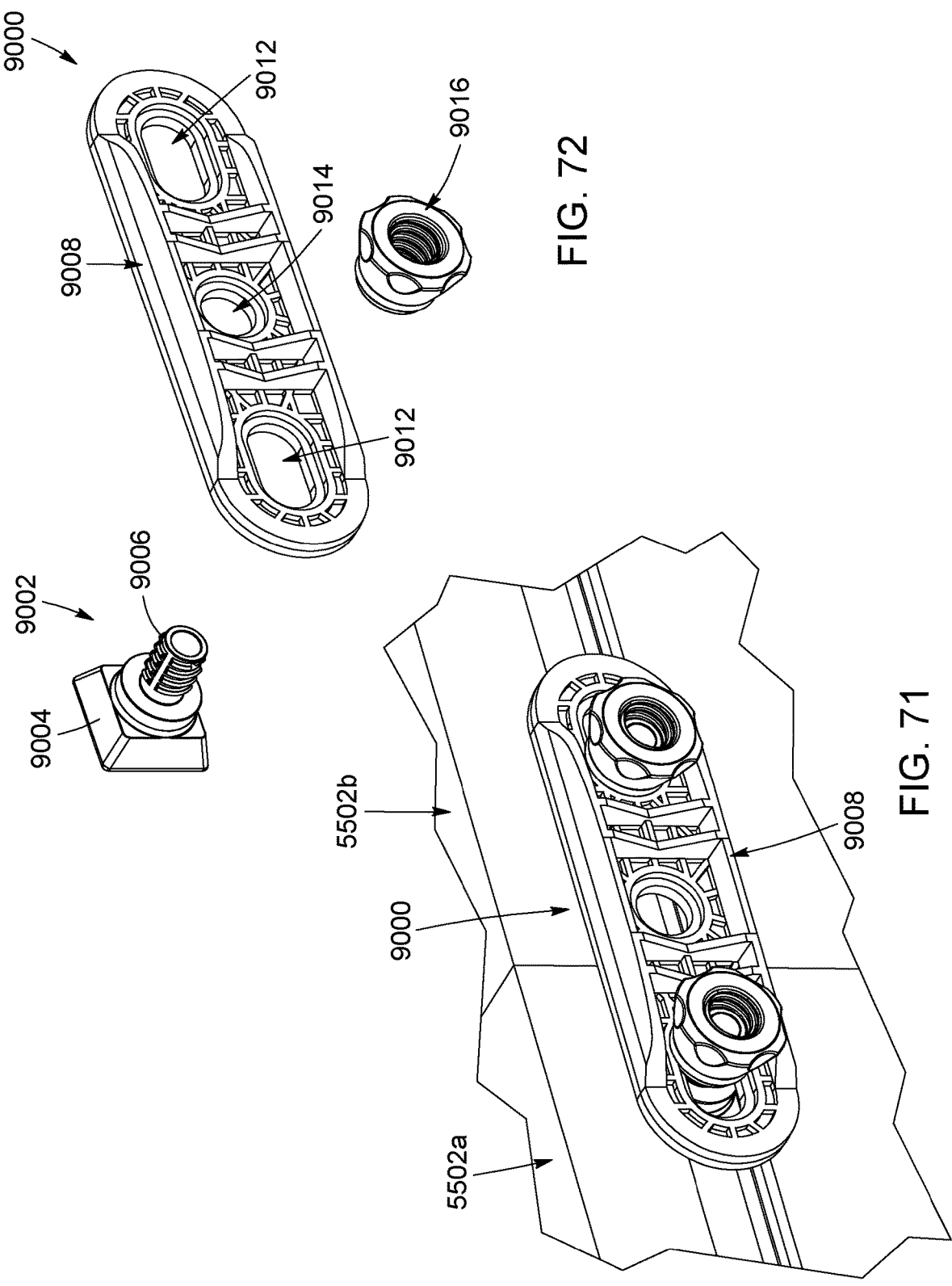
FIG. 71 is perspective view of a portion of a hardscape structure built using a modular building system, in accordance with one embodiment, showing first and second wall sections connected using a connecting assembly.
FIG. 72 is an exploded view of the connecting assembly illustrated in FIG. 71.

In the illustrated embodiment, the connector providing assembly 8500 further includes a mating surface connector 8700 adapted to engage grooves which are positioned face-to-face with each other when the surfaces in which the grooves are defined are placed against each other in a mating relationship. As shown in FIG. 70, the mating surface connector 8700 can simply be inserted in the grooves by sliding the mating surface connector 8700 along the grooves to thereby connect together the first and second wall sections 5502a, 5502b.

Referring now to FIGS. 71 to 74, there is provided a connecting assembly 9000 for connecting together the first and second wall sections 5502a, 5502b, in accordance with yet another embodiment.

In this embodiment, the connecting assembly 9000 includes a connector 9002 having a connector base 9004 and a connecting shaft 9006 extending away from the connecting base 9004. The connector base 9004 has a general shape of a truncated pyramid and is sized and shaped to engage the grooves of the first and second wall sections 5502a, 5502b.

The connecting assembly 9000 further includes a compression plate 9008 adapted to be placed against the rear face of the first and second wall sections 5502a, 5502b. The compression plate 9008 includes a plurality of receiving openings 9010 for receiving the connecting shaft 9006 of connectors 9002 engaged in the corresponding grooves of the first and second wall sections 5502a, 5502b. Specifically, the compression plate 9008 includes a pair of spaced-apart outer holes 9012 and a central hole 9014 located between the outer holes 9012.

Still in the illustrated embodiment, the compression plate 9008 is connected to two connectors 9002 engaging the corresponding grooves and extending through the outer holes 9012. Alternatively, the compression plate 9008 could be connected to a single connector 9002 extending through the central hole 9014, or even by three connectors 9002 extending through all three holes 9012, 9014.

In the illustrated embodiment, the connecting shaft 9006 is threaded and the connecting assembly 9000 further includes, for each connector 9002, a fastening nut 9016 sized and shaped to threadably engage the connecting shaft 9006. In this embodiment, each nut fastening nut 9016 is further sized and shaped to be easily operable by a user using his/her bare hands, without requiring the use of a tool. Alternatively, the fastening nut 9016 may still be operable using a tool such as a wrench or the like.

Figure 74:
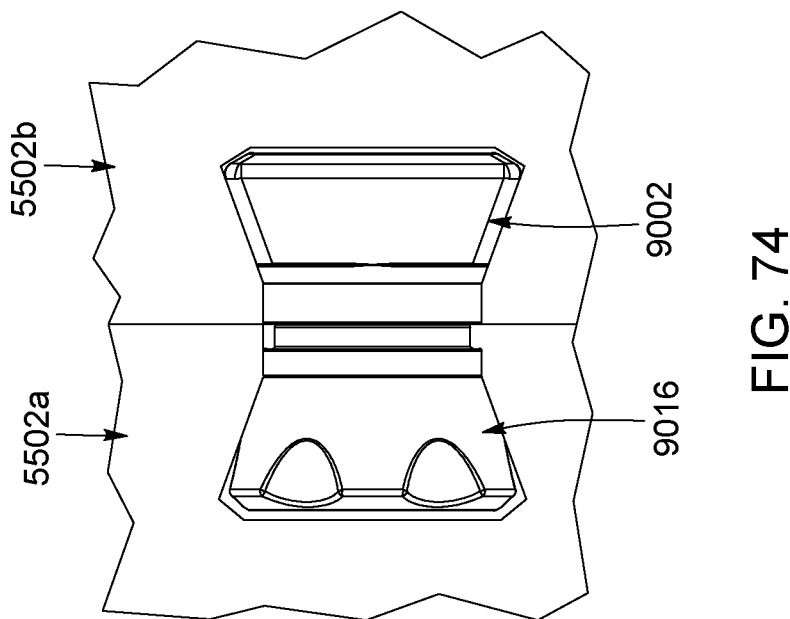
FIG. 74 is a top plan view showing the mating surface connector illustrated in FIG. 73, with the mating surface connector engaging opposing grooves of first and second wall sections.
Figure 73:
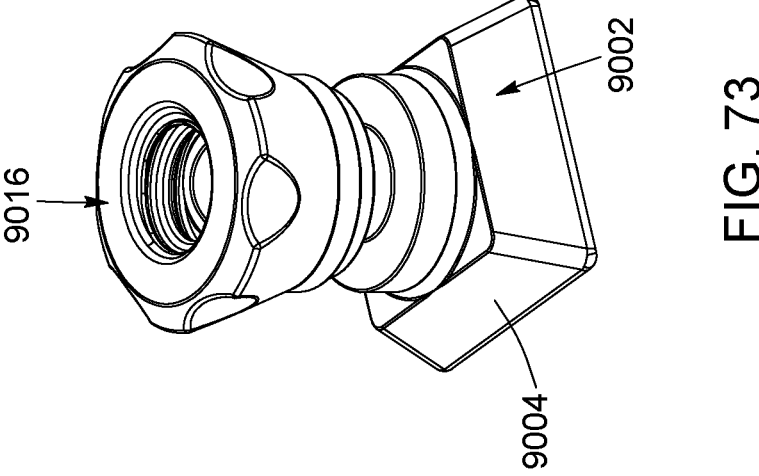
FIG. 73 is a perspective view of a connector and a fastening nut for the connecting assembly illustrated in FIG. 71, with the fastening nut engaging the connector to form a mating surface connector.

As shown in FIGS. 73 and 74, the fastening nut 9016 could further be threadably engaged on the connector 9002 without the compression plate 9008 to form a mating surface connector 9020, generally similar to the mating surface connector 8700. Specifically, the fastening nut 9016 has a cross-section which is sized and shaped to allow the fastening nut 9016 to snuggly engage a corresponding groove.

Figure 75:
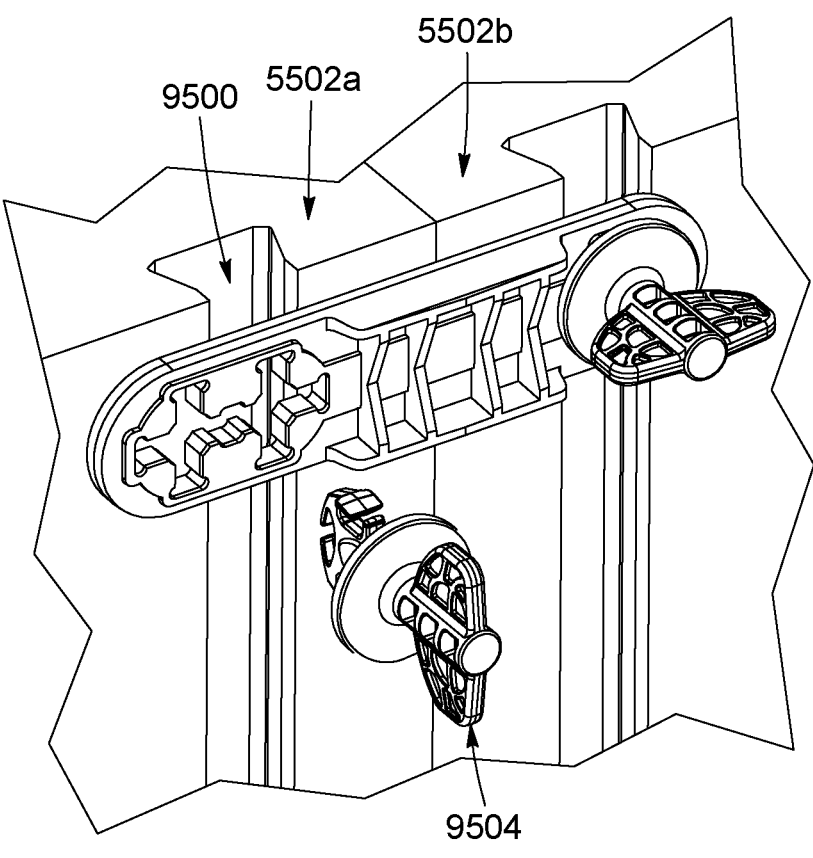
FIG. 75 is a partially exploded view of a connecting assembly, in accordance with another embodiment, with the connecting assembly positioned for connecting first and second wall sections.
Figure 76:
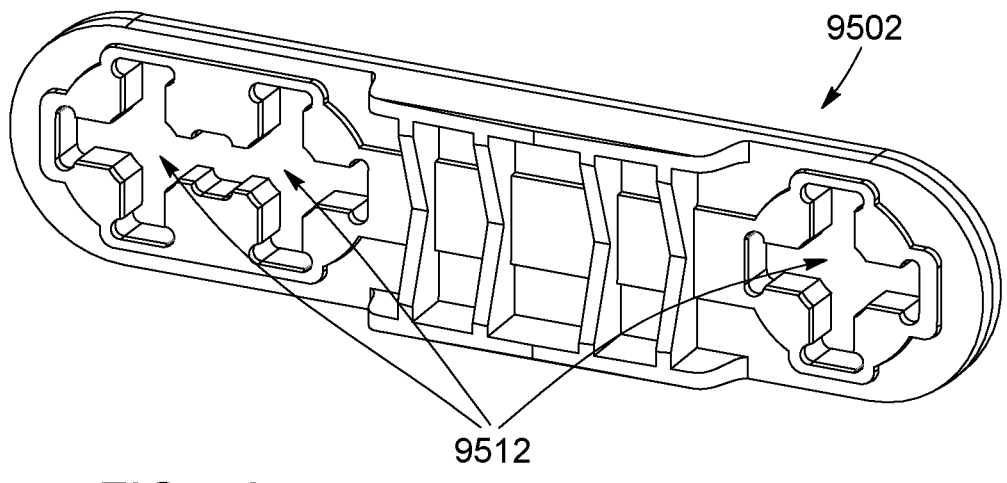
FIG. 76 is a perspective view of a compression plate for the connecting assembly illustrated in FIG. 75.
Figure 77:
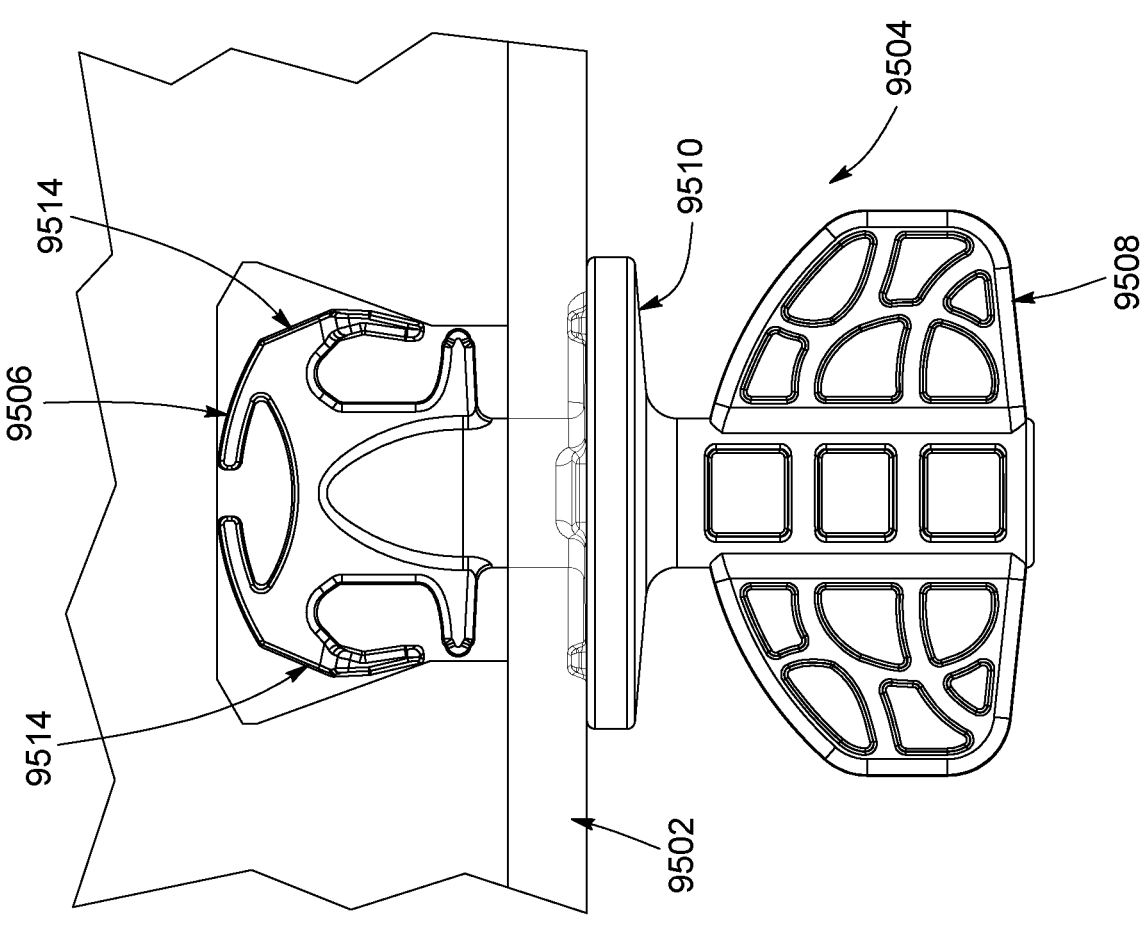
FIG. 77 is a top cross-sectional view of the connecting assembly illustrated in FIG. 75, with a connector of the connecting assembly engaging a groove of the first and second wall sections.

Referring now to FIGS. 75 to 77, there is provided a connecting assembly 9500 for connecting together the first and second wall sections 5502a, 5502b, in accordance with yet another embodiment.

In this embodiment, the connecting assembly 9500 includes a compression plate 9502 and a pair of connectors 9504 engaging the compression plate 9502 and corresponding grooves of the first and second wall sections 5502a, 5502b. More specifically, each connector 9504 is elongated and includes an engagement end 9506, a handle end 9508 and an abutment portion 9510 located between the engagement end 9506 and the handle end 9508. In this embodiment, the compression plate 9502 includes three openings 9512 to receive the connectors 9504. The two connectors 9504 may be inserted in two out of the three openings 9512 depending on a distance between the adjacent grooves of the first and second wall sections 5502a, 5502b.

The engagement end 9506 is generally planar and extend generally along a connector plane $P_1$. To connect the connector 9504 to the corresponding wall section 5502a, 5502b, the engagement end 9506 is first engaged in through a corresponding opening 9512 of the compression plate 9502 with the engagement end 9506 oriented such that the connector plane $P_1$ extends generally along the groove. The connector 9504 is further moved into the opening 9512 until the abutment portion 9510 abuts the compression plate 9502. The connector 9504 may then be turned by about 90 degrees such that the connector plane $P_1$ is perpendicular to the groove. In this position, the engagement end 9506 is locked in the groove and cannot be removed by pulling the connector 9504 away from the first and second wall sections 5502a, 5502b. The engagement end 9506 further includes a pair of resilient arms 9514 which urge the connector 9504 further into the groove such that the abutment portion 9510 abuts the compression plate 9502 and pushes the compression plate 9502 towards the first and second wall sections 5502a, 5502b to thereby create friction therebetween.

In another embodiment, the connecting assembly could instead include a deformable connector, generally similar to a concrete anchor or expansion anchor, which could be inserted in a corresponding groove through the access slit, instead of being slid along the grooves through openings at an end of the groove. Specifically, the deformable connector would be moved into the groove perpendicularly to a rear surface of the wall section in which the groove is defined. The deformable connector may include a central threaded bore which extends generally perpendicularly to the rear surface of the wall section. The connecting assembly may further includes a fastener such as a screw which could be threadably inserted into this threaded bore such that as the fastener is threaded into the bore, at least a portion of the connector located into the groove expands so as to substantially conform to a cross-sectional shape of the groove's holding channel, or at least to expand to be larger than the access slit to prevent removal of the connector from the groove through the access slit. The fastener may further extend through an opening of a compression plate before engaging the connector, such that the compression plate is held in abutment against the rear face of the wall portion when the connector is expanded.

It will be understood that in addition to the configurations described above, the connecting member and the connecting assembly could be configured according to various alternative configurations.

It will be appreciated that all of the structures described and illustrated in at least FIGS. 30 to 38 and FIGS. 46 to 77 are made from substantially the same L-shaped wall sections. Specifically, the wall sections have a shape and configuration which allows the wall sections to be used to build structures having various configurations. For example, the same wall sections could be selectively connected together in a first configuration to form a first structure, such as the upright wall configuration shown in FIGS. 30 and 31, and in second configuration to form a second structure, such as the enclosure illustrated in FIGS. 59 to 61. The same wall sections may further be connected together in other configurations to define additional structures.

It will further be appreciated that in at least some embodiments, as exemplified by but not limited to the embodiments illustrated in FIGS. 29A, 30, 39, 59 and 62, the systems described above may be used to form structures which do not require a separate base elements. For example, the upright wall panels illustrated in FIG. 29A are shown to form a freestanding or self-supporting structure without requiring the use of base slabs or support brackets such as the base slabs 320 and support brackets 450 illustrated in FIGS. 1 to 24F. In one embodiment, before the structure is formed on a ground surface, the ground surface may be leveled. For example, the ground surface may be formed using stabilized sand, a thin layer of concrete, a concrete foundation or any other technique which would be suitable to make a leveled ground surface. Alternatively, the ground surface may not need leveling before the structure is installed on the ground surface.

It will also be appreciated that the embodiments described above are provided merely as examples and that various other configurations may be considered. For example, the grooves may be provided in different shapes and configuration and may be arrange differently on the panels than as described above. Specifically, the wall panel could include one or more central portion which is transparent, or even one or more openings for functional or decorative purposes. In this case, the grooves may only be located in a periphery of the panel. Furthermore, the grooves and connector may not be dovetail-shaped or keyhole-shaped, and may instead have any other appropriate shape to retain the connectors within the grooves.

It will further be appreciated that although certain combinations of shapes, features and assemblies are described hereinabove, the present modular system is not limited to those specific combinations. Specifically, all of the wall panels, base slabs, support brackets and wall sections described above include grooves which may be dovetail-shaped and therefore which are sized and shaped to be connected using any of the connecting assemblies and connectors described above.

It will be appreciated that all of the structures described above are formed mortarlessly, i.e. without the use of mortar to connect together the different components of the system, and without requiring the user to cast any components. Instead, the system uses preformed or precast sections with appropriate connectors engaging preformed grooves in the sections to connect the sections together. This greatly facilitates the building of structures for the user and is adapted for use by both professional builders and by laymen. Additionally, this system allows components such as sections and connectors to be manufactured according to one standard configuration or to a limited number of standard configurations and stockpiled before being sold to customers, thereby reducing the cost of manufacturing the system compared to building elements which are custom-built for a specific structure.

Alternatively, the sections may not all be similar. For example, a structure may be formed using a first plurality of upright wall panels having grooves extending substantially horizontally and a second plurality of upright wall panels disposed alternately between the first plurality of upright wall panels and having grooves extending substantially vertically. Various other configurations and combinations are possible.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A modular building system for building a hardscape structure, the system comprising:
   a plurality of preformed hardscape structure sections including:
      a first hardscape structure section including a first section face and at least one first section groove defined in the first section face;
      a second hardscape structure section having a second section face and at least one second section groove defined in the second section face, the second hardscape structure section being disposed adjacent the first hardscape structure section such that the second section face is adjacent the first section face; and
   a connecting member having a first engagement portion for engaging one of the at least one first section groove or at least one second section groove;
      the connecting member having a fastener bore therethrough shaped to receive a bolt; the fastener bore being positioned within one of the first section groove or second section groove;
   a compression member configured to be disposed against the first and second section faces, in alignment with the connecting member, the compression member being connectable to the connecting member such that the compression member abuts the first and second section faces and frictionally engages the first and second section faces to prevent sliding longitudinal movement of the connecting member along the corresponding first and second section grooves in which the connecting member is received; and wherein the first and second hardscape structure sections are made of a cementitious material and configured for permanent outdoor installation as part of a landscaping structure selected from the group consisting of retaining walls, garden walls, outdoor enclosures, and water features.

2. The modular building system as claimed in claim 1, wherein each groove includes a holding channel sized and shaped for receiving a corresponding engagement portion and an access slit for allowing access to the corresponding engagement portion received in the holding channel, the access slit being narrower than the corresponding engagement portion to prevent removal of the corresponding engagement portion from the holding channel through the access slit.

3. The modular building system as claimed in claim 2, wherein each groove and each engagement portion has a dovetail-shaped cross-section.

4. The modular building system as claimed in claim 3, wherein the holding channel includes an upper inner sidewall, a lower inner sidewall opposite the upper inner sidewall and a center inner sidewall extending between the upper and lower inner sidewalls and located opposite the access slit, the upper and lower inner sidewalls tapering towards each other from the center inner sidewall towards the access slit.

5. The modular building system as claimed in claim 1, wherein the first hardscape structure section includes an upright wall panel having a rear face defining the first section face and a front face, and the second hardscape structure section includes a base slab having a top face defining the second section face and a bottom face, the connecting member being configured to connect the upright wall panel to the base slab such that the upright wall panel extends perpendicularly to the base slab.

6. The modular building system as claimed in claim 5, wherein the connecting member includes a support bracket for extending between the upright wall panel and the base slab, the support bracket having a side planar edge face and a bottom planar edge face extending perpendicularly to the first planar edge face, the side planar edge face being connectable to the top face of the base slab and the bottom planar edge face being connectable to the rear face of the upright wall panel.

7. The modular building system as claimed in claim 6, wherein the support bracket comprises at least one side groove extending transversely across the side planar edge face, and wherein the first engagement portion includes an upright panel connector sized and shaped for engaging one of the at least one side groove of the support bracket and the first groove of the upright wall panel to thereby connect the support bracket to the upright wall panel.

8. The modular building system as claimed in claim 7, wherein the support bracket comprises at least one bottom groove extending transversely across the bottom planar edge face, and wherein the second engagement portion includes a base connector sized and shaped for engaging one of the at least one bottom groove of the support bracket and the second groove of the base slab to thereby connect the support bracket to the base slab.

9. The modular building system as claimed in claim 6, wherein the first engagement portion includes at least one side hook protruding from the side planar edge face, the side hook being sized and shaped to engage the first groove of the upright wall panel to connect the support bracket to the upright wall panel.

10. The modular building system as claimed in claim 9, wherein the second engagement portion includes at least one bottom hook protruding from the bottom planar edge face, the at least one bottom hook being sized and shaped to engage the second groove of the base slab to connect the support bracket to the base slab.

11. The modular building system as claimed in claim 10, wherein the base slab comprises a plurality of transverse members extending on either side of the base slab, the transverse members being provided with rabbeted edges, each bottom hook being adapted to engage a corresponding rabbeted edge.

12. The modular building system as claimed in claim 1, wherein the compression member is integrally formed with the connecting member.

13. The modular building system as claimed in claim 12, further comprising at least one fastener for connecting together the connecting member and the compression member for maintaining the compression member in abutment against the first and second section faces.

14. The modular building system as claimed in claim 13, wherein each fastener is adjustable so as to push the connecting member towards the compression member.

15. The modular building system as claimed in claim 14, wherein each fastener includes a threaded rod extending through the connecting member and through the compression member and a nut adapted to threadably engage the threaded rod and abut the compression member.

16. The modular building system as claimed in claim 1, wherein the first and second hardscape structure sections are made of concrete and are precast for assembly into a permanent hardscape installation capable of withstanding outdoor environmental conditions including freeze-thaw cycles and soil loading forces.

17. The modular building system as claimed in claim 1, wherein the first and second hardscape structure sections are made of a cementitious material.

18. The modular building system as claimed in claim 1, further comprising at least one bolt for connecting together the connecting member and the compression member for maintaining the compression member in abutment against the first and second section faces; the bolt extending through the at least one fastener bore of the connecting member and the compression member.

19. The modular building system as claimed in claim 18, wherein further including a nut adapted to threadably engage the bolt and abut the compression member.

20. The modular building system as claimed in claim 18 wherein the fastening bore includes a head recess sized and shaped to snuggly receive a head of the bolt.

21. The modular building system as claimed in claim 1 wherein the connecting member includes a front face, a pair of rectangular lateral faces, and a pair of opposite end faces; and wherein the connecting member is sized and shaped such that no portion of the connecting member extends from the first section face and second section face, when the connecting member is engaged with the first section groove and second section groove securing the first and second hardscape structure sections.

22. The modular building system as claimed in claim 1, wherein the hardscape structure is a retaining wall system, and wherein the first hardscape structure section comprises an upright wall panel having a rear face defining the first section face, and the second hardscape structure section comprises a base slab having a top face defining the second section face, the base slab being configured to be buried in soil to provide lateral soil retention support.

23. A method for building a hardscape structure, the method comprising:

providing a first hardscape structure section including a first section face;

positioning a second hardscape structure section adjacent the first hardscape structure section such that a second section face of the second hardscape structure section is located adjacent the first section face;

inserting a first engagement portion of a connecting member into a first section groove defined in the first section face of the first hardscape structure section; the connecting member having at least one fastener bore therethrough shaped to receive a bolt;

inserting a second engagement portion of the connecting member into a second section groove defined in the second section face of the second hardscape structure section to thereby connect the first hardscape structure section to the second hardscape structure section; wherein the at least one fastener bore is positioned within one of the first section groove or second section groove;

positioning a compression member against the first and second section faces, in alignment with the connecting member;

connecting the compression member to the connecting member such that the compression member abuts the first and second section faces and frictionally engages the first and second section faces to prevent sliding longitudinal movement of the connecting member along the corresponding first and second section grooves; and wherein the first and second hardscape structure sections are made of a cementitious material and configured for permanent outdoor installation as part of a landscaping structure selected from the group consisting of retaining walls, garden walls, outdoor enclosures, and water features.

24. The method as claimed in claim 23, wherein the first hardscape structure section includes a base slab, and wherein providing the first hardscape structure section comprises:

positioning the base slab horizontally on a ground surface such that a bottom face of the base slab faces downwardly and a top face of the base slab defining the first section face faces upwardly.

25. The method as claimed in claim 24, wherein the second hardscape structure section includes an upright wall panel, and wherein positioning the second hardscape structure section comprises:

positioning the upright wall panel vertically above the base slab such that a front face of the upright wall panel faces away from the base slab and a rear face of the upright wall panel defining the second section face faces towards the base slab.

26. The method as claimed in claim 25, wherein the connecting member includes a support bracket configured for extending between the upright wall panel and the base slab, and further wherein inserting the first engagement portion into the first section groove comprises:

positioning the support bracket on the base slab such that a bottom planar edge face of the support bracket extends along the top face of the base slab and such that a bottom groove defined in the bottom planar edge face is aligned with the first section groove;

inserting a base connector defining the first engagement portion in the aligned bottom and first section grooves.

27. The method as claimed in claim 25, wherein the connecting member includes a support bracket configured for extending between the upright wall panel and the base slab, and further wherein inserting the second engagement portion into the second section groove comprises:

positioning the support bracket on the base slab such that a side planar edge face of the support bracket extends along the rear face of the upright wall panel and such that a side groove defined in the side planar edge face is aligned with the second section groove;

inserting a wall connector defining the first engagement portion in the aligned side and second section grooves.

28. A connecting assembly for connecting together a first hardscape structure section and a second hardscape structure section to form a hardscape structure, the first hardscape structure section including a first section face and a first groove defined in the first section face, the second hardscape structure section including a second section face and a second groove defined in the second section face, the assembly comprising:

a connecting member having a first engagement portion for engaging the first section groove and a second engagement portion for engaging the second section groove when the first and second hardscape structure sections are positioned such that the first and second section faces are positioned adjacent each other; the connecting member having at least one fastener bore therethrough and being shaped to receive a bolt; the at least one fastener bore being positioned within one of the first section groove or second section groove when the connecting member is engaged with the first section groove and second section groove; and a compression member configured to be disposed against the first and second section faces, in alignment with the connecting member, the compression member being connectable to the at least one fastener bore of the connecting member such that the compression member abuts the first and second section faces and frictionally engages the first and second section faces to prevent sliding longitudinal movement of the connecting member along the first and second section grooves.

* * * * *